US012612314B2

(12) United States Patent
Mirkin et al.

(10) Patent No.: US 12,612,314 B2
(45) Date of Patent: Apr. 28, 2026

(54) HALIDE PEROVSKITE NANOCRYSTAL ARRAY AND ITS PREPARATION

(71) Applicant: NORTHWESTERN UNIVERSITY, Evanston, IL (US)

(72) Inventors: Chad A. Mirkin, Wilmette, IL (US); Jingshan Du, Evanston, IL (US); Donghoon Shin, Evanston, IL (US); Vinayak P. Dravid, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 850 days.

(21) Appl. No.: 17/782,613

(22) PCT Filed: Dec. 4, 2020

(86) PCT No.: PCT/US2020/063324
§ 371 (c)(1),
(2) Date: Jun. 3, 2022

(87) PCT Pub. No.: WO2021/188168
PCT Pub. Date: Sep. 23, 2021

(65) Prior Publication Data
US 2023/0018759 A1     Jan. 19, 2023

Related U.S. Application Data

(60) Provisional application No. 63/080,450, filed on Sep. 18, 2020, provisional application No. 62/944,734, filed on Dec. 6, 2019.

(51) Int. Cl.
*C01G 21/16* (2006.01)
*B82Y 30/00* (2011.01)
(Continued)

(52) U.S. Cl.
CPC ............ *C01G 21/16* (2013.01); *C09D 11/322* (2013.01); *B82Y 30/00* (2013.01); *B82Y 40/00* (2013.01);
(Continued)

(58) Field of Classification Search
None
See application file for complete search history.

(56) References Cited

U.S. PATENT DOCUMENTS 10,203,598 B2 *  2/2019  Mirkin ................... B05D 5/061
2019/0241802 A1 *  8/2019  Wheeler ................... C07F 7/24

FOREIGN PATENT DOCUMENTS

CN         106753336 A     5/2017
CN         108855775 A     11/2018
(Continued)

OTHER PUBLICATIONS

English translation of CN-110294455-A Description. (Year: 2019).*
(Continued)

*Primary Examiner* — Anthony J Zimmer
*Assistant Examiner* — Zachary John Baum
(74) *Attorney, Agent, or Firm* — MARSHALL, GERSTEIN & BORUN LLP

(57)     ABSTRACT

A method of forming a halide perovskite nanocrystal array having a plurality of halide perovskite nanocrystals arranged in a pattern can include coating an array of pens with a first ink comprising at least one first perovskite precursor having the formula AX and at least one second perovskite precursor having the formula $BX'_2$ dissolved in a solvent. A is a cation, B is a metal, and X and X' are each a halogen. The method further includes contacting a substrate with the coated pen array to thereby deposit the first ink indias a pattern of printed indicia on the substrate. The printed indicia form nanoreactors on the substrate and a halide perovskite nanoc- (Continued)

(i) Inking and spin coating     (ii) Contact     (iii) Retraction     (iv) Evaporation-crystallization rystal nucleates and grows within each nanoreactor to form the halide perovskite nanocrystal array.

16 Claims, 42 Drawing Sheets

(51) Int. Cl.
$$B82Y\ 40/00 \qquad (2011.01)$$
$$C09D\ 11/322 \qquad (2014.01)$$

(52) U.S. Cl.
CPC ...... *C01P 2002/34* (2013.01); *C01P 2002/60* (2013.01)

(56) References Cited

FOREIGN PATENT DOCUMENTS

| | | | |
|---|---|---|---|
| CN | 110093065 A | 8/2019 | |
| CN | 110294455 A * | 10/2019 | ............... G03F 7/26 |
| JP | 2019038714 A * | 3/2019 | |

OTHER PUBLICATIONS

English translation of JP-2019038714-A Description. (Year: 2019).*
Flick, E.W. (1998). Industrial Solvents Handbook (5th Edition)— Viscosity of DMSO [Dimethyl Sulfoxide]-Water Solutions. William Andrew Publishing/Noyes. Retrieved from https://app.knovel.com/hotlink/calgrph/rcid:kpISHE0009/id:kpISHE0009/industrial-solvents-handbook/industrial-solvents-handbook. (Year: 1998).*
Michels, A. F., et al. Adjustable, (super)hydrophobicity by e-beam deposition of nanostructured PTFE on textured silicon surfaces. J. Mater. Sci. (2016) 51:1316-1323. (Year: 2016).*
Chen, J., et al. Solvent effect on the hole-conductor-free fully printable perovskite solar cells. Nano Energy 27 (2016) 130-137. (Year: 2016).*
Liu, M., Vivo, P., et al. Halide perovskite nanocrystals for next-generation optoelectronics. Small 2019, 15, 1900801. (Year: 2019).*
English translation of CN 108855775 A Description. (Year: 2018).*
European Patent Application No. 20925582.7, Extended European Search Report, dated Nov. 24, 2023.
Gao et al., Supplementary Information: Nano-confined crystallization of organic ultrathin nanostructure arrays with programmable geometries, Nature Communications, S1-30 (Sep. 2019).
Gu et al., Supporting Information: Direct-Writing Multifunctional Perovskite Single Crystal Arrays by Inkjet Printing, 13(8):1-4 (Dec. 2016).
Schultes et al., Universal Nanoparticle Wetting Agent for Upscaling Perovskite Solar Cells, Applied Materials & Interfaces, 11(13): 12948-12957 (Mar. 2019).
International Search Report and Written Opinion for Corresponding International Application No. PCT/US2020/063324 mailing date Oct. 4, 2021.
Li et al., Chemically diverse and multifunctional hybrid organic-inorganic perovskites. Nat. Rev. Mater. vol. 2, 16099, pp. 1-18, (2017).
Zarick, et al., "Mixed halide hybrid perovskites: a paradigm shift in photovoltaics" J. Mater. Chem. A, vol. 6, 5507-5537 (2018).
Deng et al., "All-inorganic lead halide perovskites: a promising choice for photovoltaics and detectors". J. Mater. Chem. C, vol. 7, pp. 12415-12440 (2019).
Gangadharan et al., "Searching for stability at lower dimensions: current trends and future prospects of layered perovskite solar cells". Energy Environ. Sci. vol. 12, 2860-2889 (2019).
Nie et al., "High-efficiency solution-processed perovskite solar cells with millimeter-scale grains." Science, vol. 347, 522-525 (2015).
Wang et al., Perovskite light-emitting diodes based on solution-processed self-organized multiple quantum wells. Nat. Photonics, vol. 10, pp. 699-704 (2016).

Zhu et al., Lead halide perovskite nanowire lasers with low lasing thresholds and high quality factors. Nat. Mater. vol. 14, pp. 636-642 (2015).
Fang et al., Highly narrowband perovskite single crystal photodetectors enabled by surface-charge recombination. Nat. Photonics, vol. 9, pp. 679-686 (2015).
Kovalenko et al., Properties and potential optoelectronic applications of lead halide perovskite nanocrystals. Science, vol. 358, pp. 745-750 (2017).
Fu et al., "Metal halide perovskite nanostructures for optoelectronic applications and the study of physical properties." Nat. Rev. Mater. vol. 4, pp. 169-188 (2019).
Lin et al., "Orthogonal lithography for halide perovskite optoelectronic nanodevices." ACS Nano, vol. 13, pp. 1168-1176 (2019).
Wang et al., "Wafer-scale growth of large arrays of perovskite microplate crystals for functional electronics and optoelectronics." Sci. Adv. vol. 1, pp. 1-8, e1500613 (2015).
Lin et al., "Two-step patterning of scalable all-inorganic halide perovskite arrays." ACS Nano, vol. 14, pp. 3500-3508 (2020).
Gu et al., "Direct-writing multifunctional perovskite single crystal arrays by inkjet printing." Small, 2017, vol. 13, pp. 1-7, 1603217 (2016).
Feng et al., ""Liquid knife" to fabricate patterning single-crystalline perovskite microplates toward high-performance laser arrays." Adv. Mater. vol. 28, pp. 3732-3741 (2016).
Liu et al., "Periodic organic-inorganic halide perovskite microplatelet arrays on silicon substrates for room-temperature lasing." Adv. Sci. vol. 3, pp. 1-9, 1600137 (2016).
Kim et al., Perovskite pattern formation by chemical vapor deposition using photolithographically defined templates. Chem. Mater. vol. 31, pp. 8212-8221 (2019).
Huo et al., "Polymer pen lithography." Science, vol. 321, pp. 1658-1660 (2008).
Brivio et al., "Structural and electronic properties of hybrid perovskites for high-efficiency thin-film photovoltaics from first-principles." APL Mater. vol. 1, 042111 (2013).
L.B. Lucy, "An iterative technique for the rectification of observed distributions." Astron. J. vol. 79, No. 6, pp. 745-754, (1974).
W. H. Richardson, "Bayesian-based iterative method of image restoration." J. Opt. Soc. Am. vol. 62, No. 1, pp. 55-59 (1972).
Kang et al., "High defect tolerance in lead halide perovskite CsPbBr3." J. Phys. Chem. Lett. vol. 8, pp. 489-493 (2017).
Sebastian, et al., "Excitonic emissions and above-band-gap luminescence in the single-crystal perovskite semiconductors CsPbBr3 and CsPbCl3." Phys. Rev. B, vol. 92, 235210, (2015).
Zhu, et al., "Screening in crystalline liquids protects energetic carriers in hybrid perovskites." Science, vol. 353, pp. 1409-1413 (2016).
Miyata et al., "Large polarons in lead halide perovskites." Sci. Adv. vol. 3, e1701217, pp. 1-9, (2017).
Tanaka et al., "Comparative study on the excitons in lead-halide-based perovskite-type crystals CH3NH3PbBr3 CH3NH3PbI3." Solid State Communications. vol. 127, pp. 619-623 (2003).
Li et al., "Size-dependent phase transition in methylammonium lead iodide perovskite microplate crystals." Nature Communication. vol. 7, 11330, pp. 1-8 (2016).
Zhang et al., "Size-dependent one-photon- and two-photon-pumped amplified spontaneous emission from organometal halide CH3NH3PbBr3 perovskite cubic microcrystals." Phys. Chem. Chem. Phys. vol. 19, pp. 2217-2224 (2017).
D'Innocenzo et al., "Tuning the light emission properties by band gap engineering in hybrid lead halide perovskite." J. Am. Chem. Soc. vol. 136, pp. 17730-17733 (2014).
Oksenberg et al., "Surface-guided CsPbBr3 perovskite nanowires on flat and faceted sapphire with size-dependent photoluminescence and fast photoconductive response." Nano Lett. vol. 18, pp. 424-433 (2018).
Kandada et al., "Photophysics of hybrid lead halide perovskites: The role of microstructure." Acc. Chem. Res. vol. 49, pp. 536-544 (2016).
Oksenberg et al., "Large lattice distortions and size-dependent bandgap modulation in epitaxial halide perovskite nanowires." Nat. Commun. vol. 11:489, pp. 1-11 (2020).

(56)          References Cited

OTHER PUBLICATIONS

Grancini et al., "Role of microstructure in the electron-hole interaction of hybrid lead halide perovskites." Nat. Photonics, vol. 9, pp. 695-701 (2015).

Yamada et al., "Dynamic optical properties of CH3NH3PbI3 single crystals as revealed by one- and two-photon excited photoluminescence measurements." J. Am. Chem. Soc. vol. 137, pp. 10456-10459 (2015).

Y. Kanemitsu, Luminescence spectroscopy of lead-halide perovskites: materials properties and application as photovoltaic devices. J. Mater. Chem. C, vol. 5, pp. 3427-3437 (2017).

Wang et al., "Pressure-induced phase transformation, reversible amorphization, and anomalous visible light response in organolead bromide perovskite." J. Am. Chem. Soc. vol. 137, pp. 11144-11149 (2015).

Fang et al., "Ultrahigh sensitivity of methylammonium lead tribromide perovskite single crystals to environmental gases." Sci. Adv. vol. 2, e1600534, pp. 1-9 (2016).

Selig et al., "Organic cation rotation and immobilization in pure and mixed methylammonium lead-halide perovskites." J. Am. Chem. Soc. vol. 139, pp. 4068-4074 (2017).

Zuo et al., "Morphology evolution of high efficiency perovskite solar cells via vapor induced intermediate phases." J. Am. Chem. Soc. vol. 138, pp. 15710-15716 (2016).

Schmidt et al., "Excitation-power dependence of the near-band-edge photoluminescence of semiconductors." Phys. Rev. B, vol. 45, No. 16, pp. 8989-8994 (1992).

Liu et al., "Temperature-dependent photoluminescence spectra and decay dynamics of MAPbBr3 and MAPbIs thin films." AIP Adv. vol. 8, 095108 (2018).

Chen et al., "Elucidating the phase transitions and temperature-dependent photoluminescence of MAPbBr3 single crystal." J. Phys. D: Appl. Phys. vol. 51 , 045105, pp. 1-8 (2018).

Manser et al., "Band filling with free charge carriers in organometal halide perovskites." Nat. Photonics, vol. 8, pp. 737-743 (2014).

Pazos-Outon et al., "Photon recycling in lead iodide perovskite solar cells." Science, vol. 351, Issue 6280, pp. 1430-1433 (2016).

Diab et al., "Impact of reabsorption on the emission spectra and recombination dynamics of hybrid perovskite single crystals." J. Phys. Chem. Lett. vol. 8, pp. 2977-2983 (2017).

Dou et al., "Atomically thin two-dimensional organic-inorganic hybrid perovskites." Science. vol. 349, pp. 1518-1521 (2015).

Peng et al., "Solution-grown monocrystalline hybrid perovskite films for hole-transporter-free solar cells." Adv. Mater. vol. 28, pp. 3383-3390 (2016).

Calado et al., Evidence for ion migration in hybrid perovskite solar cells with minimal hysteresis. Nat. Commun. vol. 7, 13831, pp. 1-10 (2016).

Rhee et al., "Crack-free, soft wrinkles enable switchable anisotropic wetting." Angew. Chem. vol. 129, pp. 6623-6627 (2017).

Eichelsdoerfer et al., "Large-area molecular patterning with polymer pen lithography." Nat. Protoc. vol. 8, pp. 2548-2560 (2013).

Laramy et al., "High-throughput, algorithmic determination of nanoparticle structure from electron microscopy images." ACS Nano, vol. 9, pp. 12488-12495 (2015).

Liu et al., "Delineating the pathways for the site-directed synthesis of individual nanoparticles on surfaces" PNAS, vol. 110, No. 3, pp. 887-891, (2013).

Gao et al., "Nano-confined crystallization of organic ultrathin nanostructure arrays with programmable geometries" Nature Communications, vol. 10:3912 pp. 1-8 (2019).

* cited by examiner

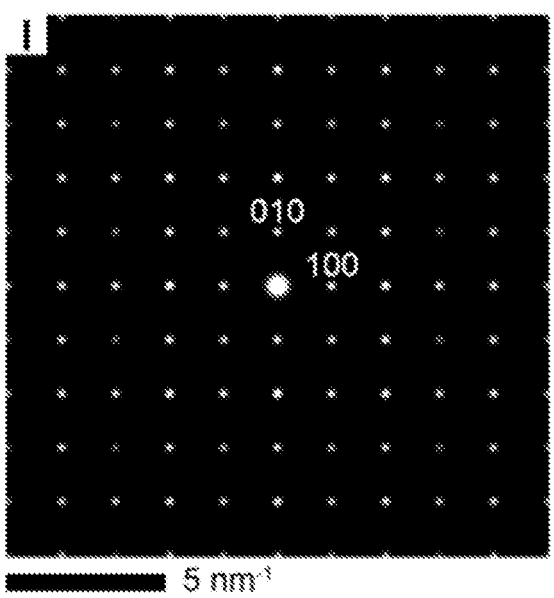
Figure 2I
Figure 3A
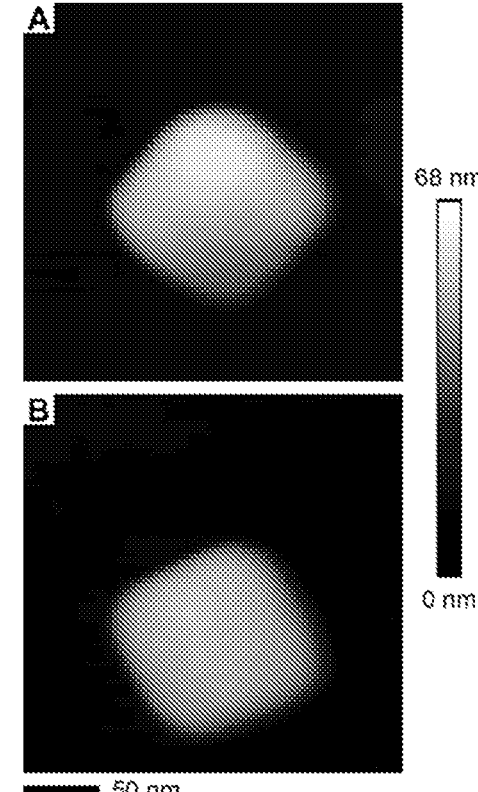
Figure 3B

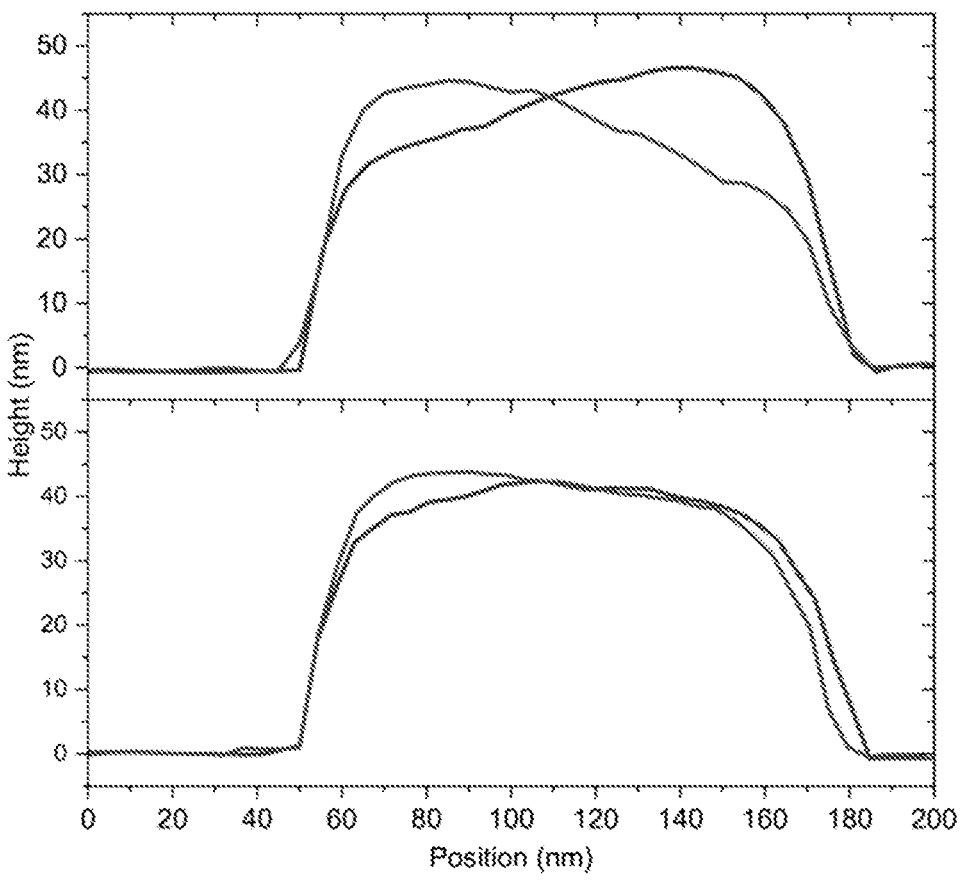
Figure 3C
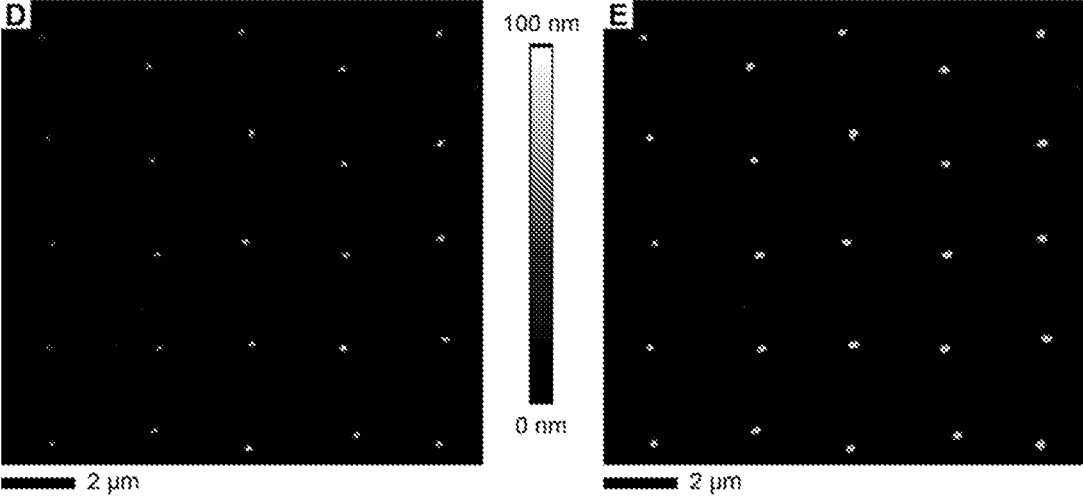
Figure 3D
Figure 3E

50 μm

200 μm

500 μm

50 μm

500 μm

500 μm

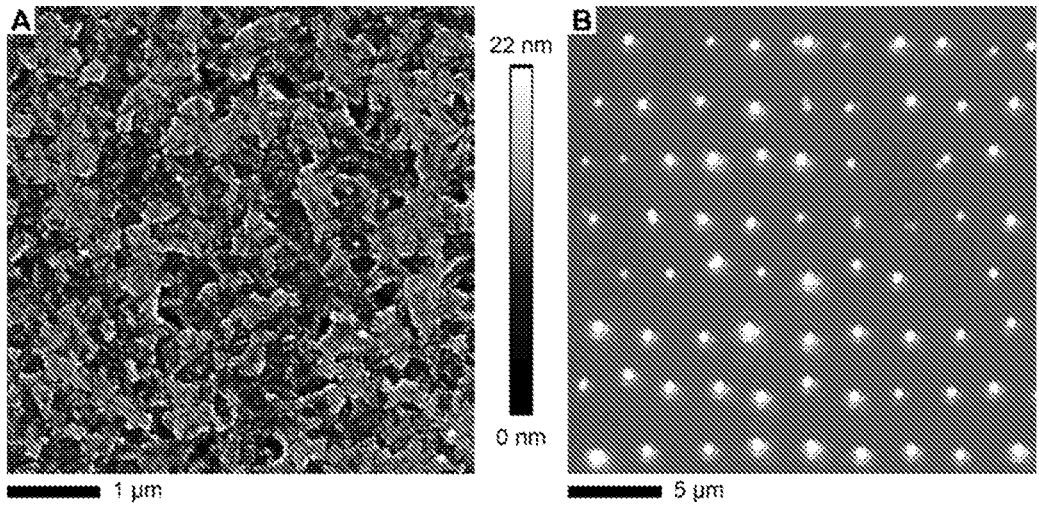
Figure 11A                                                          Figure 11B
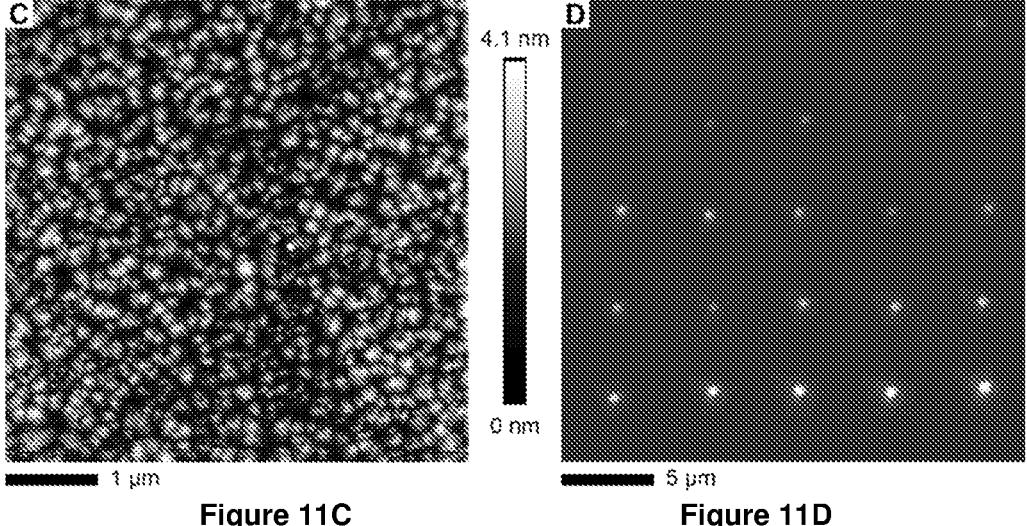
Figure 11C                                                          Figure 11D

A

Dimethylformamide (DMF)
V. P. = 380 Pa (20 °C)

B

Dimethyl sulfoxide (DMSO)
V. P. = 56 Pa (20 °C)

C

γ-Butyrolactone (GBL)
V. P. = 200 Pa (20 °C)
+ DMSO (vol:vol = 3:2)

D

Sulfolane
V. P. = 9 Pa (20 °C)
+ DMSO (vol:vol = 3:7)

500 nm

C

D

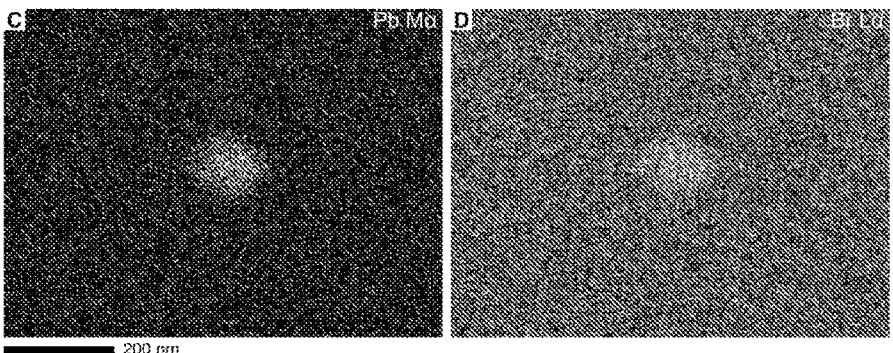
Figure 16C Figure 16D
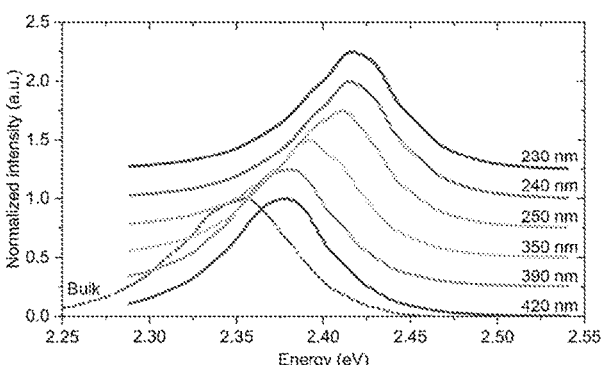
Figure 17
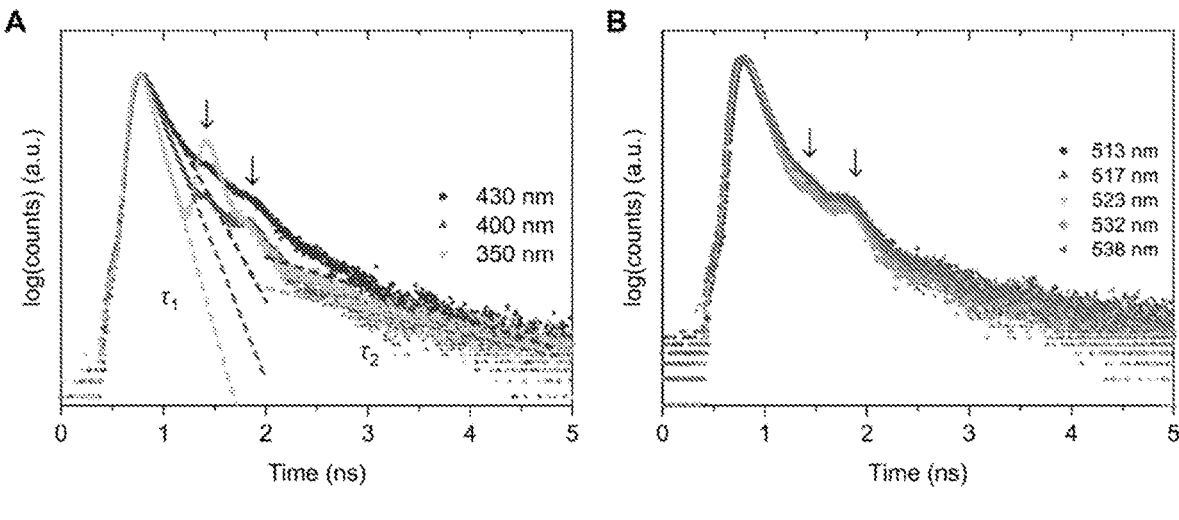
Figure 18A Figure 18B

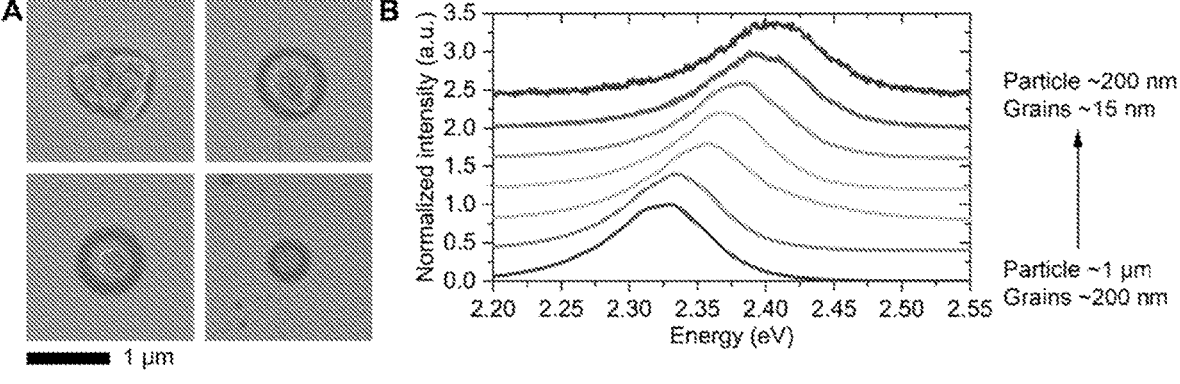
Figure 19A                    Figure 19B
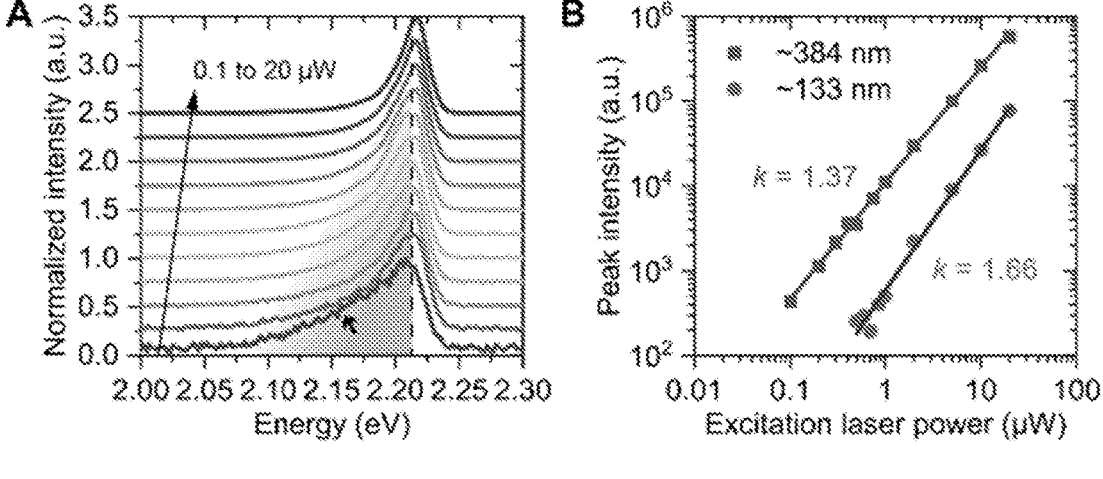
Figure 20A                    Figure 20B

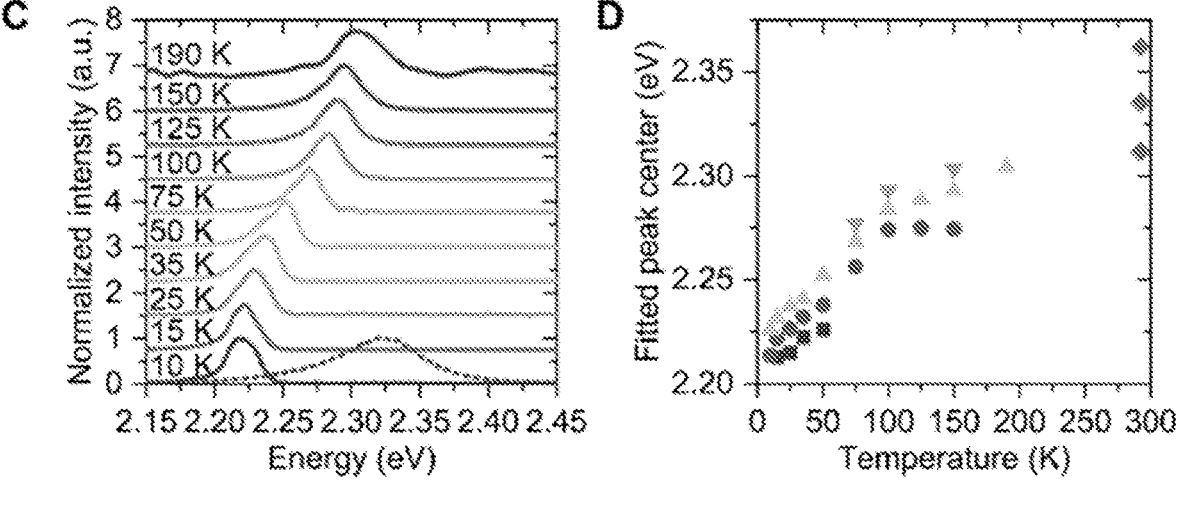
Figure 20C                                        Figure 20D
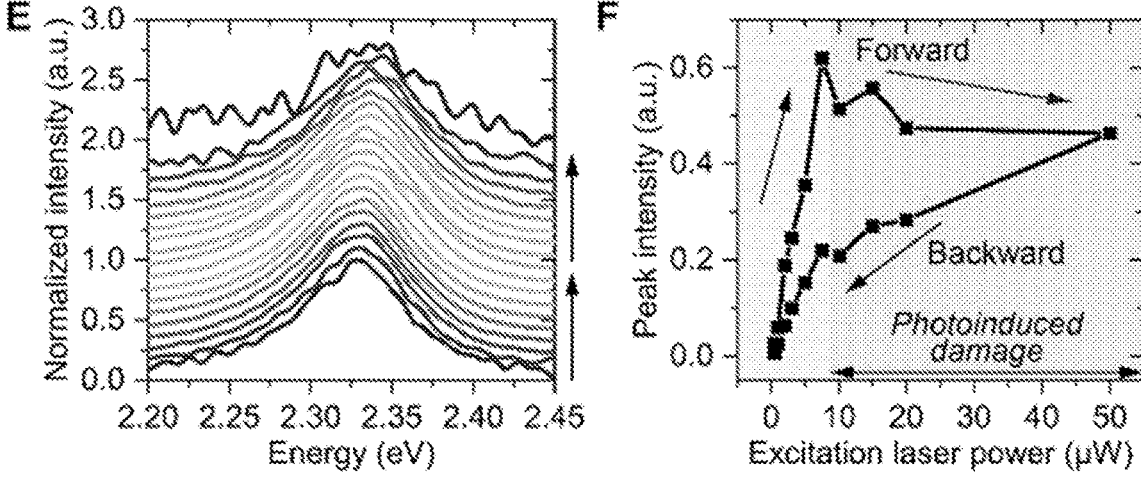
Figure 20E                                        Figure 20F

Figure 20G          Figure 20H

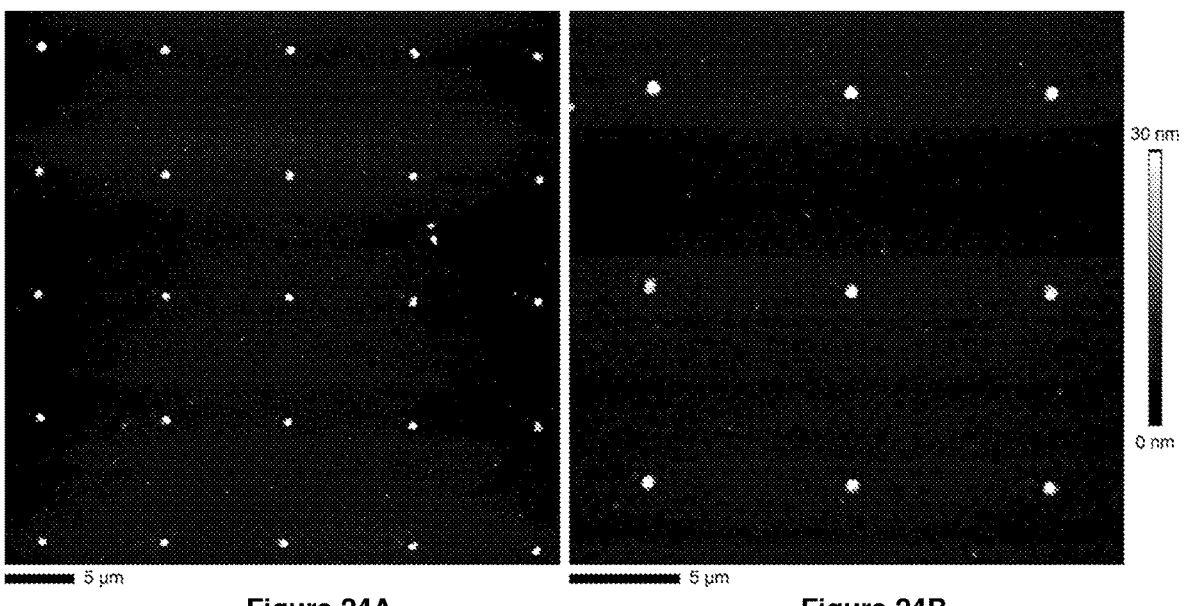
Figure 24A                              Figure 24B
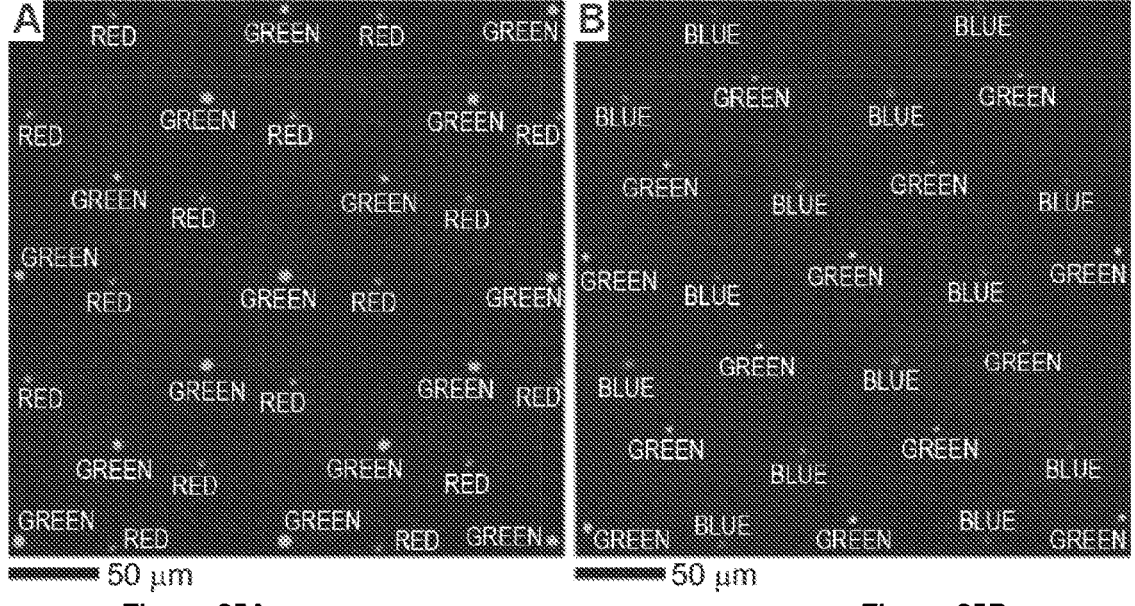
Figure 25A                              Figure 25B

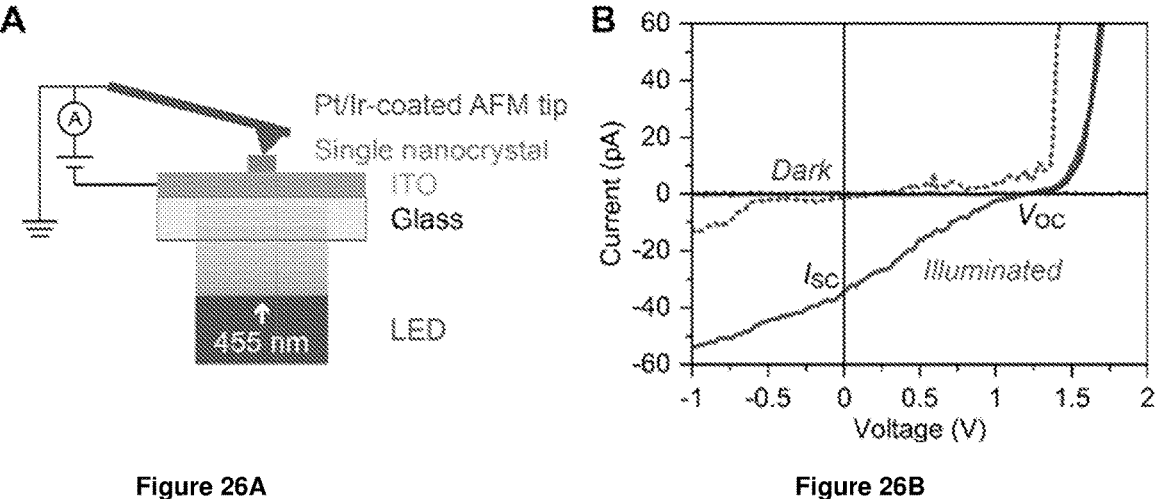
Figure 26A
Figure 26B
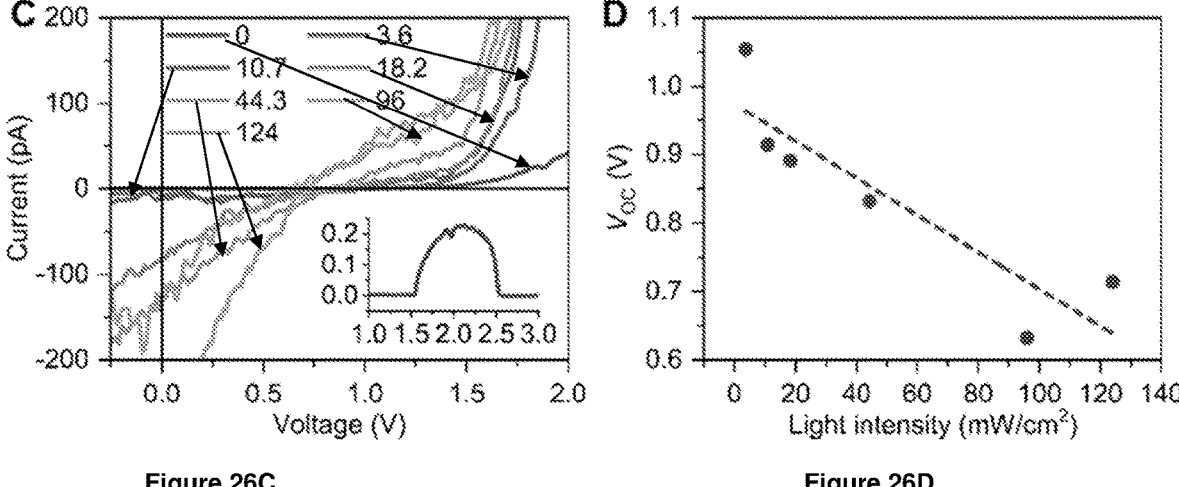
Figure 26C
Figure 26D

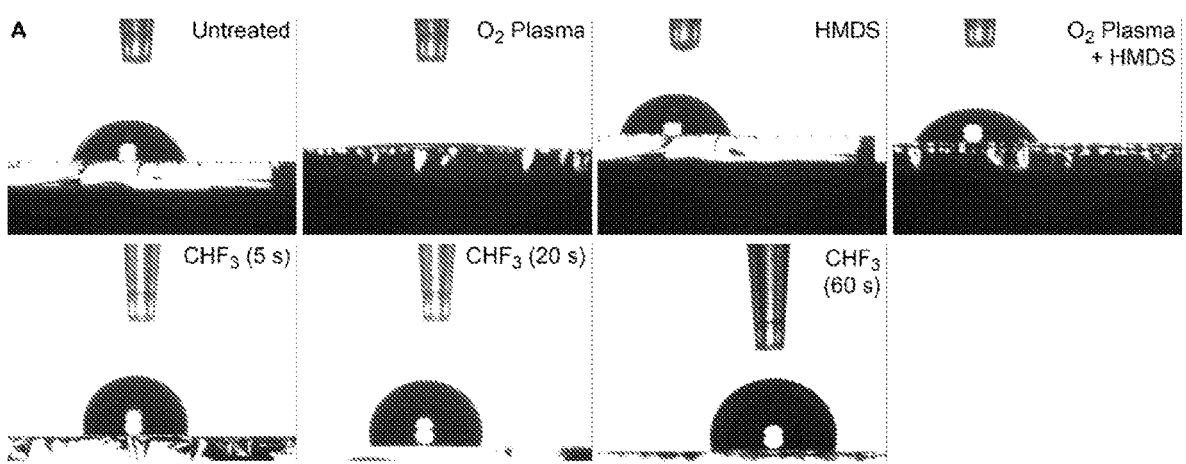
Figure 30A
Figure 30B
Figure 30C
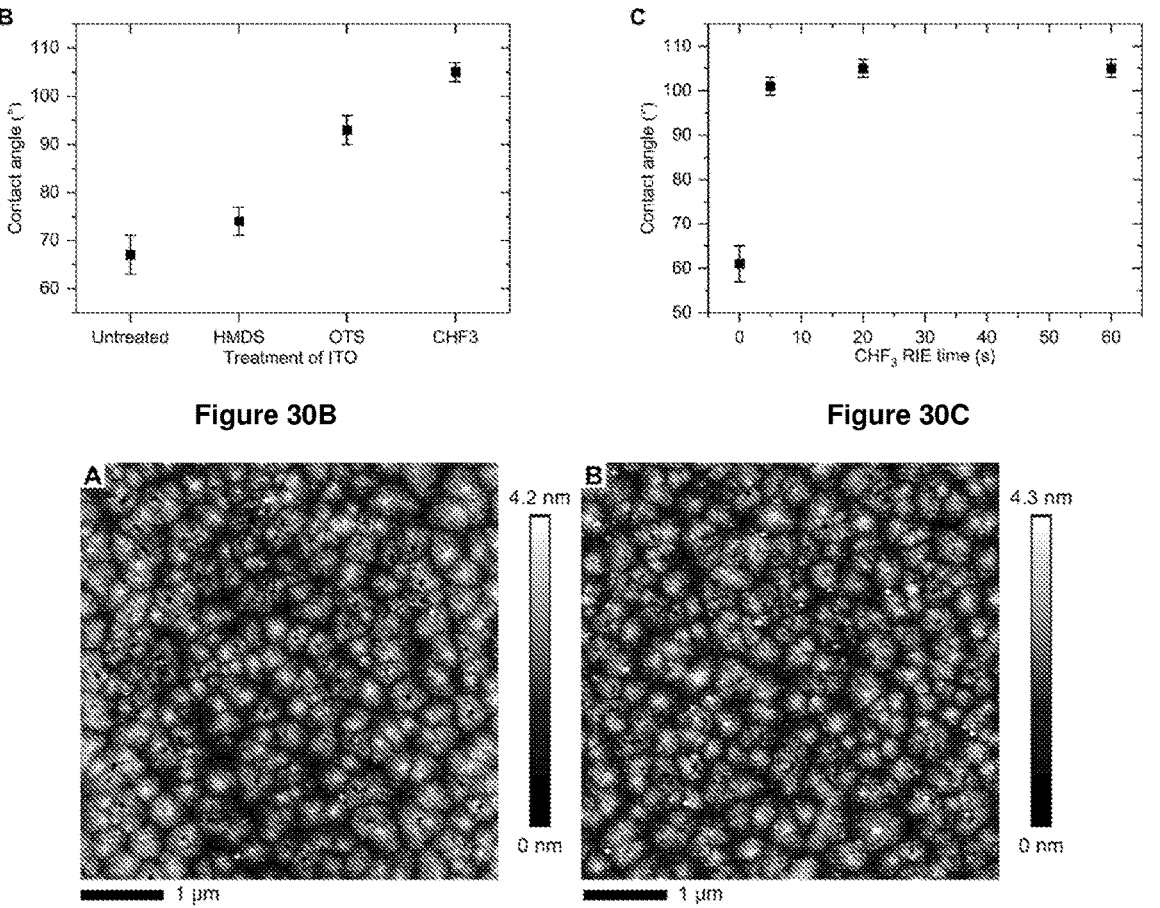
Figure 31

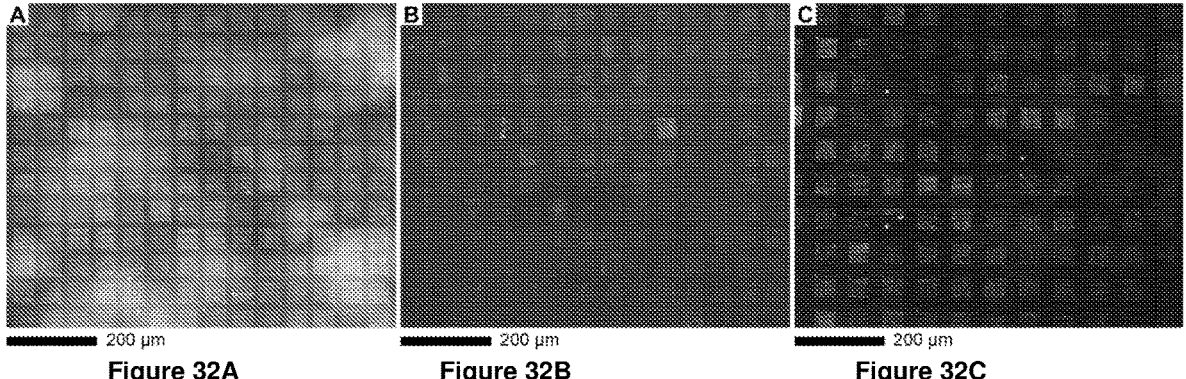
Figure 32A          Figure 32B          Figure 32C
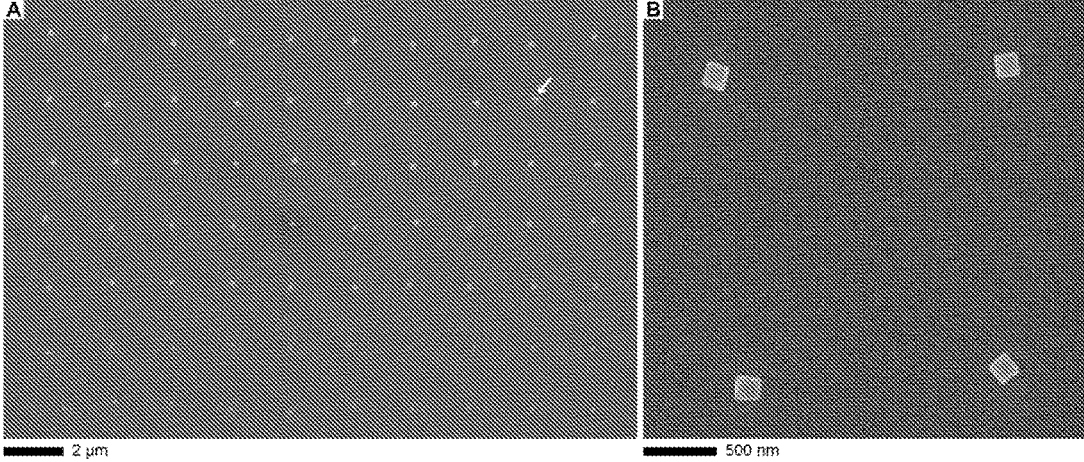
Figure 33A                    Figure 33B

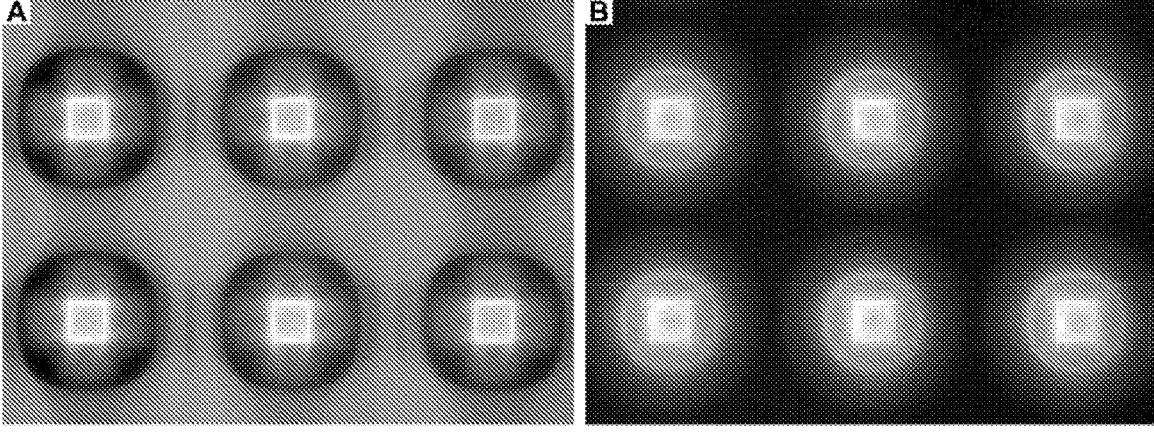
Figure 34A                    Figure 34B
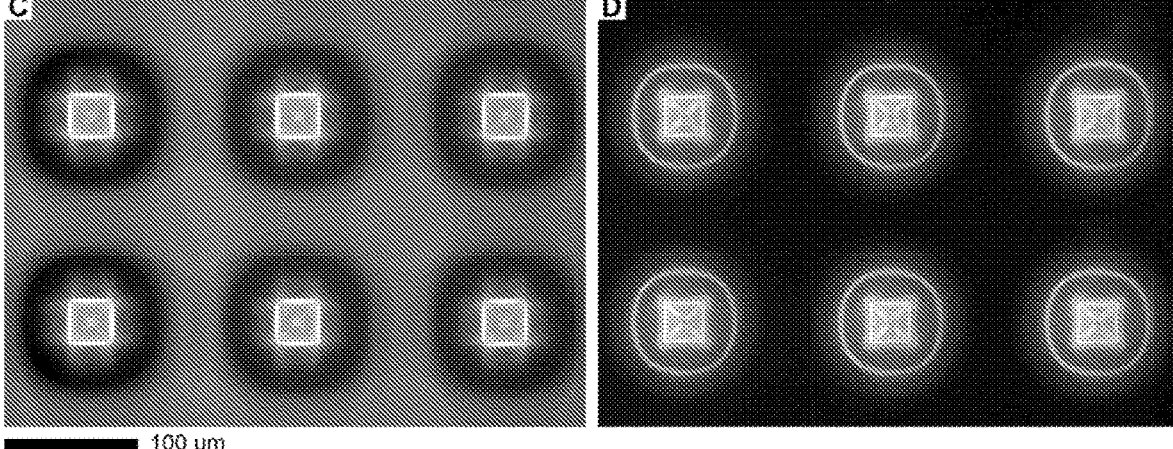
Figure 34C                    Figure 34D

HALIDE PEROVSKITE NANOCRYSTAL ARRAY AND ITS PREPARATION

CROSS-REFERENCE TO RELATED APPLICATIONS

This application is a U.S. National Phase of PCT/US2020/063324, filed Dec. 4, 2020, which claims the benefit of priority of U.S. Provisional Patent Application No. 62/944,734 filed Dec. 6, 2019 and U.S. Provisional Patent Application No. 63/080,450 filed Sep. 18, 2020. The entire disclosures of each are incorporated herein by reference in their entireties.

STATEMENT OF GOVERNMENT INTEREST

This invention is made with government support under FA9550-17-1-0348 awarded by the Air Force Office of Scientific Research (AFOSR). The government has certain rights in the invention.

BACKGROUND

Field of the Disclosure

The disclosure relates to halide perovskite nanocrystals and methods of making halide perovskite nanocrystals.

Brief Description of Related Technology

Halide perovskites have been explored extensively in the field of optoelectronics. These materials have unusual electronic structures and lattice dynamics. Several classes of halide perovskites, including organic-inorganic hybrid crystals, all-inorganic crystals, and layered crystals, have been identified as promising materials for fabricating solar cells, light-emitting diodes (LEDs), lasers, and radiation detectors. When the crystal size is reduced below the micrometer range, however, the relationship between crystal dimensions and physiochemical properties is not clear. This is, in part, due to the difficulty in preparing site-isolated, high-quality nanocrystals that have defined compositions, sizes, and locations. In addition, the challenge of miniaturizing halide perovskites in a site-specific manner hinders the integration of these materials into micro- and nano-optoelectronic devices. Conventional lithography techniques are largely incompatible with halide perovskites due to the poor chemical stability of these materials in many solvents required for photolithography.

SUMMARY

Emerging patterning tools such as lithographically defined seed conversion, inkjet printing, and template crystal growth have yielded micron and sub-micron sized structures in polycrystalline and relatively large single-crystalline state, but no method yet exists for synthesizing arrays of high-quality halide perovskite nanocrystals in a multiplexed manner. Such capabilities and arrays would not only enable fabrication of devices that rely on a single particle, but allow for investigation of the relationship between crystal structure, composition, dimension, and properties.

Pen array lithography methods described herein have advantageously been found to allow for synthesis of halide perovskite nanocrystal arrays that are a capable of spanning a variety of substrates over $cm^2$ areas.

In embodiments, a method of forming a halide perovskite nanocrystal array having a plurality of halide perovskite nanocrystals arranged in a pattern can include coating an array of pens with a first ink comprising at least one first perovskite precursor having the formula AX and at least one second perovskite precursor having the formula $BX'_2$ dissolved in a solvent. A is a cation, B is a metal, and X and X' are each a halogen. The method further includes contacting a substrate with the coated pen array to thereby deposit the first ink as a pattern of printed indicia on the substrate. The printed indicia form nanoreactors on the substrate and a halide perovskite nanocrystal nucleates and grows within each nanoreactor to form the halide perovskite nanocrystal array.

BRIEF DESCRIPTION OF THE DRAWINGS

FIG. 2I is a simulated electron diffraction pattern along the [001] zone axis of the nanocrystal of FIG. 2G;

FIG. 3A is an atomic force microscopy (AFM) height image of an $MAPbBr_3$ nanocrystal made by the method of the disclosure;

FIG. 3B is an AFM height image of an $MAPbBr_3$ nanocrystal made by the method of the disclosure;

FIG. 3C is a graph showing the cross-sectional height profiles of the nanocrystals of FIG. 3A (upper) and FIG. 3B (lower) in two orthogonal directions. AFM scans were tiled-corrected;

FIG. 3D is a large-area AFM image showing 25 $MAPbBr_3$ nanocrystals. The mean (±standard deviation) height was 78.6±21.7 nm, and the mean diameter was 205.7±23.0 nm. Due to the varying particle orientations and limited resolution in large-area AFM scans, these numbers were determined to be rough reflection of the particle size distribution;

FIG. 3E is a threshold-filtered image for particle statistics of the nanocrystals in FIG. 3D;

FIGS. 7A to 4C are fluorescence micrographs showing grayscale patterning of the "IIN" logo on an HMDS-modified Si wafer enabled by control of the extension length and subsequent tip flattening (increases feature size). Inset in (D) is the original grayscale pattern design;

FIGS. 8A to 8C are fluorescence micrographs of large-scale size-gradient patterns on various substrates: ITO-coated glass (A), a glass slide (B), and silicon nitride thin film (C, the dashed box outlines the freestanding silicon nitride; thickness=15 nm). Arrows indicate the direction of decreasing $L_E$ for each polymer pen. Insets in (A) and (B): magnified image of an array generated by one polymer pen; scale bars: 50 μm;

FIG. 11A is an AFM height image of a halide perovskite nanocrystal array printed on an HMDS-modified ITO-coated glass with a surface roughness of 2.97 nm;

FIG. 11B is an optical micrograph of the nanocrystal array of FIG. 11A;

FIG. 11C is an AFM height image of a halide perovskite nanocrystal array printed on an HMDS-modified ITO-coated glass with a surface roughness of 0.62 nm;

FIG. 11D is an optical micrograph of the nanocrystal array of FIG. 11C;

FIGS. 16B to 16D are EDS maps of the nanocrystal of FIG. 16A;

FIG. 17 is a graph showing the size-dependent PL spectra of individual $CsPbBr_3$ nanocrystals of different sizes (measured from SEM images size accuracy ±~10 nm). The PL spectrum from the bulk crystal is shown as a reference (dotted line);

FIG. 18A is a transmissive resolution photoluminescence (TRPL) spectra of $CsPbBr_3$ nanocrystals of different sizes detected at 523 nm. Two decary rates ($\tau_1$ and $\tau_2$) were identified by linear fits. Arrows indicate artifact peaks due to internal reflection in the optical path. All spectra were obtained consecutively from the same batch of measurements under the same conditions;

FIG. 18B is a TRPL spectra of an individual ~400 nm $CsPbBr_3$ nanocrystal at different detection wavelengths. Arrows in indicate artifact peaks due to internal reflection in the optical path. All spectra were obtained consecutively from the same batch of measurements under the same conditions.

FIG. 19A is SEM images of polycrystalline $MAPbBr_3$ nanocrystals with decreasing particle and grain size synthesized using DMF as the solvent;

FIG. 19B is a PL spectra of the polycrystalline $MAPbBr_3$ nanocrystals of FIG. 19A as a function of particle and grain size;

FIG. 20A is a graph showing PL emission of an about 384 nm nanocrystal at 10 K in vacuo excited by a 442 nm laser of varying power. A low-energy tail (indicated by the shaded area and arrow the bottom of the graph) appears at low excitation power;

FIG. 20B is a graph showing the laser power dependence of the PL peak intensity of an about 384 nm and 133 nm nanocrystal at 10K;

FIG. 20C is a graph showing the temperature dependence of the PL peak intensity of an about 129 nm nanocrystal in vacuo. For reference, the dashed line shows the PL spectrum of the nanocrystal at 292 K in atmosphere;

FIG. 20D is a graph showing the fitted peak energy values of dominant sub-peaks deconvolved from the spectra of FIG. 20C;

FIG. 20E is a graph showing the PL emission of an about 550 nm nanocrystal at room temperature in atmosphere excited by a 442 nm laser of changing power (bottom to top: increasing from 0.5 to 50 μW, and then decreasing to 0.5 μW); The spectra were bandpass-filtered for noise reduction;

FIG. 20F is a graph showing the quantification of peak intensity of the spectra in FIG. 20E;

FIG. 20G is a graph showing the quantification of center energy shift fitted by a Voigt function of the spectra in FIG. 20E;

FIG. 20H is a schematic showing the possible excitonic pathways that result in the observed size-dependent emission;

FIGS. 24A and 24B are AFM height images of layered $RP$—$(BA)_2PbBr_4$ nanocrystal arrays synthesized on fluoropolymers-modified ITO-coated glass;

FIG. 25A is a merged-channel confocal fluorescence micrograph of a nanocrystal array containing $MAPbI_3$ (red) and $MAPbBr_3$ (green) pixels;

FIG. 25B is a merged-channel confocal fluorescence micrograph of a nanocrystal array containing $MAPbBr_3$ (green) and $MAPb(Br_{0.4}Cl_{0.6})_3$ (blue) pixels;

FIG. 26A is a schematic illustration of a hole transporter-free single-nanocrystal solar cell using conductive AFM;

FIG. 26B is a graph showing the current-voltage curves for a $MAPBBr_3$ nanocrystal in the dark or illuminated by a 455 nm LED light of about 3.6 $mW/cm^2$. Voc open-circuit voltage; Isc: short-circuit current. Forward (dotted) and backward (solid) scans show significant hysteresis, believed to be due to ion migration in the crystal or condition of the contact between the probe and crystal;

FIG. 26C is a graph showing the light intensity-dependent photovoltaic response of a $MAPbBr_3$ nanocrystal (backward scans). Light intensity unit: $mW/cm^2$. Current variation between measurements is mainly attributed to the unstable point contact between the AFM probe and the crystal. LED wavelength: 455 nm. Inset: AFM height profile of the nanocrystal; length unit: μm;

FIG. 26D is a graph of the open-circuit voltage as a function of light intensity derived from FIG. 26C (dots) and its linear fit (dashed line);

FIG. 30A is an optical image of a water droplet on ITO with different surface treatments;

FIG. 30B is a graph showing contact angle values for different surface treatments;

FIG. 30C is a graph showing water contact angle as a function of reactive ion etching (RIE) time in a CHF$_3$ atmosphere which functionalized the ITO-coated glass with fluoropolymers;

FIG. 31A is an AFM micrograph of an ITO-coated glass substrate. The surface roughness was 0.60 nm and was calculated from scans acquired under identical conditions (512×512 pixels over a 5×5 μm area);

FIG. 31B is an AFM micrograph of the ITO-coated glass substrate after fluoropolymer functionalization. The surface roughness was 0.64 nm;

FIG. 32A is a dark-field micrograph of an MAPbI$_3$ nanocrystal array on a fluoropolymer-modified ITO-coated glass;

FIG. 32B is a dark-field micrograph of an MAPbBr$_3$ nanocrystal array on a fluoropolymer-modified ITO-coated glass;

FIG. 32C is a dark-field micrograph of an MAPbCl$_3$ nanocrystal array on a fluoropolymer-modified ITO-coated glass;

FIG. 33A is an SEM image showing a size-gradient MAPbCl$_3$ nanocrystal array synthesized on a fluoropolymer modified ITO-coated glass, with decreasing crystal size from top to bottom. The white arrow indicates a rare instance when two nucleation centers emerged during the crystallization;

FIG. 33B is a higher-magnification SEM image of the array shown in FIG. 33A, showing the rectangular shape of the nanocrystals. Interparticle spacing is about 2 μm;

FIG. 34A is a bright-field optical micrograph of an inked polymer pen array focused on the base plane;

FIG. 34B is a dark-field optical micrograph of the inked polymer pen array of FIG. 34A, focused on the base plate;

FIG. 34C is a bright-field optical micrograph of the inked polymer pen array of FIG. 34A, focused on the tip; and FIG. 34D is a dark-field optical micrograph of the inked polymer pen array of FIG. 34A, focused on the tip.

DETAILED DESCRIPTION

Halide perovskites generally have the formula ABX$_3$, where A and B are cations and X is one or more halogens. Layered halide perovskites can also be produced. For example RP—(BA)$_2$BX$_4$ type structures can be produced. On example of a layered structure is RP—(BA)$_2$PbX$_4$. In accordance with embodiments, arrays of single crystal halide perovskite nanocrystals can be formed on a variety of substrates using arrays of microscopic pen arrays. The arrays can also be formed as defined patterns using subsets of the pens of the microscopic pen arrays, In accordance with embodiments, a method of synthesizing halide perovskite arrays can include printing a pattern of nanoreactors from an ink using an array of pens. For example, polymer pen lithography can be used. As is known in the art, polymer pen lithography uses an array of pyramidal pens, each pen being joined to a common surface and having a tip oppositely disposed the common surface. The tip is the portion of the pen that makes contact with the substrate. Various other known tip-based patterning tools can be used as known in the art, including, but not limited to, dip-pen nanolithography, hard-tip, soft-spring lithography, and microcontact printing. As is generally known in the art, the pens of the array have a tip, which can have a radius of curvature of less than 1 μm. The pens generally have a size on the microscale. The pens can have various shapes. For example, the pens can be pyramidal.

The ink contains the halide perovskite precursors dissolved in a solvent or solvent system. Reference herein to a solvent should be understood to include a single solvent as well as a solvent system having a combination of solvents. The inks solution includes at least a first perovskite precursor having the formula AX and at least a second perovskite precursor having the formula BX'$_2$. In embodiments X and X' are the same halogen. In other embodiments, X and X' are different halogens. The ratio of the precursors in the ink is selected to satisfy the stoichiometry of the targeted perovskite. For example, when X and X' are the same halogen, the ratio of the precursors is typically about 1:1. This ratio is adjusted for mixed-ion perovskites as well as layered perovskites to satisfy the target stoichiometry. For example, for the mixed-ion perovskite MAPb(Br$_{0.4}$Cl$_{0.6}$)$_3$, the ratio is MABr:MACl:PbBr2:PbCl2=2:3:2:3.

Figures 1, 2A, 2B:
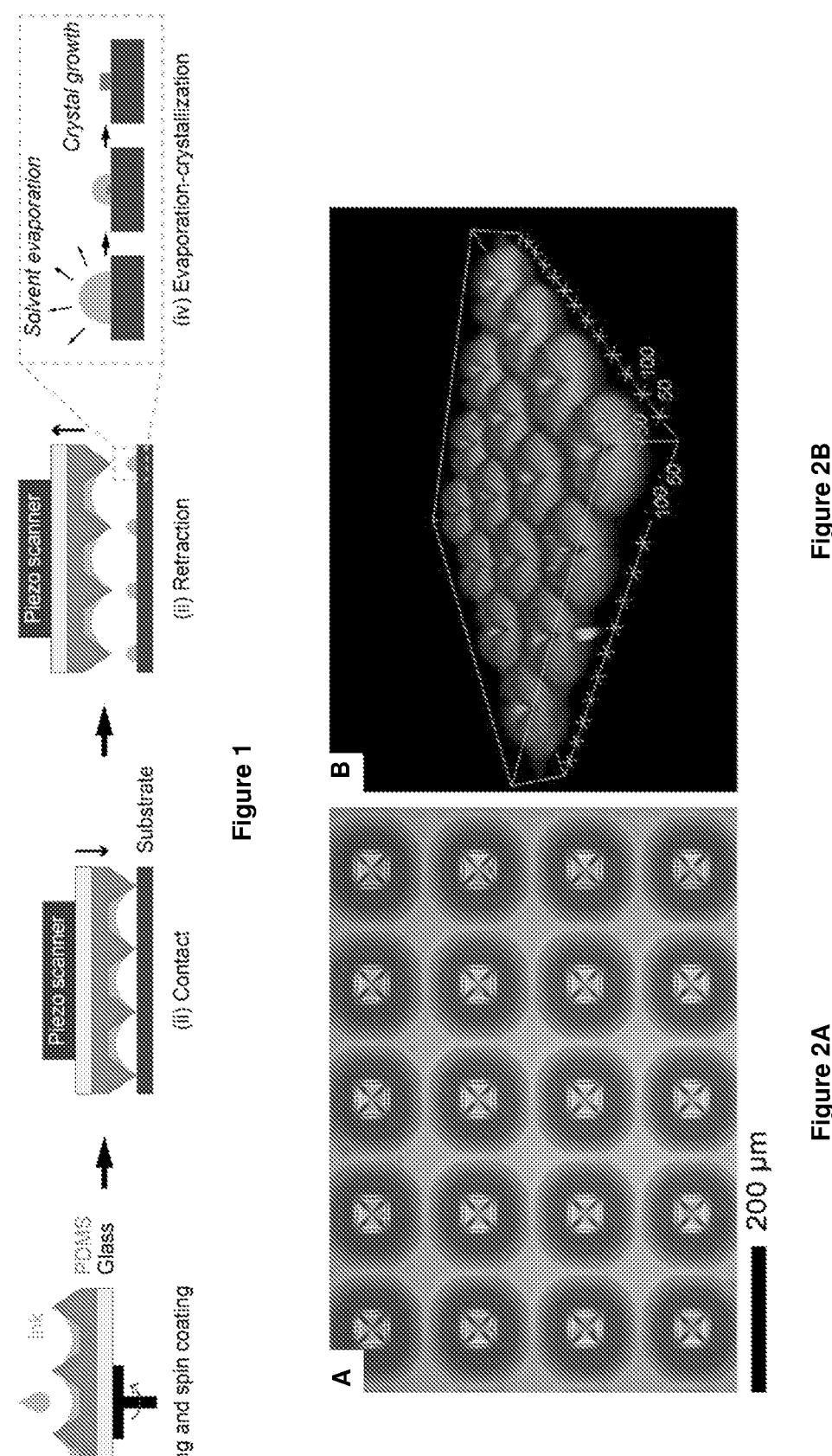
FIG. 1 is a schematic illustration of a method of synthesizing a halide perovskite nanocrystal array in accordance with embodiments of the disclosure.
FIG. 2A is an optical micrograph of a polymer pen lithography pen array coated with an inking solution in accordance with embodiment of the disclosure.
FIG. 2B is a three-dimensional confocal microscope image of a polymer pen lithography pen array coated with a dye-labeled inking solution showing the reservoirs which form around the base of the polymer pens. Length unit in the image is microns.

The ink can be coated onto a pen array using various known methods, including, but not limited to, spin coating, dip coating, and spray coating. FIG. 2A shows an optical micrograph of a polymer pen array coated with the ink. Referring to FIGS. 1 and 34, unlike conventional polymer inks used in conventional pen array lithography, the liquid organic inks disclosed herein accumulate around the base of each pyramidal tip. In embodiments, the ink has a high surface tension and low viscosity that allows the ink to accumulate around the base and serve as a reservoir for continuous inking. In embodiments, the inks can have a surface tension of about 30 mN/m to about 60 mN/m. FIG. 2B is a three-dimensional confocal microscope image of the polymer pen array loaded with dye-labeled inks, showing the reservoirs of ink that surround the base of the tips. The tips are not visible in the image because they are not dye labeled.

Referring again to FIG. 1, once the tips are inked, the polymer pen array is brought into contact with the surface and retracted, thereby depositing the ink onto the substrate forming a nanoreactor. Due to the high surface-to-volume ratio, the nanoreactors evaporate rapidly, which leads to the nucleation and growth of individual halide perovskite nanocrystals. All or substantially all of the nanoreactors results in formation of single crystal halide perovskite nanocrystals.

The ink can be deposited in a defined pattern, resulting in nanoreactors being formed on the substrate in the defined pattern and ultimately nanocrystals arranged in the defined pattern.

Methods of the disclosure can include coating an array of pens with a first ink having any one or more of the precursors and solvents disclosed herein. The ink includes at least a first perovskite precursor of formula AX and at least a second perovskite precursor of formula $BX'_2$ as the one or more precursors. The method further includes contacting a substrate with the coated pen array to deposit the first ink as a pattern of printed indicia on the substrate. The printed indicia form nanoreactors on the substrate, and a halide perovskite nanocrystal nucleates and grows within each nanoreactor to form the halide perovskite nanocrystal array.

In embodiments, the method can further include repeating the coating step (if more ink is needed) and contacting step to deposit additional patterns of printed indicia of the first ink on the substrate.

In embodiments, the method can further includes repeating the coating step (if more ink is needed). The method can further include a further contacting step to deposit an additional pattern of printed indicia of the first ink on the substrate, but with modification of the extension length or contact time to controllable change the feature size of the resulting nanocrystals that nucleate and grow in the nanoreactors. In embodiments, such modification in subsequent contacting steps can be utilize to print grayscale patterning.

In embodiments, the method can further include cleaning the pen array and coating the pen array with a second ink. As with the first ink, the second ink includes at least a first perovskite precursor of formula AX and at least a second perovskite precursor of formula $BX'_2$. The second ink differs from the first ink by one or more of the concentration of the first and/or the second perovskite precursor, the selection of A, the selection of B, the selection of X or the selection of X', and the selection of the solvent. The second ink is deposited on the substrate having the first ink deposited thereon by contacting the coated pen array with the substrate to deposit second ink nanoreactors to thereby form halide perovskite nanocrystals that different from those formed from the first ink by one or more of the crystal structure, geometry, size and composition.

Any suitable number of repeated printing of printed indicia on the substrate with the same or different inks can be used in the methods of the disclosure. The pattern printed by each repeated contacting step can be the same or different. Different patterning can be achieved, for example, by coating different subsets of pens of the pen arrays for subsequent contact steps.

In embodiments, a pen array can be coated with first and second inks prior to contacting the substrate with the pen array. A first subset of pens can be coated with the first ink and second subset of pens can be coated with the second ink. The coating and selection of subsets can be done to achieve any desired pattern. Upon contacting the substrate with the coated pen array, the first ink is deposited as first printed indicia and the second ink is deposited as second printed indicia simultaneously. As noted above, the first and second inks can different by one or more of precursor concentration, selection of the solvent, or the selection of one or more of the precursors compositions used.

Further, as know with lithographic techniques such as polymer pen lithography, control of the extension length and/or contact time can be used to control the size of the deposited feature. It has been found that the size of the deposited feature directly correlates to the ultimate size of the nanocrystal formed from the deposited nanoreactor. The larger the deposited feature, the larger the nanocrystal formed. Such control over the deposition can be used to generate gradients of sizes, resulting in an array of halide perovskite nanocrystal having a gradient of crystal sizes. Such control over size can be used to produce combinatorial libraries of halide perovskite nanocrystals with controlled and defined size variations within the library. Changes in extension length and/or contact time can be further or alternatively used to vary the pattern or feature size of a single patterning step or in a multiple-step patterning process.

Figure 23A:
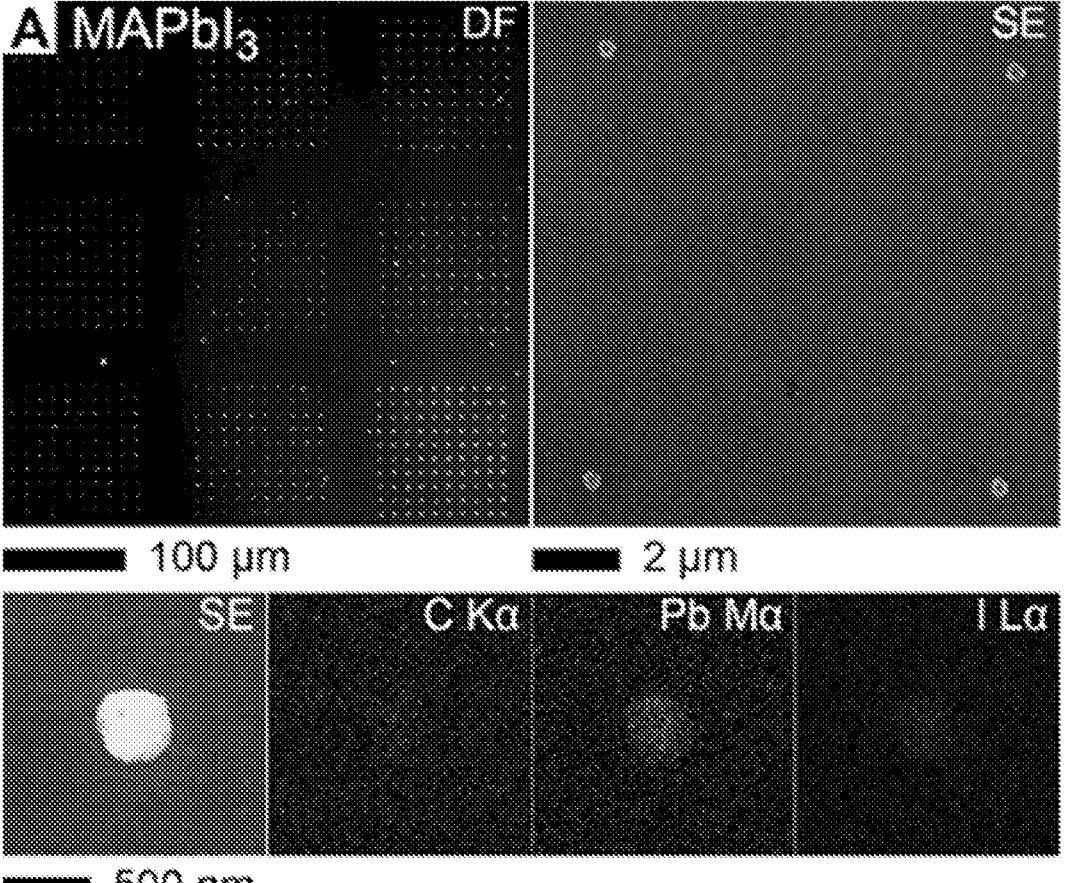
FIG. 23A is a characterization by optical dark field (DF) microscopy images, SEM images, and EDS elemental maps of $MAPbI_3$ nanocrystal arrays synthesized on fluoropolymer-modified ITO-coated glass.
Figure 23B:
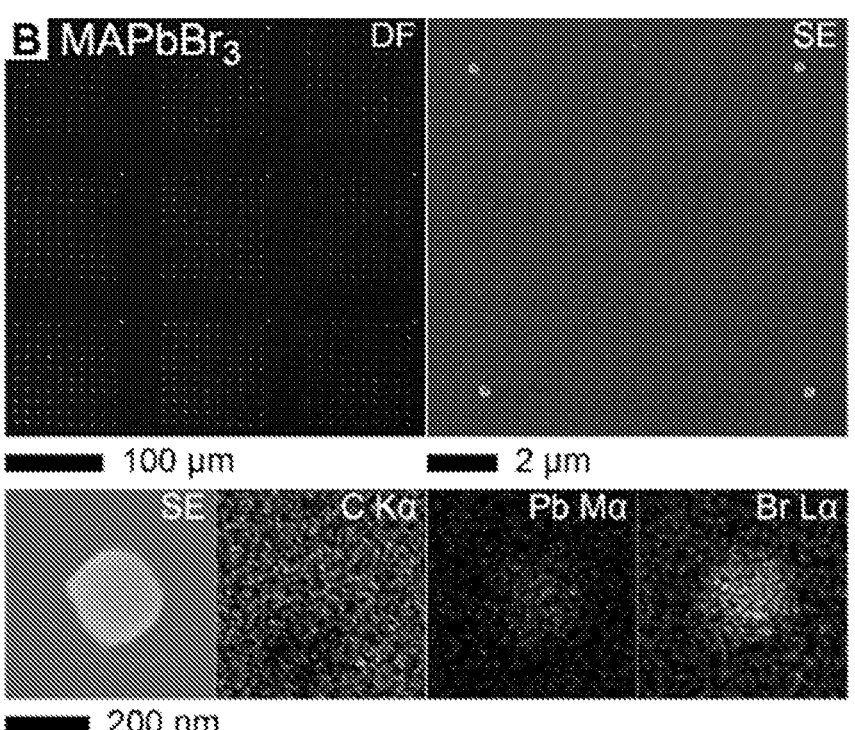
FIG. 23B is a characterization by optical dark field (DF) microscopy images, SEM images, and EDS elemental maps of $MAPbBr_3$ nanocrystal arrays synthesized on fluoropolymer-modified ITO-coated glass.
Figure 23C:
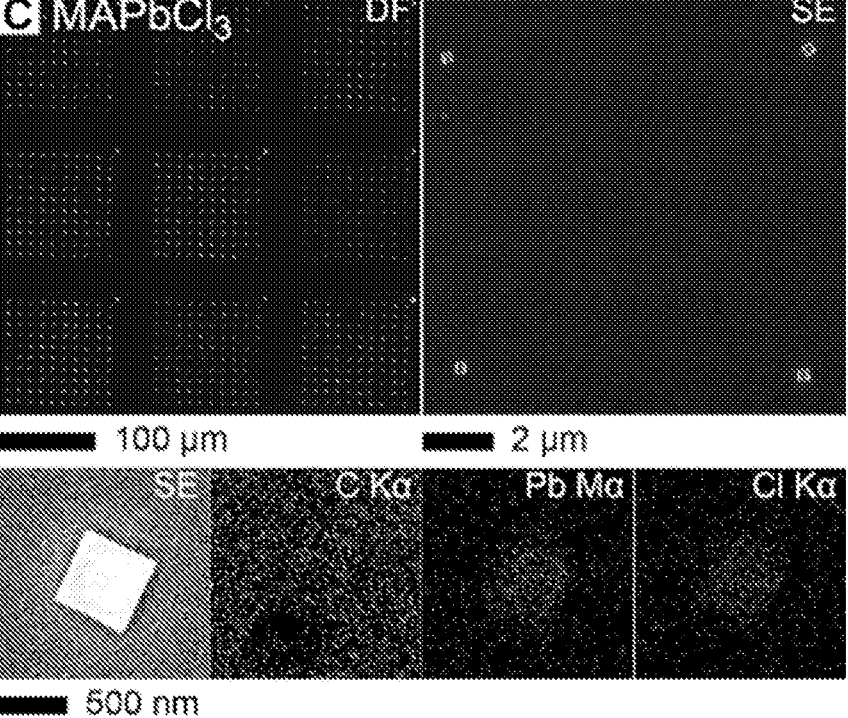
FIG. 23C is a characterization by optical dark field (DF) microscopy images, SEM images, and EDS elemental maps of $MAPbCl_3$ nanocrystal arrays synthesized on fluoropolymer-modified ITO-coated glass.
Figure 23D:
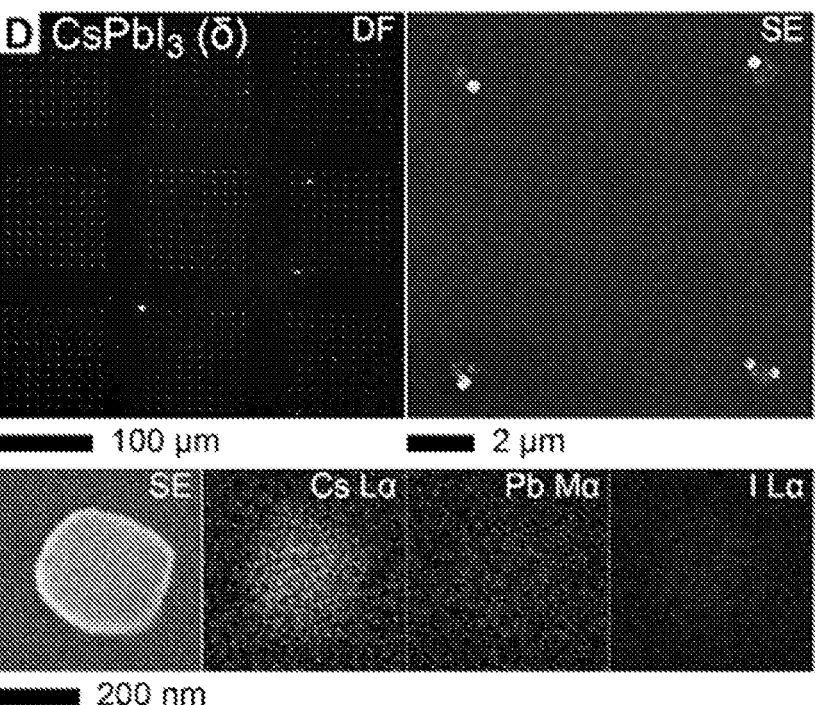
FIG. 23D is a characterization by optical dark field (DF) microscopy images, SEM images, and EDS elemental maps of dark-phase $\delta$-$CsPbI_3$ nanocrystal arrays synthesized on fluoropolymer-modified ITO-coated glass.
Figure 23E:
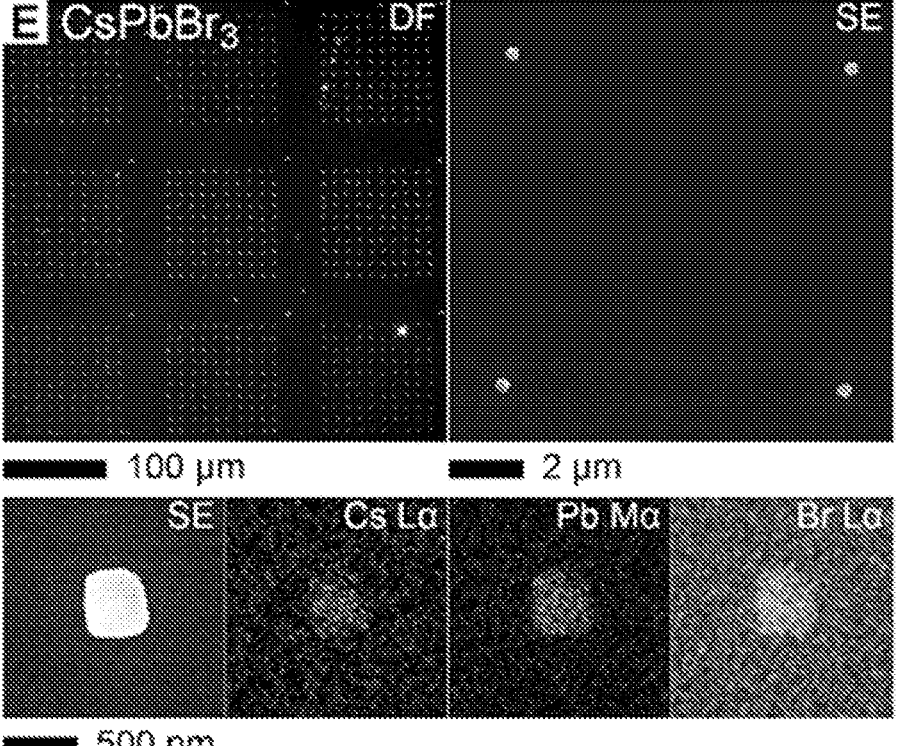
FIG. 23E is a characterization by optical dark field (DF) microscopy images, SEM images, and EDS elemental maps of $CsPbBr_3$ nanocrystal arrays synthesized on fluoropolymer-modified ITO-coated glass.
Figure 23F:
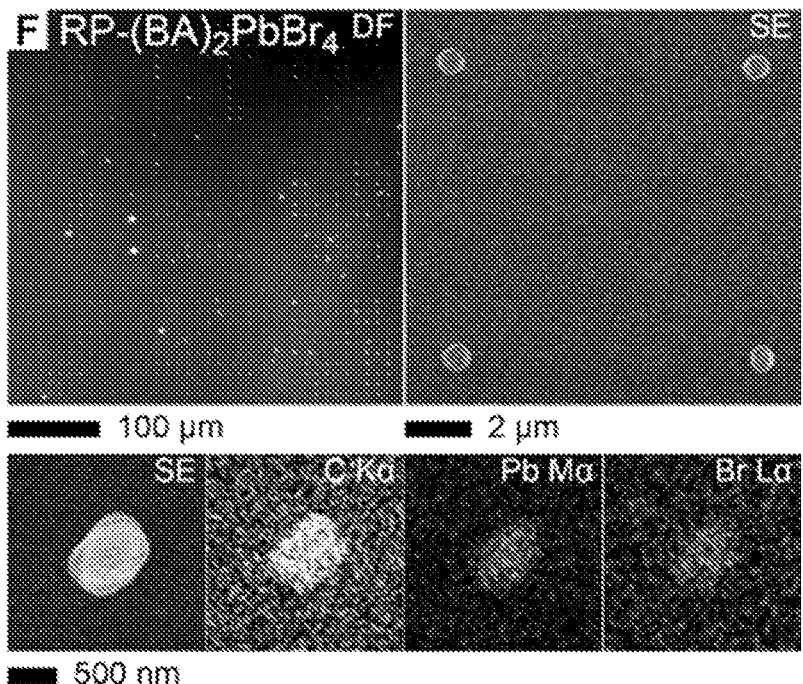
FIG. 23F is a characterization by optical dark field (DF) microscopy images, SEM images, and EDS elemental maps of layered Ruddlesden-Popper butylammonium lead bromide [$RP$—$(BA)_2PbBr_4$] nanocrystal arrays synthesized on fluoropolymer-modified ITO-coated glass.
Figure 23G:
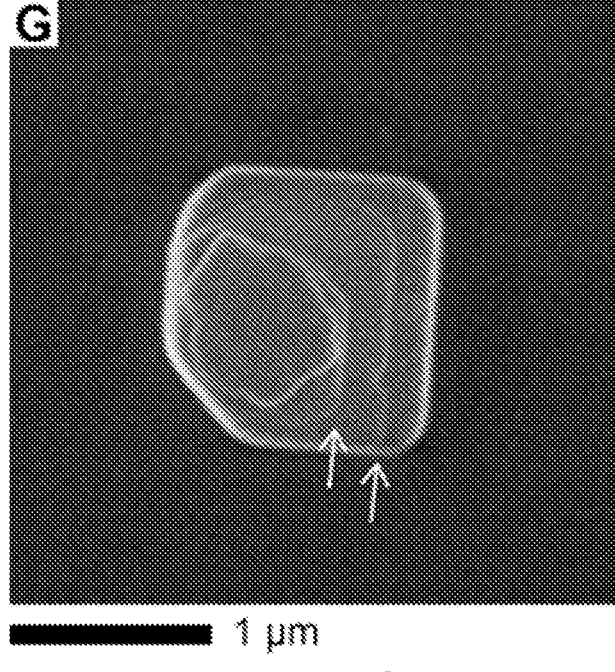
FIG. 23G is an SEM image of a layered $RP$—$(BA)_2PbBr_4$ nanocrystal with multiple steps on the surface (arrows)
Figure 23H:
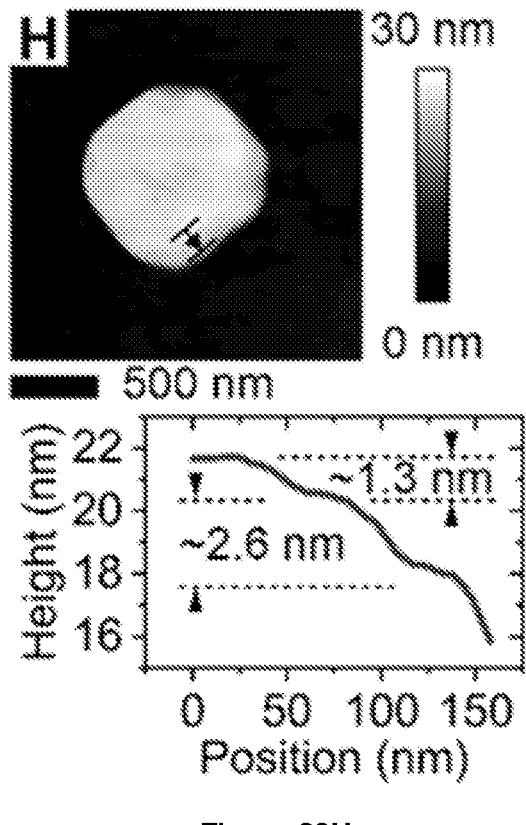
FIG. 23H is an AFM height image of a layered $RP$—$(BA)_2PbBr_4$ nanocrystal (upper panel) and step profile of the region indicated by the black lines (lower panel). Average height values along the parallel lines are given to minimize sampling inconsistency.

The methods of the disclosure can be used to form combinatorial libraries of halide perovskite nanocrystals. Combinatorial libraries of the disclosure can include an array of nanocrystals. The array can have a defined pattern and can have nanocrystals of different size, geometry, crystal structure, and/or composition. For example, as illustrated in FIGS. 23J, 25A and 25B, nanocrystals of different compositions can be patterned on a substrate to generate RBG pixel arrays. Any combination of features can be used to generate the combinatorial arrays. The arrays can be used in various applications including for example in optoelectronic devices, such as optical displays, photovoltaic devices, such as solar cells, LEDs, lasers, transistors, batteries, in photocataylsis, piezoelectric energy generators, and in screening methods and sensors.

In embodiments, the combinatorial library has halide perovskite nanocrystals having a substantially uniform size. In other embodiments, the combinatorial library has halide perovskite nanocrystals having a gradient of sizes. In still further embodiments, the combinatorial library has halide perovskite nanocrystals having various sizes arranged in a defined pattern.

In embodiments, the combinatorial library has halide perovskite nanocrystals having the same composition. In embodiments, the combinatorial library has two or more different compositions of halide perovskite nanocrystals.

In embodiments, the combinatorial library has halide perovskite nanocrystals having the same geometry. In embodiments, the combinatorial library has two or more halide perovskite nanocrystal geometries.

In any of the foregoing embodiments, combinations of features such as size difference, compositional differences, geometry differences or patterning can be combined in the combinatorial library.

In any of the foregoing embodiments, the nanocrystals can have a size of about 20 nm to about 1000 nm, about 20 nm to about 50 nm, or about 50 nm to about 100 nm. Other sizes of nanocrystals include about 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, 1000 nm. Larger crystal sizes than 1000 nm can be formed with the methods of the disclosure. However, the methods of the disclosure are particularly useful in forming small crystal sizes, which cannot be readily achieved with prior halide perovskite formation methods.

In any of the foregoing embodiments, the nanocrystals can have a geometry selected from plates, particles, rods, and core-shell structures. Without intending to be bound by theory, it is believed that the geometry of the nanocrystals can be adjusted through control of the solubility of the precursors in the ink, for example, by selection of the solvent or solvent system. For example, in embodiments, by selecting for the inks different solvents having different solubility of the precursors therein, the methods of the disclosure can be used to form a first perovskite nanocrystal, with a second perovskite nanocrystal being formed around the first perovskite nanocrystal like a heterostructure.

The halide perovskite precursors include at least one first perovskite precursor having the formula AX, and at least one second perovskite precursor having the formula $BX_2$, where is A is a cation and B is a cation, and X is one or more halogens. The ink formulation must include at least one first perovskite precursor and at least one second perovskite precursor. The ink can include any suitable number of first and/or second perovskite precursors.

In embodiments, the ink includes equimolar amounts of a first perovskite precursor and a second perovskite precursor. In embodiments, the ink includes a 2:1 ratio of the first perovskite precursor and the second perovskite precursor. In embodiments, for example, embodiments for producing a halide perovskite with two halogens, two first perovskite precursors and two second perovskite precursors could be used. For example a ratio of 2:3:2:3 first perovskite precursor of the first type:first perovskite precursor of the second type:second perovskite precursor of the first type:second perovskite precursor of the second type. For example a 2:3:2:3: ratio of MABr, MACl, $PbBr_2$, and $PbCl_2$ can be used in an ink to generate $MAPb(Br_{0.4}Cl_{0.6})_3$ nanocrystals.

In embodiments, the ink can be prepared to a target $ABX_3$ concentration. As demonstrated in the examples, the concentration of the ink can be used to control the nanocrystal size.

Selection of a suitable combination of precursors can be tailored to the ultimately desired halide perovskite. For example, if it the method is for forming a lead halide perovskite, B can be lead, and A can be the desired cation for the perovskite, for example, methylammonium (MA).

A can be either organic or inorganic. For example, A can be one or more of methylammonium, butylammonium, formamidinium, phenethylamine, 3-(aminomethyl)piperidinium, 4-(aminomethyl)piperidinium, cesium, and rubidium.

B can be a metal cation. For example, B can be one or more of lead, tin, europium, and germanium.

In embodiments, X can halogen, including any one or more of F, Cl, Br, and I. The halogen in the precursors can be the same or different depending on the halide structure desired.

The solvent can be one or more of one or more of dimethylformamide (DMF), dimethyl sulfoxide (DMSO), y-butyrolactone (GBL), and sulfolane. A combination of solvents can be used, for example, sulfolane and DMSO. For example, the sulfolane and DMSO can be combined in a solvent ratio of about 7:3. The solvent or combination of solvents is selected such that the halide perovskite precursor can be dissolved in the solvent. In embodiments, the solvent or solvent combination is further selected to have a low vapor pressure. Without intending to be bound by theory, it is believed that using solvents with low vapor pressure can improve the crystal quality.

The solvent can have a vapor pressure at 25° C. of 400 Pa or less, 380 Pa or less, or 360 Pa or less. For example, the vapor pressure at 25° C. can be about 50 Pa to about 400 Pa, about 56 Pa to about 380 Pa, about 100 Pa to about 300 Pa, about 50 Pa to about 100 Pa, or about 60 Pa to about 200 Pa. Other suitable vapor pressures at 25° C. can be about 50, 52, 54, 56, 58, 60, 65, 70, 75, 80, 85, 90, 95, 100, 110, 120, 130, 140, 150, 160, 170, 180, 190, 200, 210, 220, 230, 240, 250, 260, 280, 300, 310, 320, 330, 340, 350, 360, 370, 380, 390, or 400.

The solvent can have a viscosity of about 0.9 cP to about 10.1 cP, about 0.9 cP to about 5 cP, about 1 cP to about 8 cP, about 4 cP to about 10 cP. Other suitable amounts include about 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, 7, 7.2, 7.4, 7.6, 7.8, 8, 8.2, 8.4, 8.6, 8.8, 9, 9.2, 9.4, 9.6, 9.8, 10, and 10.1 cP.

The ink can be printed on any suitable substrate. For example, the substrate can be glass, ITO-coated glass, silicon, silicon oxide thin films, quartz, silicon nitride, or carbon. The substrate can be surface treated in embodiments. For example, the substrate can be surface treated with hexamethyldisilizane (HMDS), octadecyltrichlorosilane (OTS), or polyvinylcarbazole (PVK). In embodiments, the substrate can be treated with a fluoropolymer. For example, the substrate can be treated with a fluoropolymer by reactive ion etching from $CHF_3$. The fluoropolymer surface treatment can have one or more repeating units selected from CF, $CF_2$, and $CF_3$.

EXAMPLES

Microscopy

The inked pen arrays were imaged using an optical microscope (Zeiss Axio Imager M2) under both the dark-field (DF) and bright-field (BF) conditions with a halogen light source. To visualize the ink distribution on the pen arrays in 3D, inks labeled with Nile blue (10 μM) were spin-coated on the pen arrays and imaged using confocal fluorescence microscopy on a Zeiss LSM 800 [objective: 10×/0.30 air; pinhole size=1 Airy Unit (AU)].

Nanocrystal arrays were imaged using an optical microscope (Zeiss Axio Imager M2) under both dark-field (DF) and fluorescence microscopy conditions with a fluorescence LED illuminator (X-Cite, Excelitas Technologies) with or without pertinent optical filters. Multi-color nanocrystal arrays were imaged using confocal fluorescence microscopy on a Zeiss LSM 800 (objective: 10×/0.30 air or 20×/0.80 air; pinhole size=1 to 5 AU). The morphology and elemental distribution of the nanocrystals were characterized by scanning electron microscopy (SEM) on a Hitachi SU8030 equipped with a cold field emission gun (cFEG) operated at 1 kV to 15 kV and an energy-dispersive X-ray spectroscopy (EDS) silicon drift detector (SDD) (X-MaxN, Oxford Instruments). The projected size of the particles were measured from SEM images using an automated algorithm described in a previous report C. R. Laramy, K. A. Brown, M. N. O'Brien, C. A. Mirkin, High-throughput, algorithmic determination of nanoparticle structure from electron microscopy images. *ACS Nano* 9, 12488-12495 (2015). Transmission electron microscopy (TEM) and electron diffraction were performed on a JEOL JEM-ARM300F equipped with a cFEG operated at 300 kV and a Gatan OneView CMOS camera. Simulated electron diffraction was generated using the SingleCrystal package (CrystalMaker Software, Ltd.) based on a published crystal structure. F. Brivio, A. B. Walker, A. Walsh, Structural and electronic properties of hybrid perovskites for high-efficiency thin-film photovoltaics from first-principles. *APL Mater.* 1, 042111 (2013). AFM was performed on a Bruker Dimension Icon in tapping mode (probe k=42 N/m).

Single-Nanocrystal Photoluminescence Measurements

High-resolution photoluminescence (HRPL) was performed on a modified confocal Raman spectrometer (HORIBA LabRAM HR Evolution) with an excitation laser wavelength of 473 nm or 532 nm. In vacuo and low-temperature PL measurements were performed on a home-built confocal microscope setup equipped with a 100× objective lens with a numerical aperture (NA) of 0.60 (Nikon T-PLAN SLWD 100×), an excitation laser operated at 442 nm (Kimmon Koha IK5451R-E He—Cd laser), and the samples were loaded in a cryostat (Advanced Research Systems DE-202 cryostat with optical access). Motorized micrometers (one-axis motorized translation stage) were used for 2D scanning capabilities. PL spectra were captured on spectrometers with homebuilt scanning and collection software (Shamrock SR-750, Shamrock SR-303, and iDUS DU420A camera unit, software built in LabVIEW). The He—Cd laser unit was operated at 320 nm for UV-excitation on a similar setup with UV-compatible mirrors and a UV fused silica aspheric lens. Time-resolved PL (TRPL) was performed on a PicoQuant FluoTime 300 spectrometer connected to a Zeiss Observer Z1m inverted microscope through optical fibers and a diode pulse laser (PicoQuant LDH-P—C-440M) operated at 440 nm was the excitation source.

Single-Nanocrystal Photovoltaics

A single-nanocrystal solar cell was assembled based on a hole transporter-free design (47). Briefly, $MAPbBr_3$ nanocrystals were synthesized on ITO-coated glass modified using HMDS. An in situ light-illuminated AFM was built based on a Bruker Dimension Icon with a customized transparent stage allowing for LED light (455 or 530 nm) to illuminate the sample (FIG. S24). Conductive Pt/Ir-coated AFM probes were used in contact mode to close the circuit. The voltage/current curves were measured both with and without illumination. For each curve, the height of the AFM probe was adjusted to compensate for any probable height change.

Example 1: Synthesis of Halide Perovskite Nanocrystal Arrays

Methylammonium lead halide perovskite nanocrystal arrays were synthesized by a method in accordance with the disclosure. Dimethyl sulfoxide (DMSO) and sulfolane were mixed to form a homogenous solution, with a volume ratio of DMSO to sulfolane of 7:3. Equimolar amounts of precursor MABr and $PbBr_2$ powders were dissolved in the solvent solution to a target concentration of 0.1 M in terms of $ABX_3$. The mixture was stirred overnight to form an ink. The ink had low volatility and remained stable on the pen arrays for at least an hour of continuous patterning.

ITO-coated glass substrates were modified by overnight enclosure in a chamber with vials containing a hexamethyldisilazane (HMDS)/hexane mixture (volume ratio 1:1) or by depositing fluoropolymers from $CHF_3$ in a reactive ion etching process. (FIGS. 30 and 31). The surface treatment prevented spread of the solvent droplets, which was found to be useful for formulation of individual crystals in each nanoreactor.

Polydimethylsiloxane (PDMS) pen arrays were fabricated following the published protocol in D. J. Eichelsdoerfer, X. Liao, M. D. Cabezas, W. Morris, B. Radha, K. A. Brown, L. R. Giam, A. B. Braunschweig, C. A. Mirkin, Large-area molecular patterning with polymer pen lithography. *Nat. Protoc.* 8, 2548-2560 (2013). The pen array was loaded onto a piezo scanner of an atomic force microscope (AFM, NX Series, Park System, Inc.) or a desktop nanopatterning instrument (TERA-Fab M series, TERA-print, LLC). The pen array was leveled to be parallel to the substrate and then removed from the instrument, treated by oxygen plasma, and spin-coated with the ink at a spin speed of 2000-3000 rpm for 1 min. The pen array was then returned to the instrument, brought into contact with the substrate, and extended a certain z-piezo extension length (extension length, $L_E$), to thereby deposit the ink onto the substrate as a pattern of printed indicia. The printed indicia formed nanoreactors upon retraction of the of the pen array. The solvent was allowed to evaporate from the nanoreactors under atmospheric conditions to form individual halide perovskite nanocrystals in each nanoreactor, the resulting array of halide perovskite nanocrystals having a pattern corresponding to the pattern of printed indicia.

FIG. 2A illustrates the polymer pen array after coating with the ink. The liquid organic ink accumulates around the base of each pyramidal tip due to the high surface tension and low viscosity of the ink. This can serve as a reservoir for continuous inking.

Figure 2C:
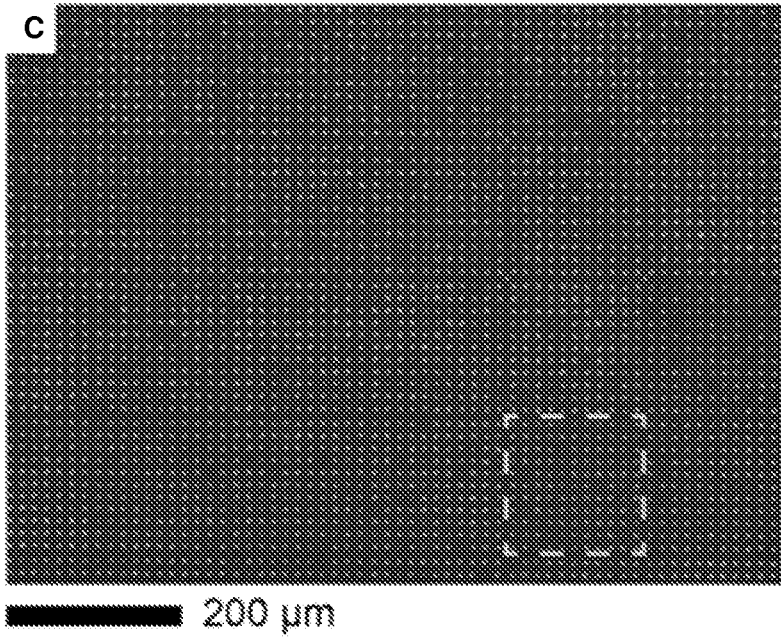
FIG. 2C is a fluorescence micrograph of a uniform $MAPbBr_3$ nanocrystal dot array on a HMDS-modified Si wafer. Dashed box denotes a pattern generated by one polymer pen.
Figure 2D:
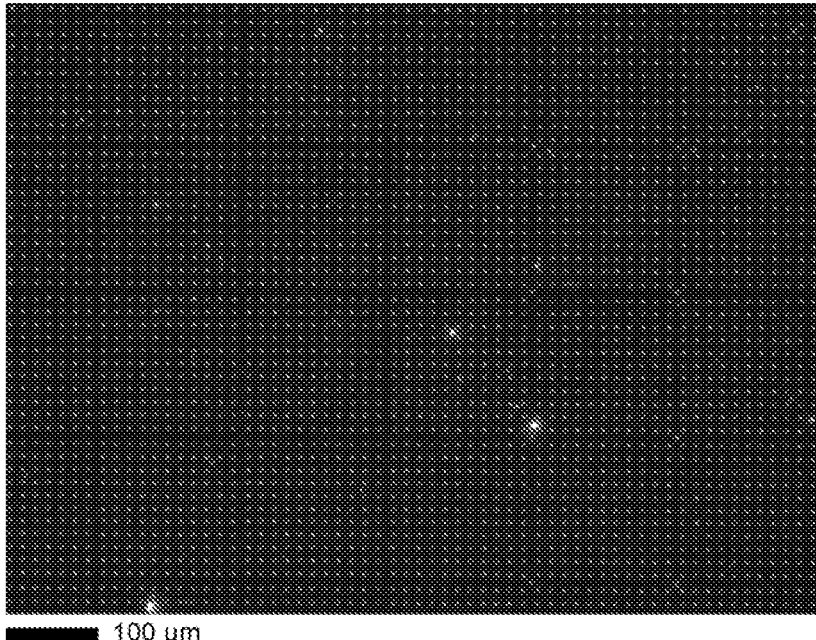
FIG. 2D is a dark field micrograph of the uniform $MAPbBr_3$ nanocrystal dot array of FIG. 2C.
Figure 2E:
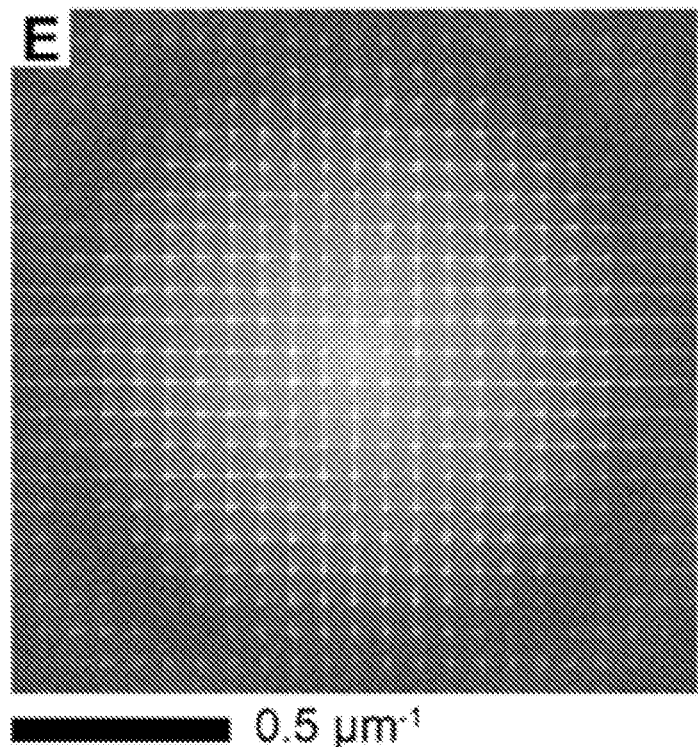
FIG. 2E is a Fourier transform of the micrograph of FIG. 2C.

FIG. 2B illustrates the nanoreactors formed on the substrate. FIG. 2C illustrates the resulting $MAPbBr_3$ halide perovskite nanocrystals. Each PDMS pyramidal pen created 121 crystals covering an area of about 0.024 $mm^2$, which is shown by the dashed box in FIG. 2C. $MaPbBr_3$ nanocrystals exhibit strong photoluminescence as shown in FIG. 2D. The entire substrate was covered with a highly ordered, periodic array as shown in the Fourier transform of the fluorescence micrograph in FIG. 2E.

Figure 2F:
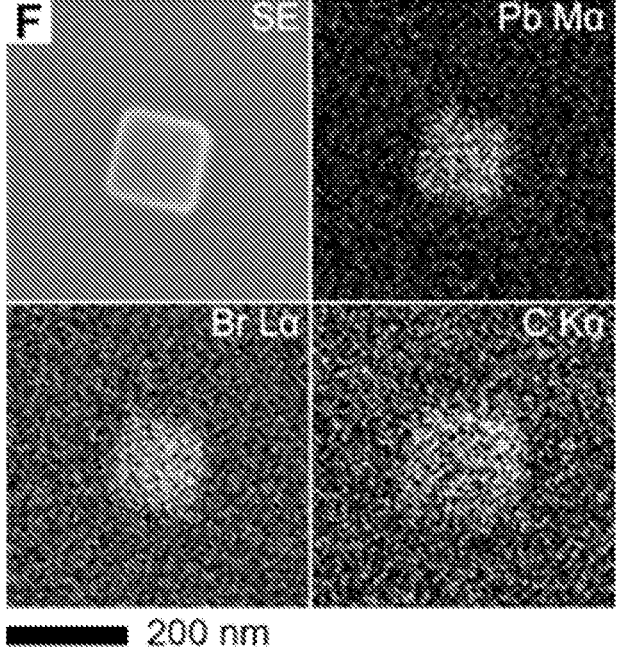
FIG. 2F is a scanning electron microscope (SEM) image and energy dispersive spectroscopy (EDS) maps of a single nanocrystal.
Figure 2G:
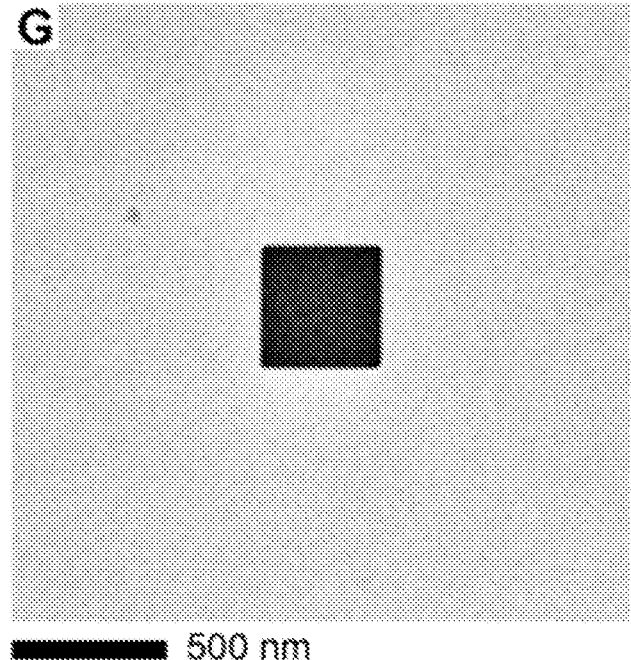
FIG. 2G is a transmission electron micrograph (TEM) image of a nanocrystal.
Figure 2H:
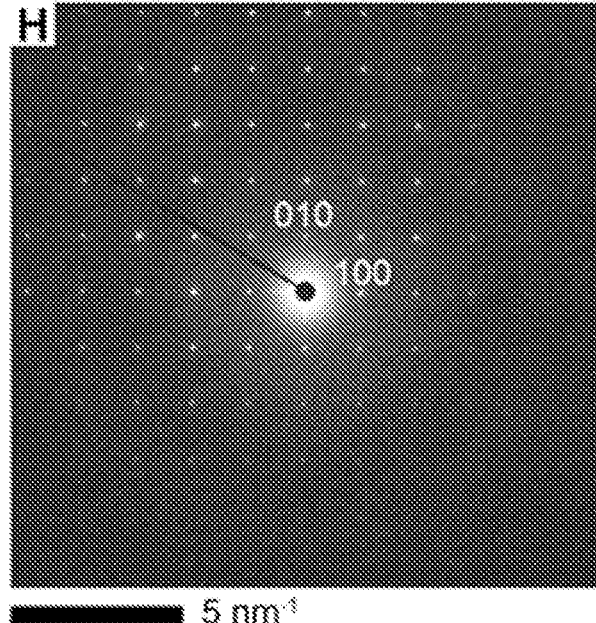
FIG. 2H is an experimental electron diffraction pattern along the [001] zone axis of the nanocrystal of FIG. 2G.

The morphology and chemical composition of the nanocrystals were determined using scanning electron microscope (SEM) and energy-dispersive X-ray spectroscopy (EDS) elemental mapping as illustrated in FIG. 2F. FIG. 2F illustrates that Pb and Br were uniformly distributed throughout the individual nanocrystals. FIGS. 2G and 2H are transmission electron microscope imaging and selected-area electron diffraction (SAED), respectively, which confirmed that the nanocrystals were single-crystalline. The SAED pattern along the [001] zone axis, along which a rectangular projection was observed for the nanocrystal, matched the simulated diffraction pattern for a cubic perovskite structure (FIG. 2I).

FIGS. 3A and 3B are atomic force microscopy images of the nanocrystals, illustrating that they had a typical width-to-height ratio of about 3:1. FIG. 3D is a cross-sectional height profile of the two nanocrystals shown in FIGS. 3A and 3B in two orthogonal directions. The upper panel is the nanocrystal shown in FIG. 3A and the lower panel is the nanocrystal shown in FIG. 3B. FIG. 3D is a large-area AFM image and FIG. 3E is a threshold filtered image for particle statistics (filtered pixels in cyan). For the 25 features in these figures, the mean (±standard deviation) height was 78.6±21.7 nm, and the mean diameter was 205.7±23.0 nm. Due to the varying particle orientations and limited resolution in large-area AFM scans, these numbers are considered to be a rough reflection of the particle size distribution.

Bulk crystals were formed by drop-casting the inks onto a substrate and used for reference spectra. The drop-cast inks were allowed to evaporate under atmospheric conditions resulting in large crystals.

Examples 2: Tuning Crystal Size

In addition to controlling the location of individual nanocrystals, the methods of the disclosure also enable control of the crystal size by controlling the precursor concentration in the ink and/or the z-piezo extension length of the polymer pen array against the substrate.

Figure 4A:
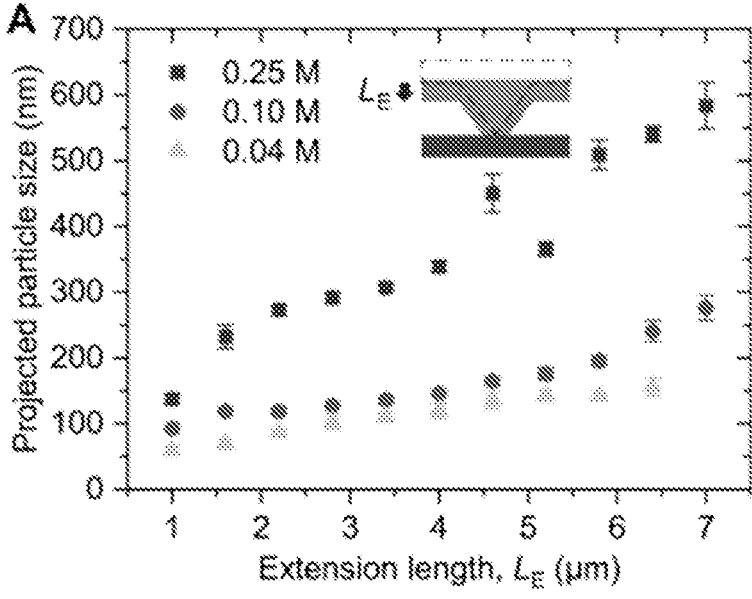
FIG. 4A is a graph showing the size of nanocrystals synthesized from an individual polymer pen as a function of initial ink concentration and extension length on an HMDS-modified Si wafer. Particles sizes were defined as the square root of the projected areas from SEM images. Error bars represent standard deviations. The extension length $L_E$ was controlled by an atomic force microscope (AFM)

The method as described in example 1 was used except the concentration of the precursors in the ink were varied and/or the z-piezo length extension was varied as detailed below. FIG. 4A is a graph illustrating the effects of extension length and ink concentration on particle size.

The inks were prepared by dissolving equimolar amounts of MABr and $PbBr_2$ powders to achieve a target concentration of 0.04, 0.1, or 0.25 M in terms of $MAPbBr_3$.

Figure 4B:
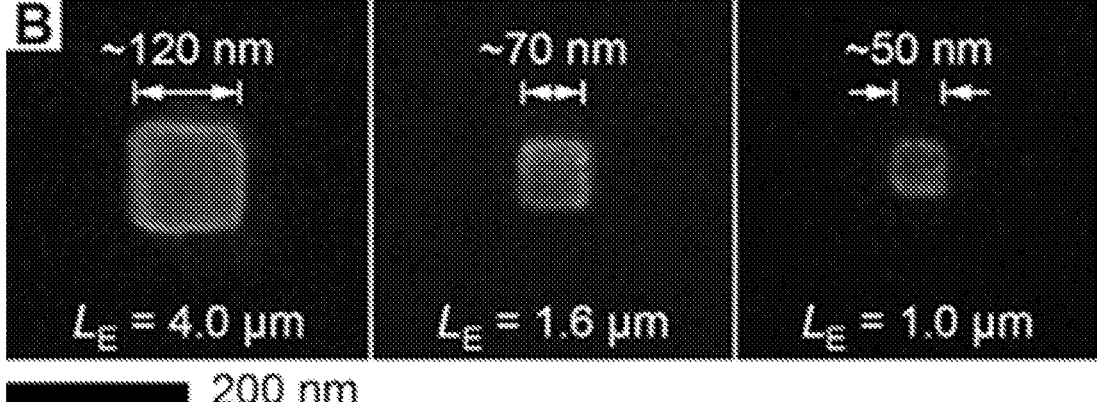
FIG. 4B is SEM images of nanocrystals synthesized using 0.04 M ink and various extension lengths. The smallest nanocrystals were ~50 nm as determined by SEM.

Referring to FIG. 4B, using an initial ink concentration of 0.04 M and extending the polymer pen array only 1 μm resulted in formation of about 50 nm MAPbBr$_3$ nanocrystals. Increasing the extension length increased the crystal size, with an extension of 4 μm resulting in 120 nm MAPbBr$_3$ nanocrystals. It is believed that nanocrystals having a size of less than 50 nm can be made by the methods of the disclosure, but characterization of the structures is difficult using microscopy techniques.

Figures 5, 6A, 6B, 6C:
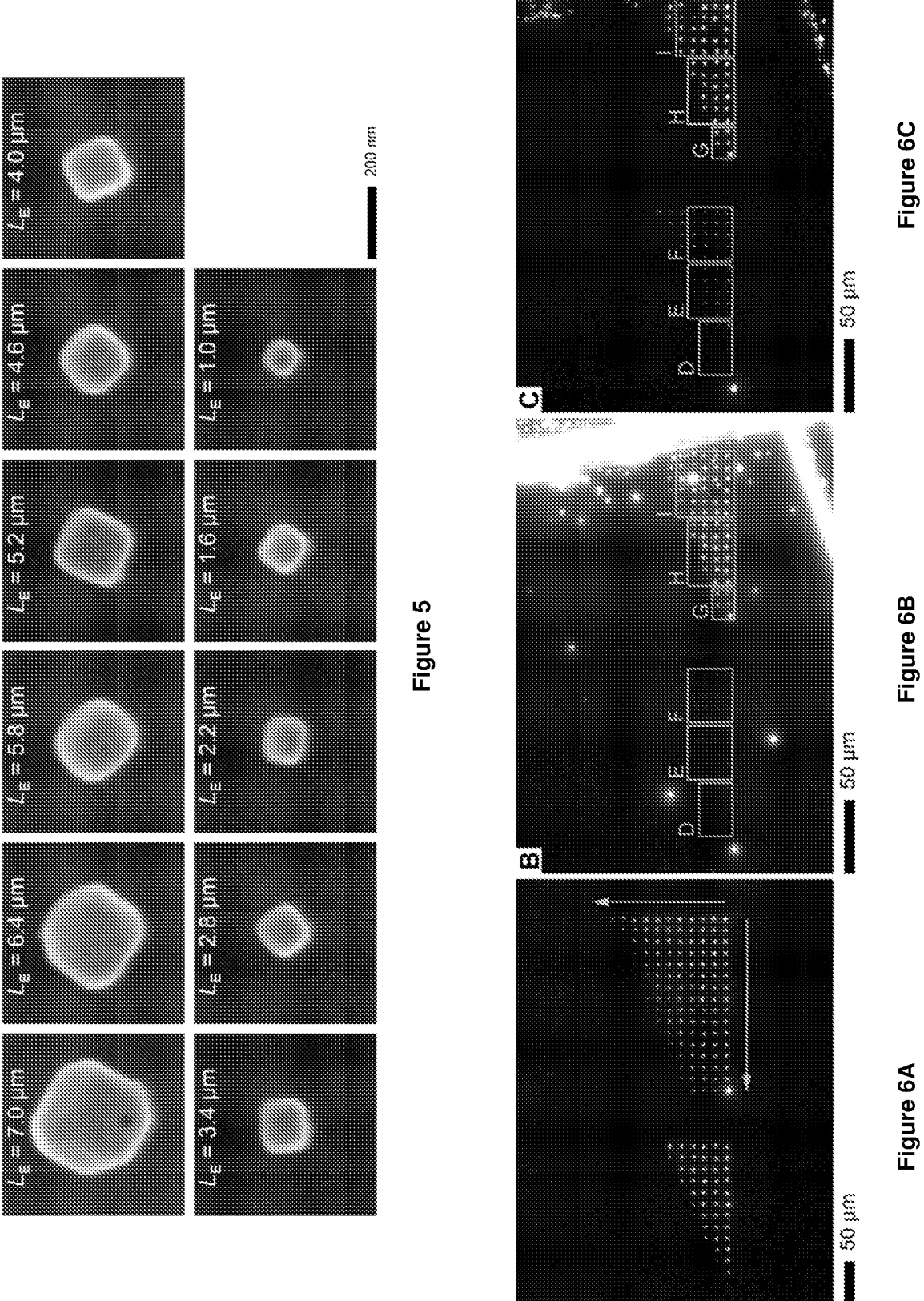
FIG. 5 is SEM images of MAPbBr$_3$ nanocrystals where the size of the nanocrystals was controlled by tuning the extension length, $L_E$, during nanoreactor deposition. Initial ink concentration was 0.1 M in sulfolane/DMSO (volume ratio 3:7). All images share the same scale bar of 200 nm.
FIG. 6A is fluorescence micrograph of a double size-gradient MAPbBr$_3$ nanocrystal array with arrows pointing in the direction of decreasing extension length, $L_E$, with the lowest in the upper left corner and highest in the lower right corner. The difference in the number of features between the patterns from two adjacent polymer pens was due to the intrinsic height variation between the pens (on the order of 1 μm)
FIG. 6B is a dark field micrograph of two arrays close to scratches on the substrate (bright feature on the right). The pattern adjacent to the scratch has significantly larger particle sizes, which is believed to be due to the damaged substrate and debris, but still showed a high single-nanocrystal yield.
FIG. 6C is a fluorescent image of the two arrays of FIG. 6B.
Figures 6D, 6E, 6F, 6G, 6H, 6I:
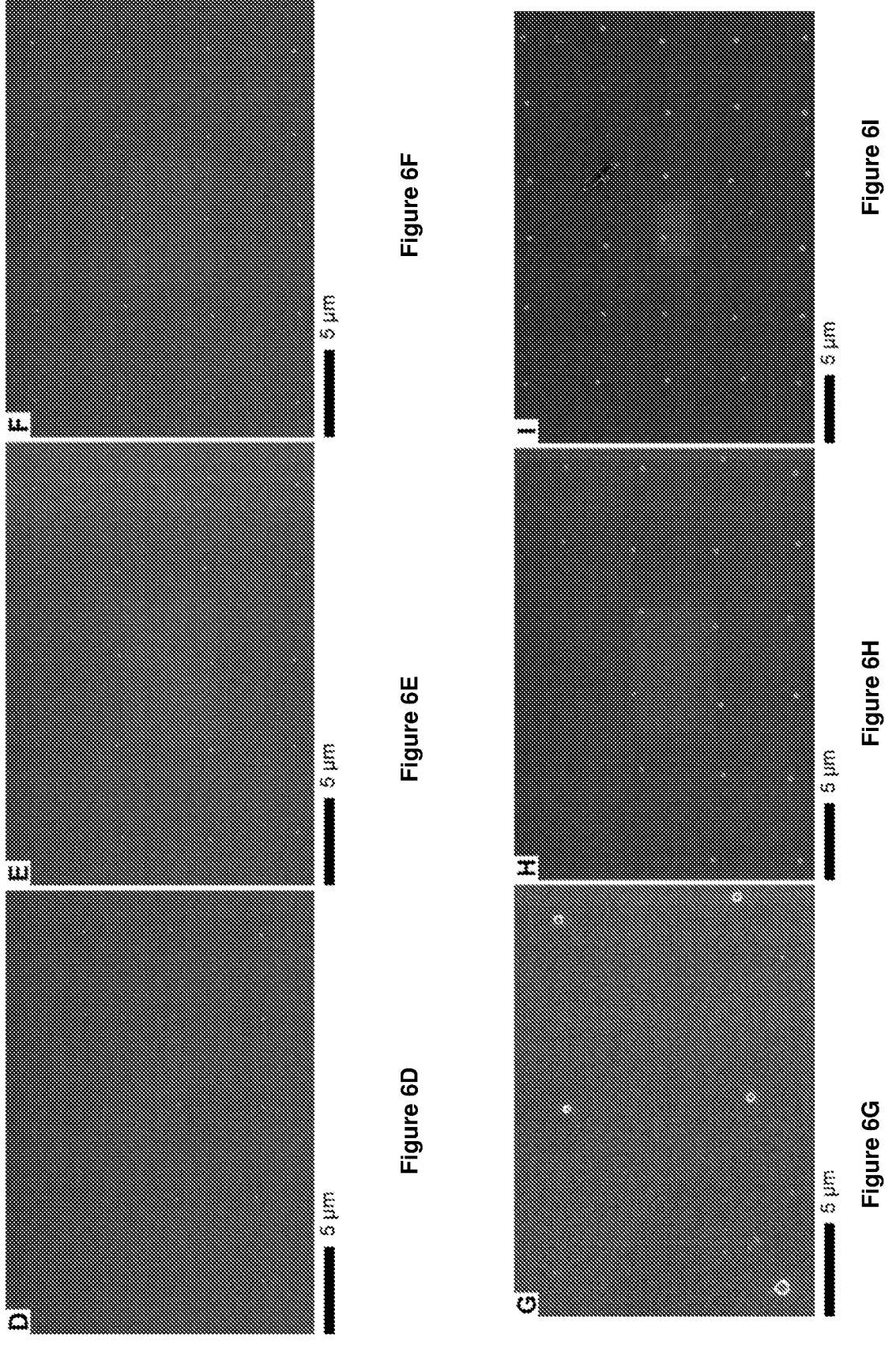
FIGS. 6D to 6I are SEM images of nanocrystals in areas labeled in FIGS. 6B and 6C. Rectangles of bright contrast in the middle of each image are due to electron beam-induced carbon deposition that occurred during focusing.

FIG. 5 are SEM images of MAPbBr$_3$ nanocrystals formed with controlled crystal size by tuning the extension length, $L_E$, during deposition. The ink concentration was 0.1 M in a sulfolane/DMSO (volume ratio 3:7).

FIGS. 6A to 6H illustrate double size-gradient MAPbBr$_3$ nanocrystal arrays. The ink concentration was 0.1 M. The size gradient was generated by a gradient of the length extension from 7 to 0 μm from the bottom right corner to the top left corner, following the indication of the arrows. FIG. 6A is a fluorescence micrograph with the arrows pointing in the direction of decreasing extension length, $L_E$. The extension length is lowest in the upper left corner and highest in the lower right corner. The difference in the number of features between the patterns from two adjacent polymer pens was due to the intrinsic height variation between the pens, which is on the order of 1 μm. FIG. 6B is a dark-field micrograph and FIG. 6C is a fluorescence micrograph of two arrays printed near scratches on the substrate (bright feature on the right). The pattern adjacent to the scratch has significantly larger particle sizes. It is believed that this is due to the damaged substrate and debris. However, a single nanocrystal was still formed. FIGS. 6D to 6I are SEM images of the areas labeled in FIGS. 6B and 6C. Rectangles of bright contrast in the middle of each image were due to electron beam0induced carbon deposition that occurred during focusing.

Figures 7A, 7B, 7C, 8A, 8B, 8C:
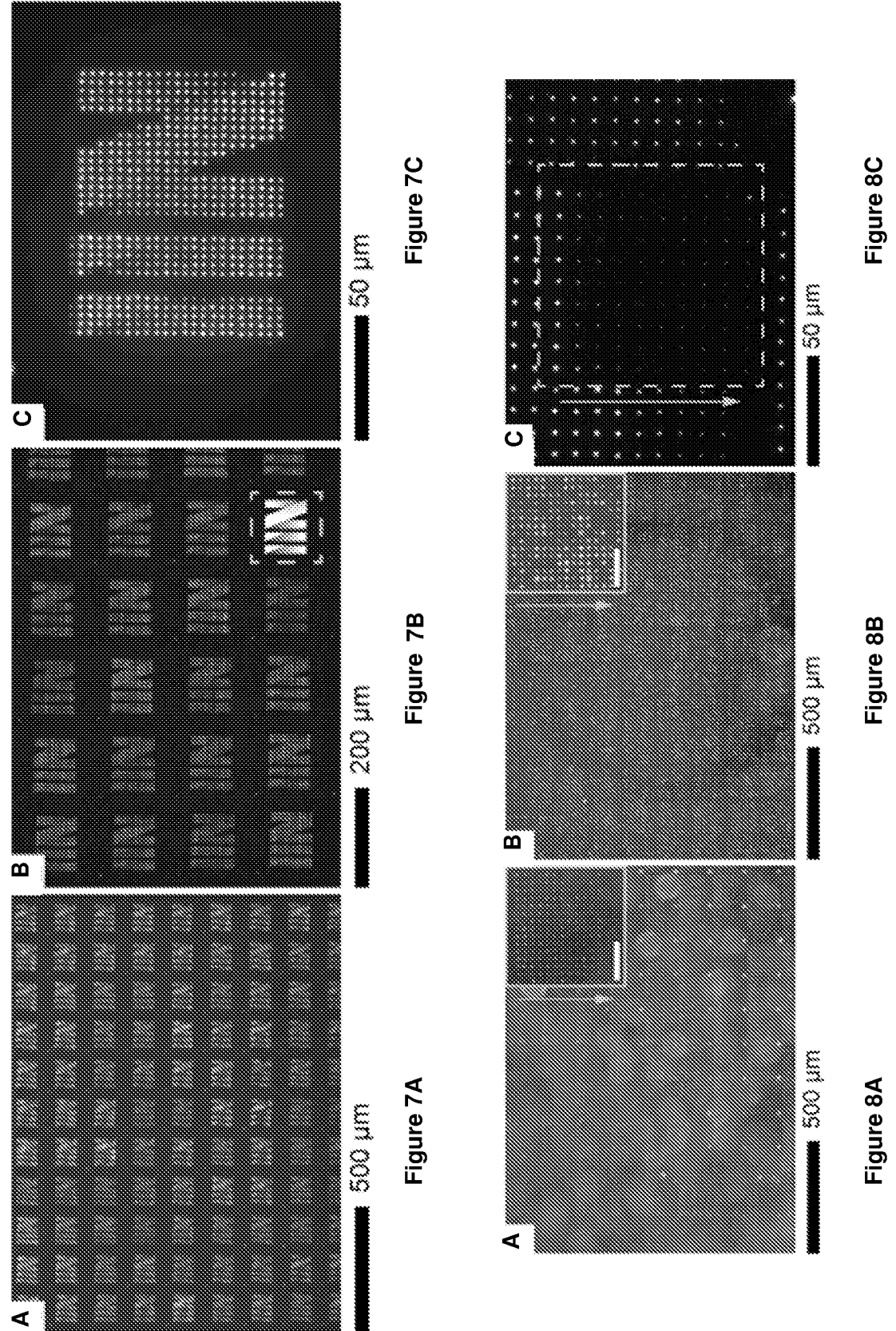

Referring to FIGS. 7A-7C, it was found that the photoluminescence intensity scaled as a function of nanocrystal size. Tuning of the size of the nanocrystals using concentration and/or extension length can allow for creating grayscale images at the microscale. In FIGS. 7A to 7C, the pen array was selectively inked to form the pattern "IIN." The nanocrystals were formed on an HMDS-modified Si wafer. The inset in FIG. 7B illustrates the original grayscale pattern design. The extension length was generated based on the pixel brightness of the original pattern ranging from 7 to 0 μm. The ink concentration was 0.1 M.

Example 3: Patterning on Multiple Substrates

The methods of the disclosure can be used to pattern on a variety of substrates. FIGS. 8A to 8C illustrate patterning on different structures. In this example, the ink was the same as used in Example 1. FIG. 8A illustrates patterning on an ITO-coated glass, FIG. 8B illustrates patterning on a glass slide, and FIG. 8C illustrates patterning on a silicon nitride thin film. In FIG. 8C, the dashed box outlines the freestanding silicon nitride (thickness=15 nm). In each figure, the arrow indicates the direction of decreasing $L_E$ for each polymer pen array. The insets in FIGS. 8A and 8B are magnified images of an array generated by one polymer pen array.

Figures 9A, 9B, 9C, 9D, 9E, 9F:
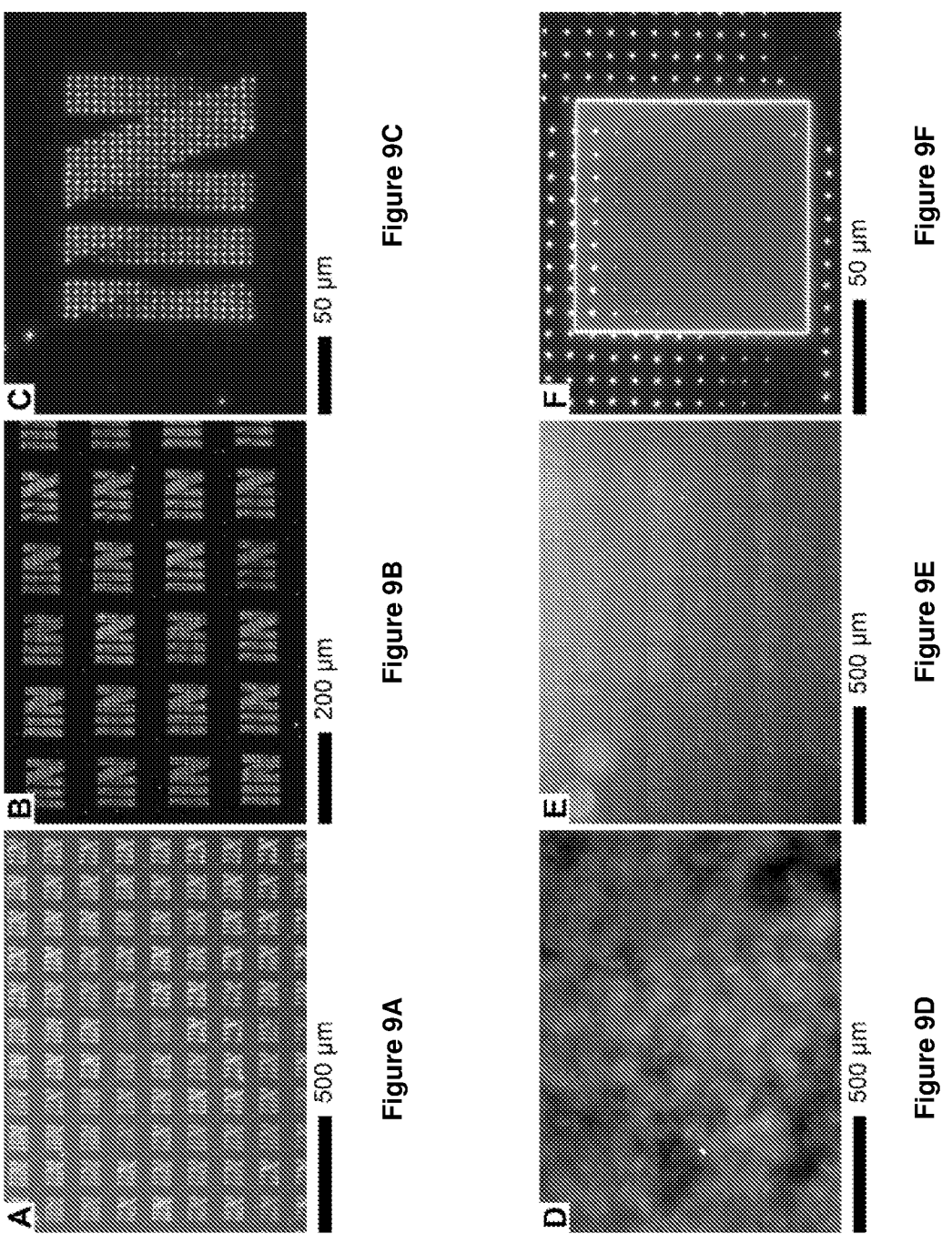
FIGS. 9A-9C are dark field micrographs showing grayscale patterning of MAPbBr$_3$ nanocrystals on an HMDS-modified Si substrates.
FIG. 9D is a dark field micrograph showing grayscale patterning of MAPbBr$_3$ nanocrystals on an HMDS-modified ITO-coated glass.
FIG. 9E is a dark field micrograph showing grayscale patterning of MAPbBr$_3$ nanocrystals on an HMDS-modified glass slide.
FIG. 9F is a dark field micrograph showing grayscale patterning of MAPbBr$_3$ nanocrystals on an HMDS-modified silicon nitride.

FIGS. 9A-9F are dark-field micrographs showing grayscale patterning of MAPbBr$_3$ nanocrystals on various HMDS-modified substrates. FIGS. 9A to 9C illustrate patterning on HMDS modified Si wafers. FIG. 9D illustrates patterning on ITO-coated glass. FIG. 9E illustrates patterning on a glass slide. FIG. 9F illustrates patterning on a silicon nitride thin film. The ink was the same as used in Example 1.

Figures 10A, 10B:
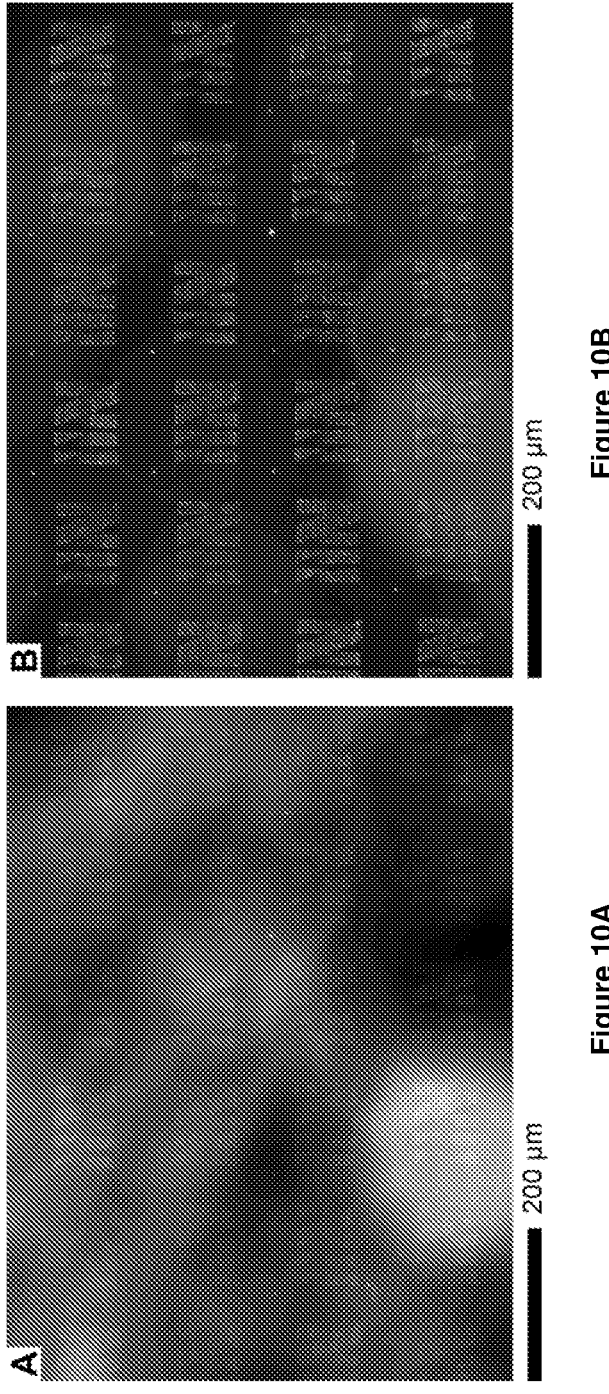
FIG. 10A is a dark-field micrograph of grayscale patterning of the "IIN" logo with MAPbBr$_3$ nanocrystals on HMDS-modified ITO-coated glass.
FIG. 10B is a fluorescence micrograph of grayscale patterning of the "IIN" logo with MAPbBr$_3$ nanocrystals on HMDS-modified ITO-coated glass.
Figure 10C:
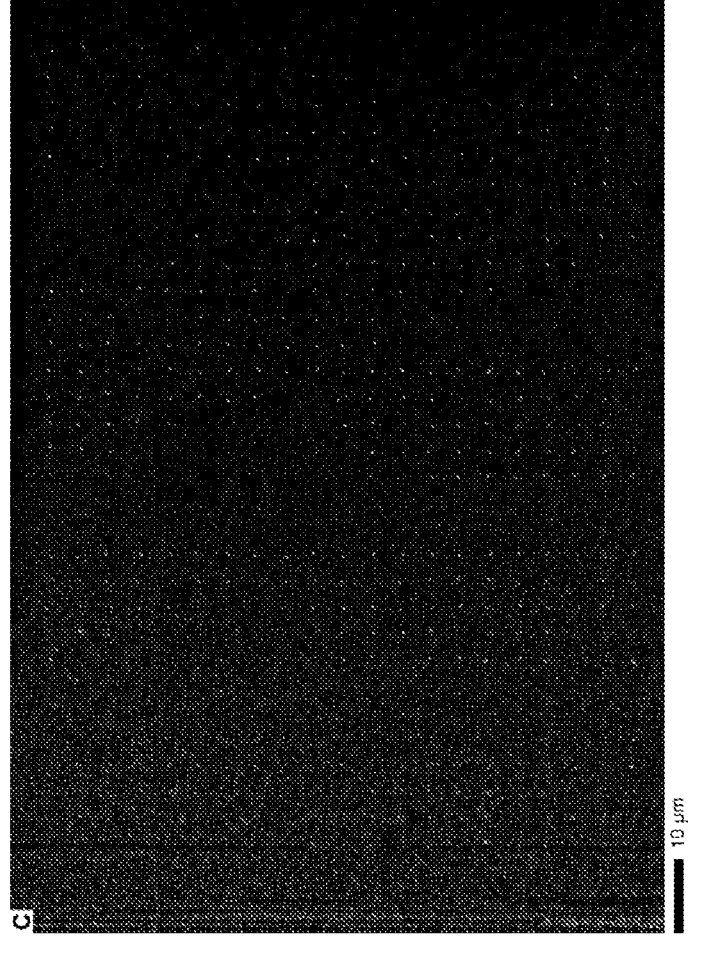
FIG. 10C is an SEM image of grayscale patterning of the "IIN" logo with MAPbBr$_3$ nanocrystals on HMDS-modified ITO-coated glass.

It was found that single nanocrystal per site yield and corresponding crystal quality was affected by the roughness of the substrate. Referring to FIGS. 10 and 11, for ITO with a root mean square (RMS) roughness ($R_g$) of 2.97 nm, multiple particles in each nanoreactor were typically observed, whereas ITO substrates with an $R_g$ of 0.62 nm had a single-particle yield close to 100%. Further, it was found that while large-area patterning with a controlled size gradient was possible on glass slides (FIG. 9E); the photoluminescence of these particles was non-uniform suggesting poor crystal quality (FIG. 8B).

FIGS. 30A-30C illustrates contact angle measurement of water on ITO-coated glass after different surface treatments. ITO was treated with HMDS, octadecyltrichlorosilane (OTS), and CHF$_3$. FIG. 30A is optical images of a water droplet on the surface. FIG. 30B illustrates the contact angle values for different surface treatments, and FIG. 30C is a graph of the water contact angle as function of reactive ion etching time in a CHF$_3$ atmosphere which functionalized the ITO-coated glass with fluoropolymers. FIG. 31 shows the effect of fluoropolymer functionalization on surface roughness of the ITO-coated glass, characterized by AFM. FIG. 31A shows the pristine substrate, which had a surface roughness of 0.60 nm, and FIG. 31B shows the substrate functionalized with fluoropolymers, which had a surface roughness of 0.64 nm. Surface roughness was calculated from the scans acquired under identical conditions—512× 512 pixels over a 5×5 μm area.

FIG. 32 shows large-area organic-inorganic halide perovskite nanocrystal arrays characterized by dark-field imaging. The arrays were formed using the protocol of example 1, but on a fluoropolymer modified ITO-coated glass, and with appropriate precursors for printing MAPBI$_3$ (FIG. 32A), MAPbBr$_3$ (FIG. 32B), and MAPbCl$_3$ (FIG. 32C).

FIG. 33 illustrates size-gradient MAPbCl$_3$ nanocrystal arrays synthesized on a fluoropolymer-modified ITO coated glass. FIG. 33A is an SEM image showing an array with decreasing crystal size from top to bottom. The white arrow indicates where two nucleation centers emerged during the crystallization, which is a rare occurrence. FIG. 33B is a higher-magnification SEM image showing the rectangular shape of the nanocrystals. Interparticle spacing was about 2 μm.

Example 4: Solvent Effect

Figures 12A, 12B, 12C, 12D:
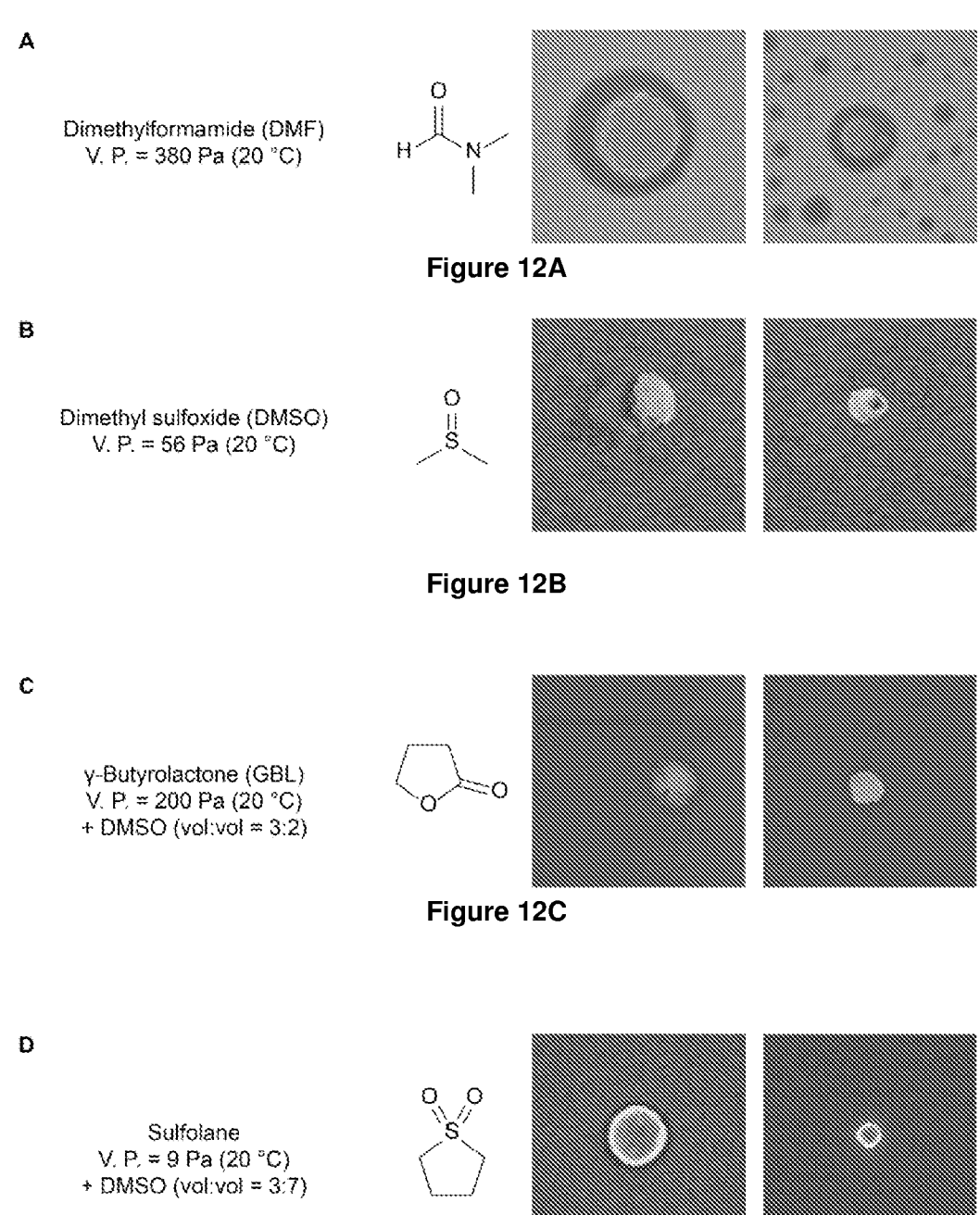
FIG. 12A is an SEM image of an MAPbBr$_3$ nanocrystal formed from an ink having dimethylformamide (DMF) solvent, the structure of DMF and vapor pressure is also shown.
FIG. 12B is an SEM image of an MAPbBr$_3$ nanocrystal formed from an ink having dimethyl sulfoxide (DMSO) solvent, the structure of DMSO and vapor pressure is also shown.
FIG. 12C is an SEM image of an MAPbBr$_3$ nanocrystal formed from an ink having γ-butyrolactone (GBL) and DMSO as a solvent system, the structure of GBL and vapor pressure is also shown.
FIG. 12D is an SEM image of an MAPbBr$_3$ nanocrystal formed from an ink having sulfolane and DMSO as a solvent system, the structure of sulfolane and vapor pressure is also shown.

The solvent used in the ink was also found to affect crystal quality. Nanocrystals were formed using the ink of example 1, except the solvent system was varied. As detailed below, the solvent system was selected from dimethylformamide (DMF) (FIG. 12A), dimethyl sulfoxide (DMSO) (FIG. 12B), the combination of γ-Butyrolactone (GBL) and DMSO (vol ratio of 3:2) (FIG. 12C), and the combination of sulfolane and DMSO (vol ratio=3:7) (FIG. 12D).

Inks having a combination of DMSO and sulfolane was found to generate nanocrystals having the best quality. Without intending to be bound by theory, it is believed that the low volatility of the solvent system was beneficial to producing higher quality crystals.

Example 5: Size Dependence of Single-Nanocrystal Photoluminescence Emission

To understand the photoluminescence properties of individual MAPbBr$_3$ nanocrystals of different sizes, size-gradient nanocrystal arrays with an interparticle spacing of ~5 µm were prepared on silicon wafers. The ink was the same as used in Example 1.

Figure 13A:
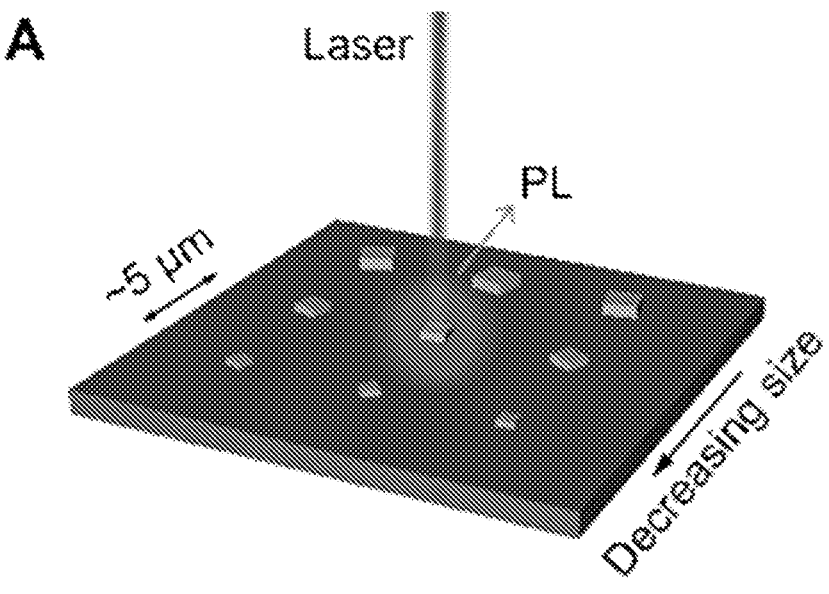
FIG. 13A is a schematic illustration of photoluminescence (PL) from a single nanocrystal in a location-encoded, size gradient nanocrystal array.
Figure 13B:
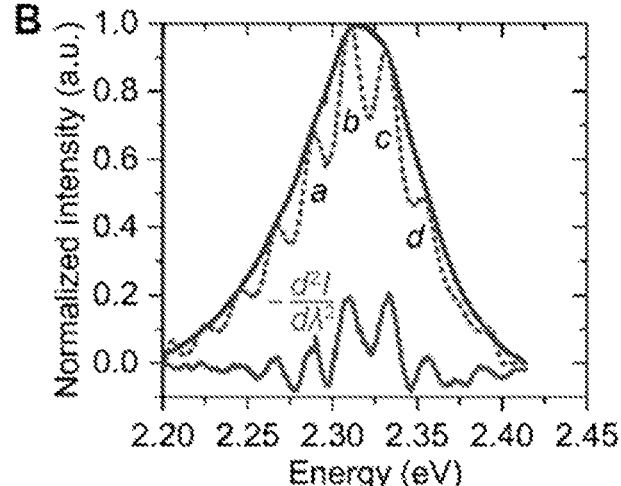
FIG. 13B is a high-resolution photoluminescence (HRPL) spectrum of an ~460 nm nanocrystal (projected size determined by SEM, upper solid curve). Multiple sub-peaks are revealed by both the second derivative of intensity (I) over wavelength (λ) (lower solid curve) and Richardson-Lucy deconvolution (dashed curve)

Single-nanocrystal emission spectra were collected by focusing an excitation laser onto an about 2 µm spot around each nanocrystal and then correlating with nanocrystal size as determined by SEM. FIG. 13A is a schematic illustration of this process. Referring to FIG. 13B, surprisingly, high-resolution PL (HRPL) spectroscopy revealed an emission peak that contained multiple shoulders, as illustrated by the peaks in the second derivative of the spectra, which do not original from the spectrometer.

Figure 14A:
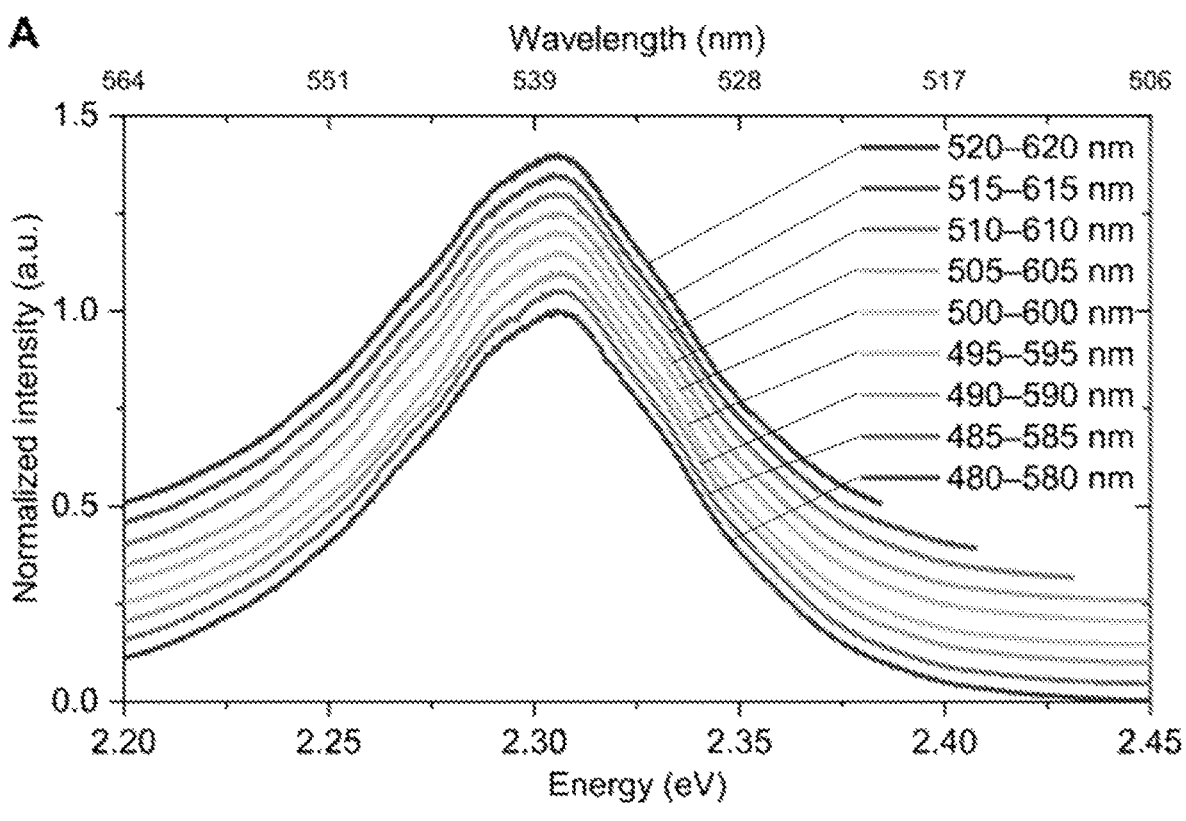
FIG. 14A is an HRPL spectra of a MAPbBr$_3$ nanocrystal collected over different detection ranges on the CCD camera.
Figure 14B:
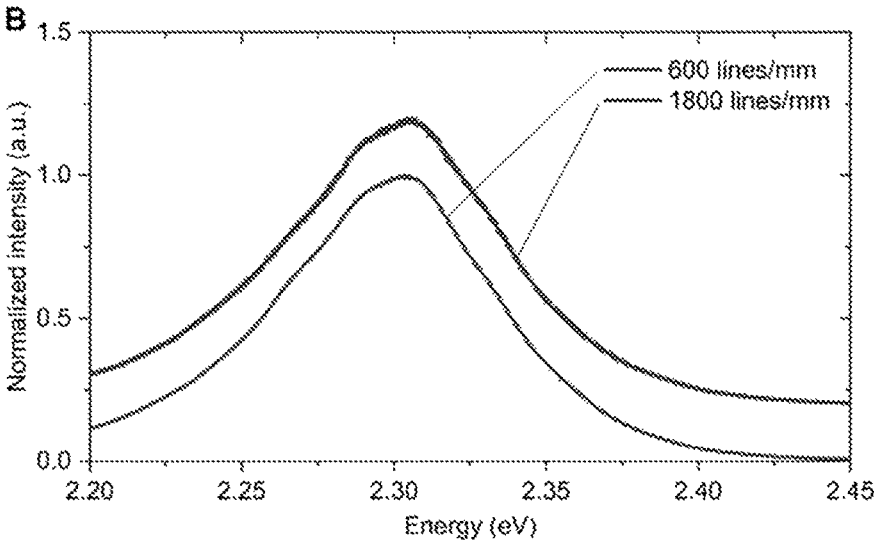
FIG. 14B is an HRPL spectra of a MAPbBr$_3$ crystal collected with two different grating densities.

FIGS. 14A and 14B are HRPL spectra collected under different spectrometer setups. In FIG. 14A, HRPL spectral was collected over different detection ranges on the CCD camera, and in FIG. 14B, the HRPL spectra was collected with two different grating densities. NO significant change in the shape of the spectra was observed in either case, suggesting that the multiple sub-peak features in the HRPL spectra were not the result of CCD gain unevenness or an artifact from the diffraction grating.

The observation of multiple sub-peak features indicates that multiple emission modes may have been present. The presence of multiple modes suggests that the band edges in the nanocrystals were defined by various lattice imperfections, such as emissive defects and lattice distortion.

No prior identification of such modes has been made and as such a direct fit of the HRPL spectral using multiple peak functions was determined to be unreliable. Analysis of the modes was made using the assumption that each mode could be described by an arbitrary peak broadened by a Gaussian point spread function, whereby each spectrum was iteratively deconvolved using the Richardson-Lucy algorithm.

In a typical HRPL spectrum, each data point (CCD pixel) represents 0.052 nm in the wavelength space. To preliminarily identify the possible number of peaks in a HRPL spectrum, the second derivative was first calculated after smoothing the spectra using a $2^{nd}$-order 50-point Savitzky-Golay filter (FIG. 13B, bottom curve). A negative peak in the second derivative (i.e., a positive peak in the $$-\frac{d^2 I}{d\lambda^2} \text{ plot)}$$

represented a concave turning point in the slope and indicated a shoulder feature. Peaks a, b, c, and d were clearly visible, but the center energy of these peaks could not be determined from the second derivative due to overlap.

Figure 15A:
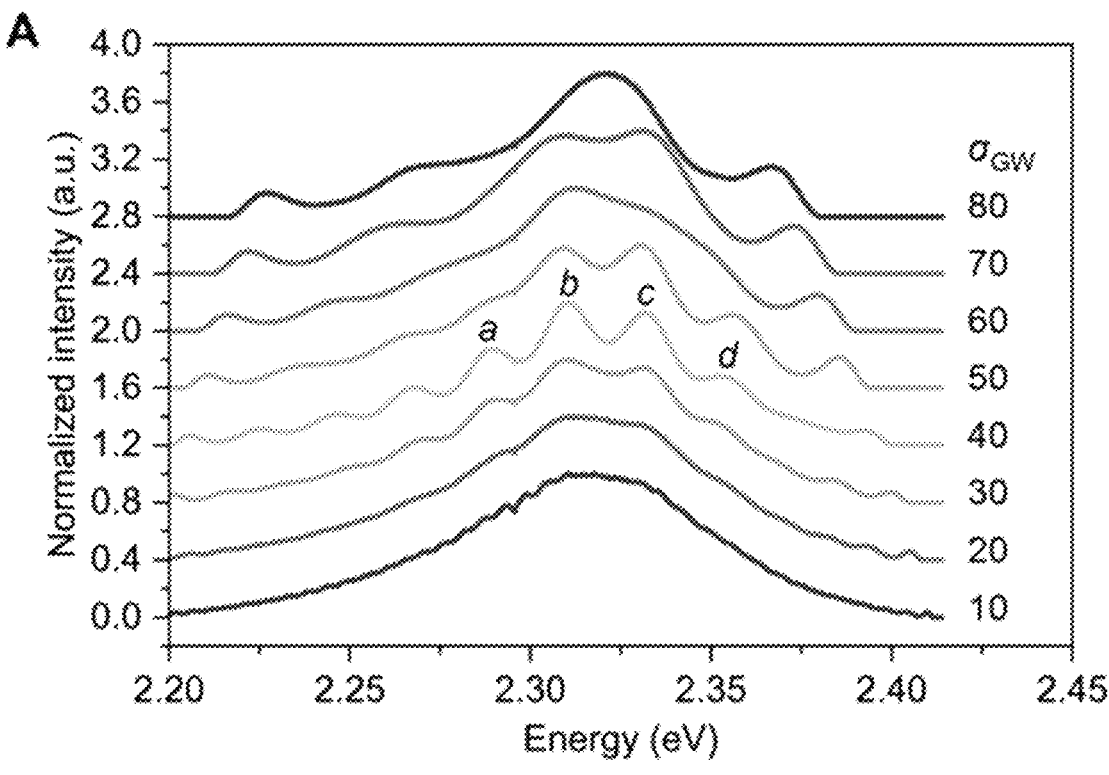
FIG. 15A is a graph showing the deconvolution results for an HRPL spectrum (MAPbBr$_3$ size of about 460 nm) using a Gaussian window PSF of different width (characterized by the standard deviation $\sigma_{GW}$). Fifty iterations were run in all cases.
Figure 15B:
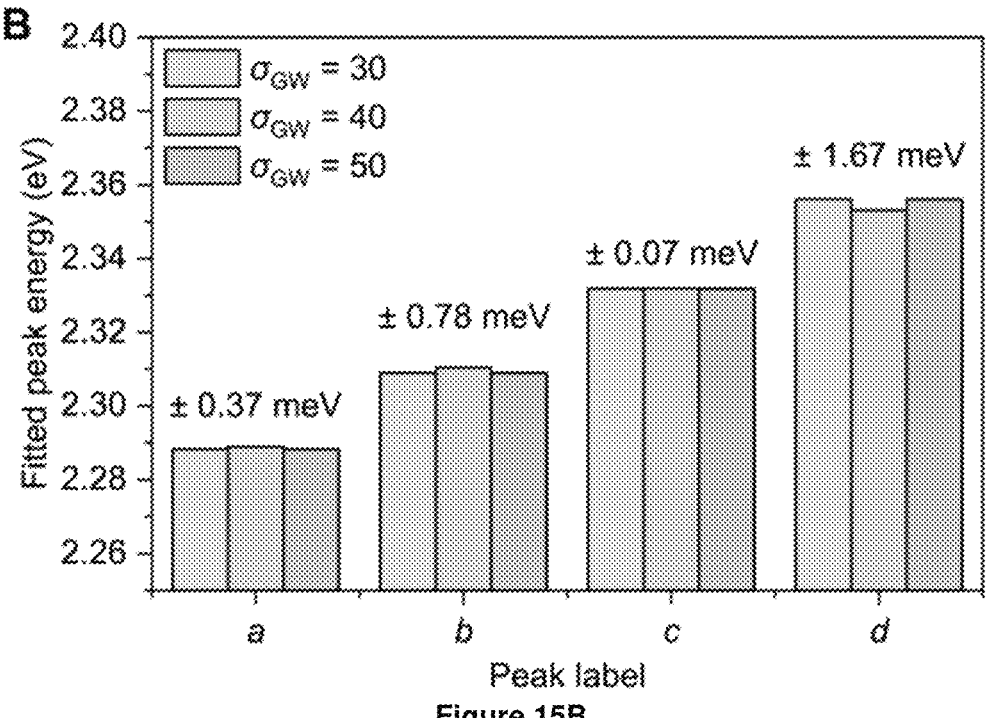
FIG. 15B is a graph showing the fitted peak energy values of the four peaks (a, b, c, and d) of FIG. 15A.

As indicated above, directly fitting such a HRPL spectrum with several peak functions is unreliable because there is no prior knowledge of the peak shapes. The large number of degrees of freedom results in many possible fits that converge with distinct peak shapes, center energies, and relative intensities. Therefore, a deconvolution approach with minimal prior assumptions was used to show the position of each mode. It was assumed that each mode was represented by an arbitrary sharp peak (width<<HRPL peak width) broadened by a Gaussian point spread function (PSF), which together constituted the overall spectrum that contained multiple shoulders. A 512-point Gaussian window was constructed that had an arbitrarily assigned width characterized by the standard deviation, $\sigma_{GW}$, and the Richardson-Lucy algorithm was used to deconvolve the spectrum (iterations: 50). The choice of a small $\sigma_{GW}$ decreases the smallest distance between neighboring detectable modes but also exaggerates noise. The method was consistent in recognizing the major peaks (a, b, c, and d) when $\sigma_{GW}$ was varied between 30 and 50, in agreement with the second derivative results (FIG. 15A). By fitting the deconvolution results using Gaussian functions, the center energy values for these deconvolved peaks were determined (FIG. 15B).

Figure 15C:
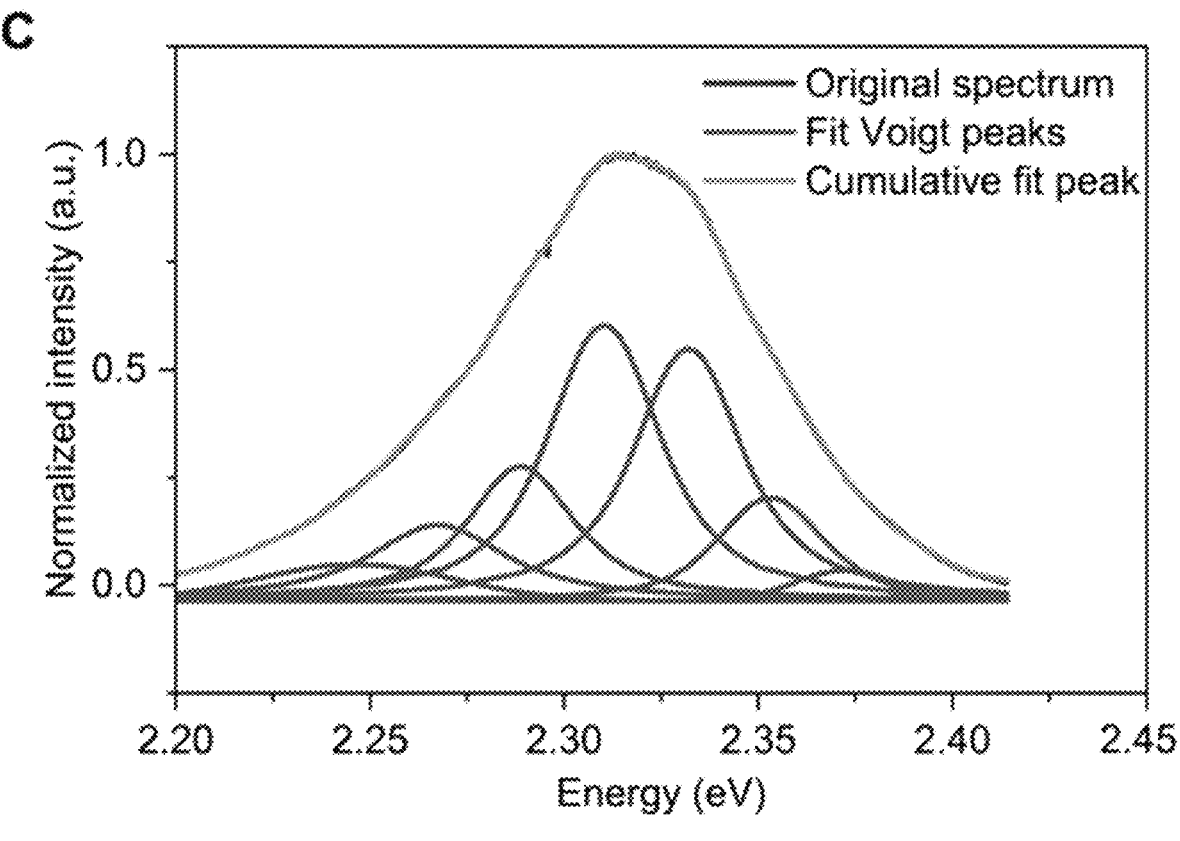
FIG. 15C is a graph showing the reconstruction of the original spectrum using Voigt functions with fixed center energy values from the deconvolution results with $\sigma_{GW}$=40.
Figure 15D:
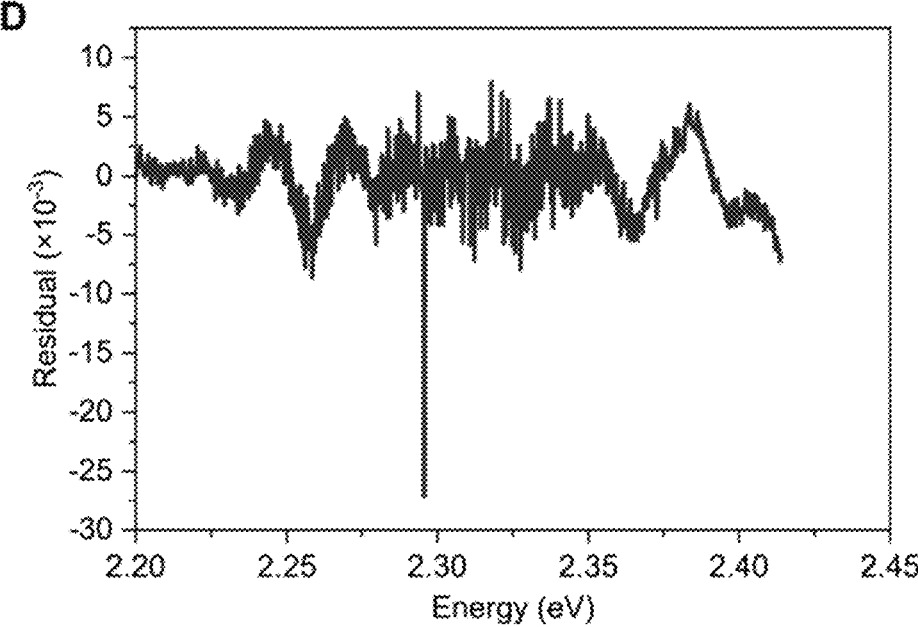
FIG. 15D is a graph showing the residual of the fit shown in FIG. 15C.
Figure 16A:
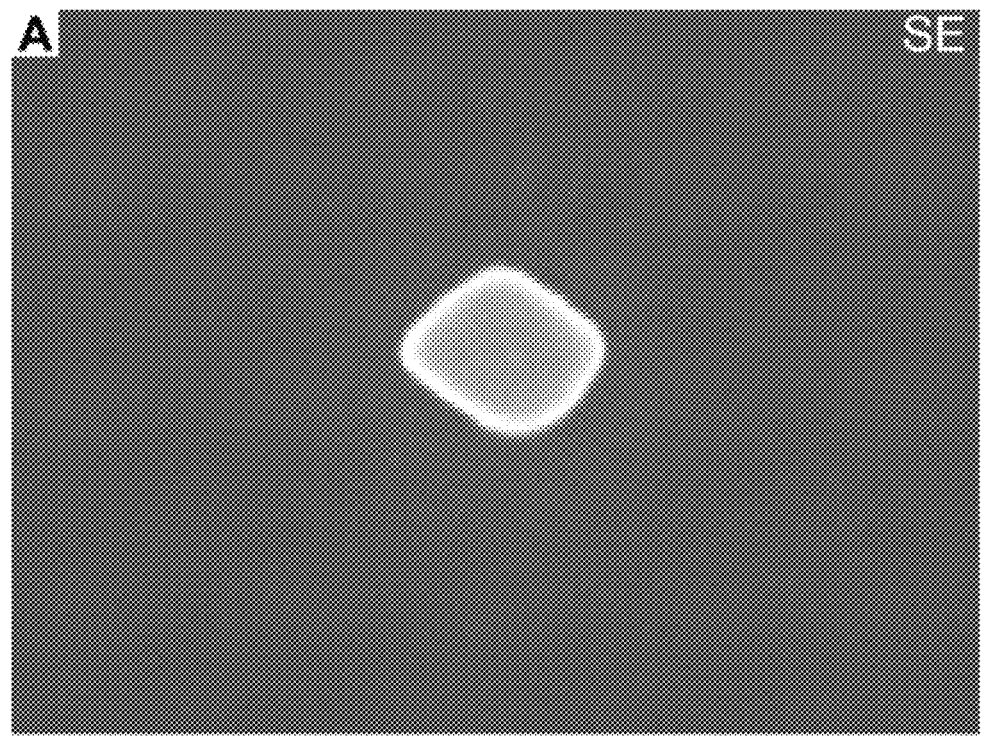
FIG. 16A is an SEM image of a CsPbBr$_3$ nanocrystal made in accordance with a method of the disclosure printed on an HMDS-modified ITO-coated glass and imaging with an acceleration voltage of 15 kV.
Figure 16B:
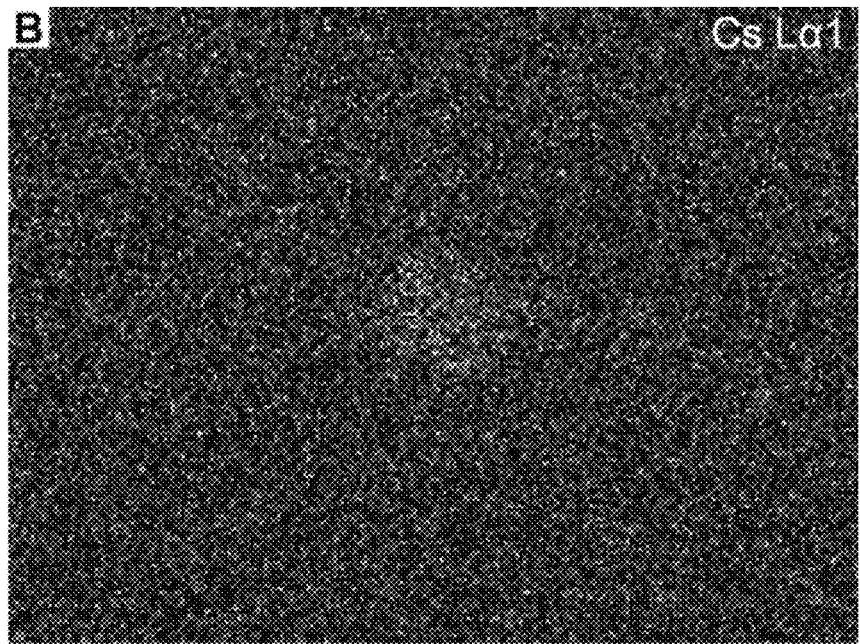

To study if the energy values identified from deconvolution results reflected the original HRPL spectra, the original spectrum was fit with multiple Voigt functions with fixed peak center energies using the deconvolution results. The overall spectrum shape was well reconstructed (FIG. 15C) with residuals less than 0.005 (on a normalized scale in [0, 1]; FIG. 15D). Therefore, it was concluded that the peaks and their center energies identified by the deconvolution method can reflect the multiple modes that exist in the original HRPL spectrum.

Figure 13C:
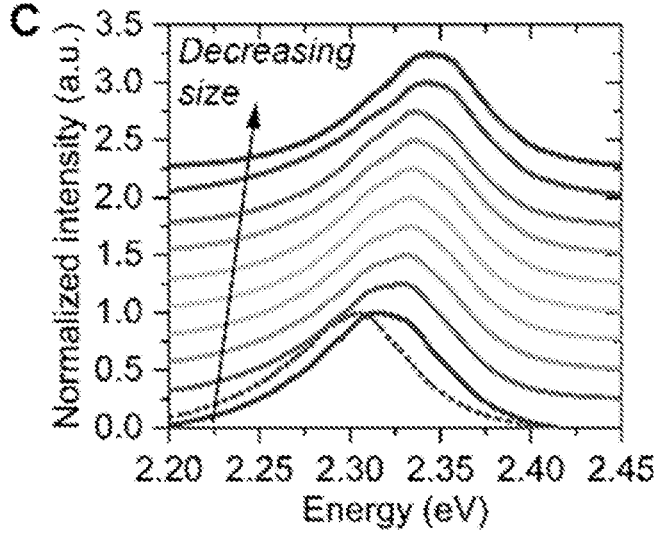
FIG. 13C is an HPLR spectra for a series of nanocrystals of decreasing size from about 460 nm to about 110 nm.

Emissions from nanocrystals were analyzed as a function of size from about 460 to 110 nm. Smaller nanocrystals showed an HRPL spectrum blue-shifted to higher energies (FIG. 13C), even though the dimension of all of the nanocrystals was well above the Bohr radius in MAPbBr$_3$ that is required for quantum confinement.

Similar blue shifts have been observed in polycrystalline thin films and microstructures of halide perovskites; however, their origin is under debate with several proposed explanations. These pertain to surface depletion, surface emission, substrate-induced strain, free carrier formation, and photon reabsorptions.

Figure 13D:
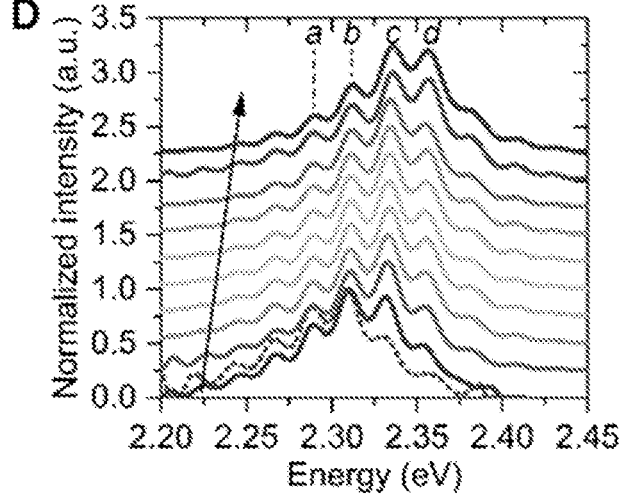
FIG. 13D is a deconvolution result of the spectra of FIG. 13C.
Figure 13E:
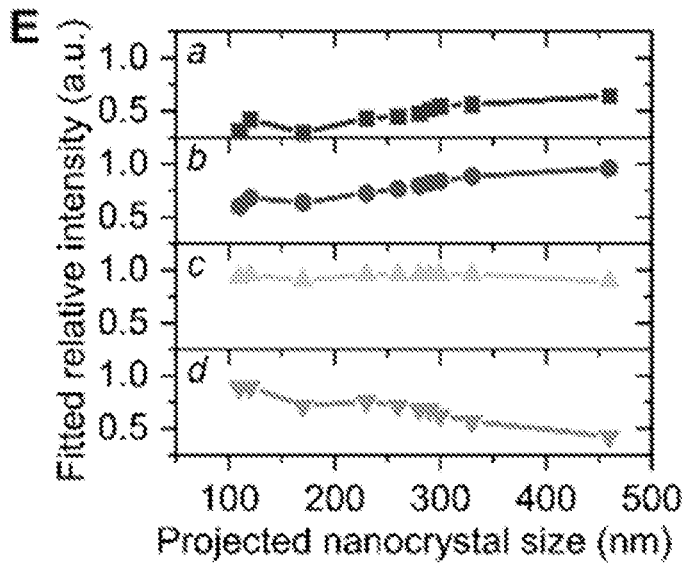
FIG. 13E is a graph showing the quantification of peak intensity of four sub-peaks (a, b, c, d) identified in FIG. 13D.
Figure 13F:
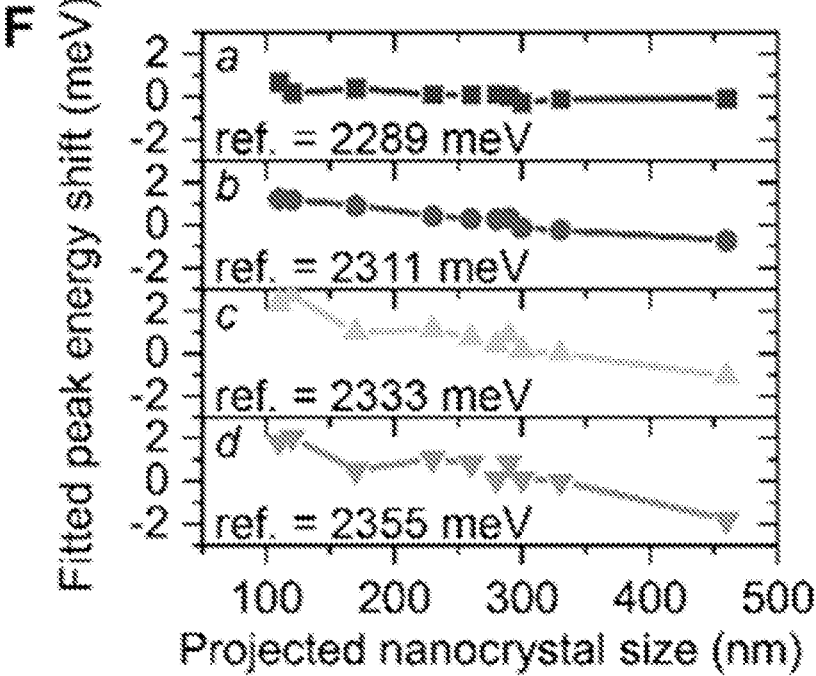
FIG. 13F is a graph showing the quantification of center energy of four sub-peaks (a, b, c, d) identified in FIG. 13D.

Referring to FIG. 13D, to gain further insight into the size-dependent emission phenomenon, the spectra from nanocrystals of different sizes was deconvolved to study the peak energies and relative intensities of all modes. The peak positions for all modes was found to be almost the same; however, their relative intensities varied, resulting in the apparent blue shift of the overall emission. Quantitatively, four major models, labeled a, b, c, and din FIG. 13D, were selected for comparison. Referring to FIG. 13E, when all deconvolved spectra were normalized to the range [0, 1], the relative intensity of modes a and b decreased as crystal size decreased, while mode d increased. The peak energies of all four modes exhibited a slight blue shift on the order of a few meV (FIG. 13F), far below the observed overall PL blue shift for the single nanocrystals of different sizes measured in the present example or for the polycrystalline structures reported in literature. The modes were all closely correlated to the modes present in the bulk crystal, suggesting that they are intrinsic to the crystal and share the same physical origin.

These results demonstrate that two different types of potentially size-dependent effects exist in halide perovskite nanocrystals: surface depletion-constraint quantum confinement and substrate-induced strain [internal pressure on the MPa-scale]. Without intending to be bound by theory, it is believed that these size-dependent effects are responsible for the slight blue shift of each emission mode. The overall PL shift as a function of crystal size was found to be a result of the systematic intensity modulation of these modes, which has a different physical origin.

Figure 13G:
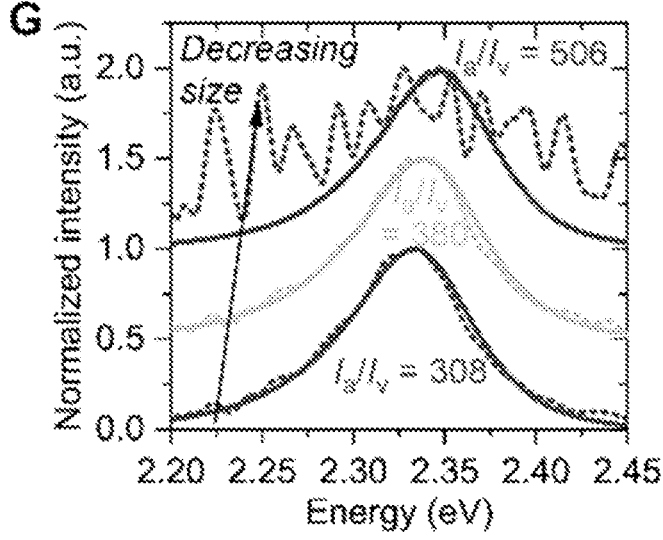
FIG. 13G is a PL spectra of nanocrystals exposed to air (solid curves) or in vacuo (dashed curves, bandpass-filtered for noise reduction). Peak intensity ratios (air vs. vacuum) before normalization are given as $I_a/I_v$.

Single-nanocrystal emission from crystals with different structures and in different environments were systematically analyzed to determine the nature of the multiple emission modes that show size-dependent intensity modulation behavior. Referring to FIG. 13G, a significant reduction in PL intensity (by a factor of greater than 300) was found when placing the nanocrystal arrays in high vacuum (greater than about $10^{-4}$ Pa). The vacuum exposed deep traps on the surface that are usually blocked by oxygen and water molecules. The emission peak energy was almost unchanged in the presence of absence of the blocker molecules (in air vs. in vacuo), suggesting that the emission modes originated from the interior of the crystals and that surface defects are not involved significantly.

Nanocrystals were partially excited using an about 2.33 eV laser and the HRPL spectra was compared with the fully excited nanocrystals to reveal the relationship among different emission modes. The HRPL spectra in the <2.32 eV (filter cutoff) region were unchanged from the fully excited spectra, suggesting that the energy states associated with the emission modes have relatively fixed densities and were independent from one another. It was further confirmed that this multi-mode, size-dependent emission behavior was not a result of organic cation rotation or DMSO insertion in the $MAPbBr_3$ crystals by analyzing the behavior or $CsPbBr_3$ nanocrystals and DMF-derived $MAPbBr_3$ polycrystals. $CsPbBr_3$ nanocrystals were made in accordance with the protocol outlined in example 1, using CsBr as a halide perovskite precursor and patterning on an HMDS-modified ITO-coated glass substrate. FIGS. 16A-16D illustrate SEM imaging and EDS mapping results for the $CsPbBr_3$ nanocrystals. FIGS. 18A and 18B are transmissive TRPL of the $CsPbBr_3$ nanocrystals. $MAPbBr_3$ polycrystals were also made in accordance with the protocol outline in example 1, except using DMF as the solvent. FIG. 19A illustrates SEM imaging of the $MAPbBr_3$ polycrystals with decreasing particle and grain size. Referring to FIGS. 17 and 19, all-inorganic $CsPbBr_3$ nanocrystals and DMF-derived $MAPbBr_3$ polycrystals both showed similar effects. The data is consistent with two pathways: (1) a change in relative density of emissive states, or (2) a redistribution of the emission intensities at different energies induced by crystal size variation. Excitonic properties of single $MAPbBr_3$ nanocrystals was analyzed in detail to identify the most probably explanation.

Referring to FIG. 20A, when cooled to 10 K in vacuo, individual MAPbBr3 nanocrystals exhibited well-defined emission depending on the power of the focused excitation laser. As the laser power was increased from 0.1 to 20 μW, the lower-energy tail in the emission peak indicative of the formation of bound excitons gradually diminished. The intensity of the main emission peak (I) was found to follow a power law against the excitation power (P), $$I \propto P^k,$$

with slope values 1<k<2 (FIG. 20B), which confirmed that the emission was predominantly excitonic and ruled out nonlinear optical generation in this system. When heated between 100 and 150 K, a gradual transition in emission energy was observed (FIGS. 20C and 20D), consistent with a phase transition. Multi-peak features were present at all temperatures and can be deconvolved below ~200 K when the signal-to-noise ratio was sufficient. These results suggest that the multiple modes are associated with defects intrinsic to the crystal.

Figure 13H:
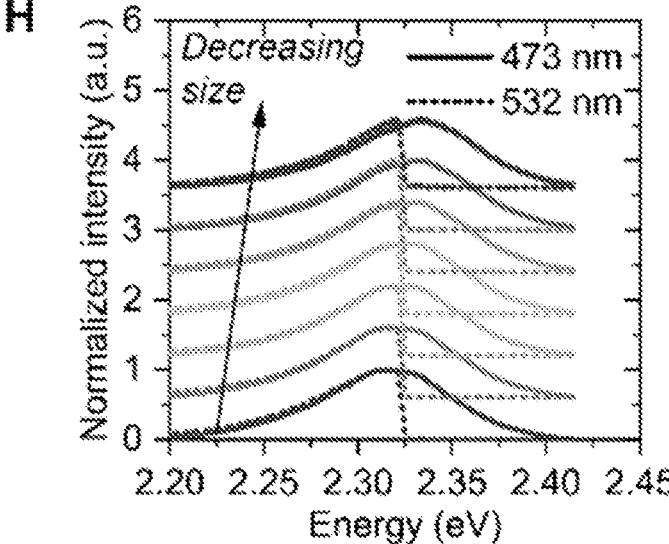
FIG. 13H is an HRPL spectra of nanocrystals excited with a 473 nm (about 2.62 eV, solid curves) or a 532 nm (About 2.33 eV, dashed curve) laser.
Figure 21:
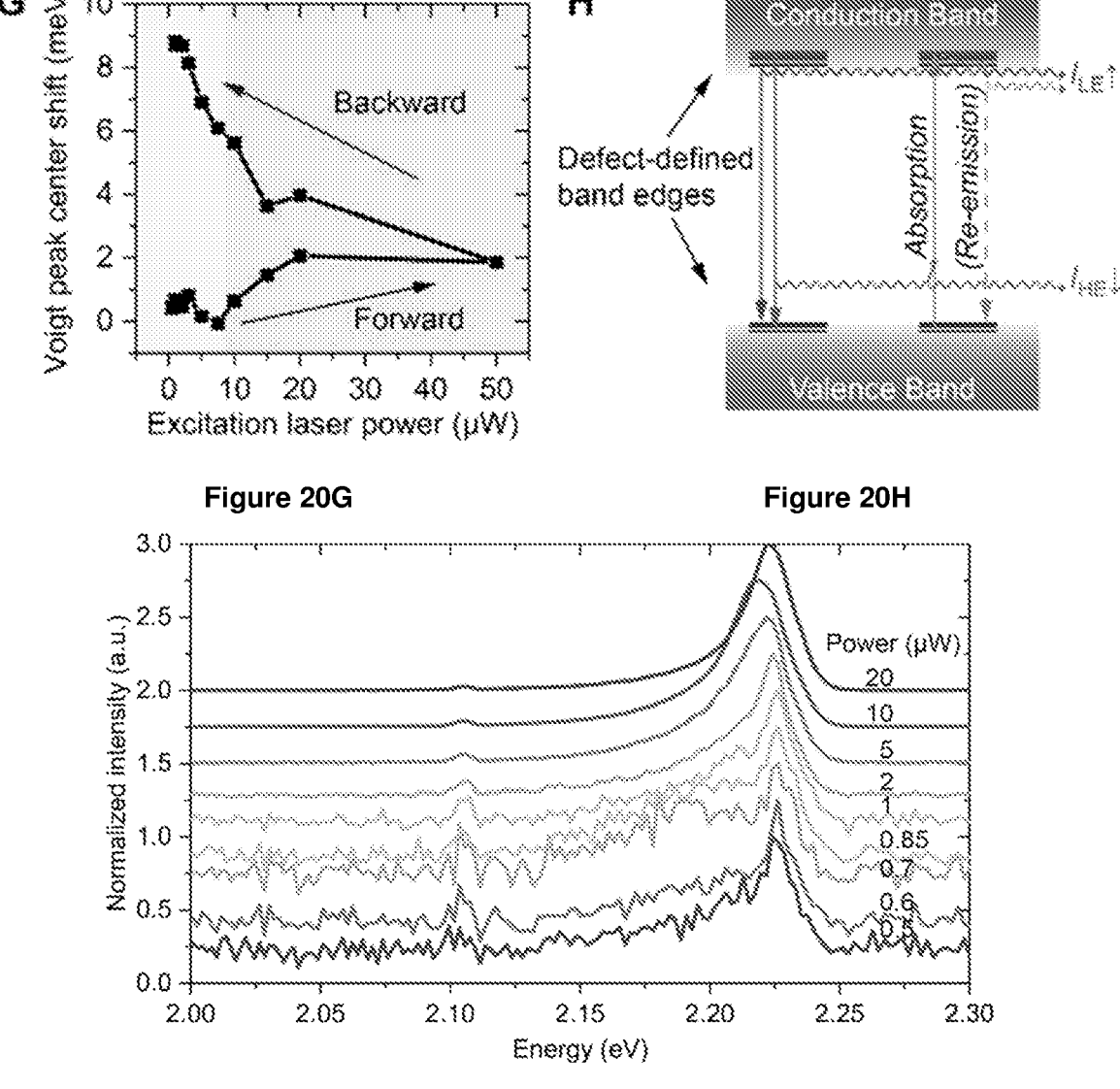
FIG. 21 is a graph showing the PL emission of a single about 133 nm $MAPbBr_3$ nanocrystal at 10K in vacuum excited by a 442-nm laser with varying excitation power.
Figure 22:
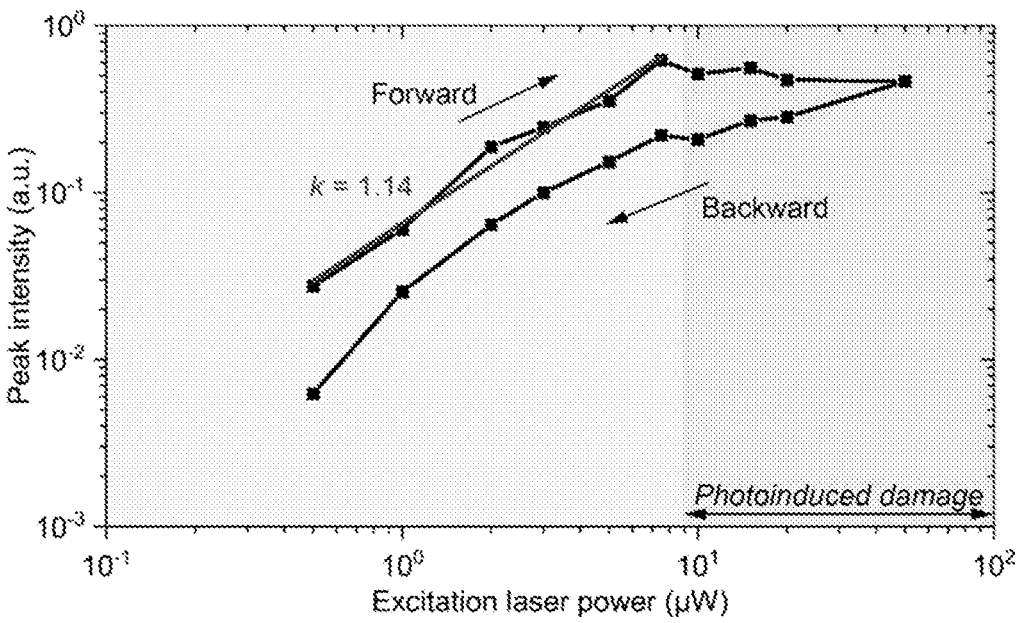
FIG. 22 is a log-log scale plot of the PL emission peak intensity of a $MAPbBr_3$ nanocrystal as a function of excitation laser power. The slope of the forward scan before photoinduced damage occurred was k=1.14. This is a replot of FIG. 20F.

The emission from single nanocrystals at room temperature in the atmosphere was further studied, excited by cyclically varying excitation power, and a hysteresis loop was observed in the emission intensity (FIGS. 20E and 20F). FIG. 21 illustrates the PL emission of a single about 133 nm $MAPbBr_3$ nanocrystal at 10K in vacuum excited by a 442 nm laser with varying excitation power. Specifically, when the laser power was higher than ~10 μW, PL intensity from the nanocrystal decreased due to photo-induced damage. The peak energy showed almost no change before the laser power reached the damage threshold when the process was dominated by free exciton-like emission with a power-law slope k=1.14. FIG. 22 is replot of FIG. 20F, showing a log-log scale plot of the PL emission peak intensity as a function of the excitation laser power. The slope of the forward scan before photo-induced damage occurred was k=1.14. There was no evidence of a new bound exciton peak at low excitation power (FIG. 20E). These results are consistent with the interpretation in micron-sized and bulk crystals that various intrinsic defect states exist in proximity to the band edges and that deep traps are protected due to screening. In addition, the damage-induced peak shift was also less than 10 meV (FIG. 20G), much smaller than the size-induced blue shift that spans tens of meV. As the emission modes that constitute the PL peak are independent of each other (FIG. 13H), these results suggest that the hot carrier recombination (band filling) effect or defect density variation were not the main contributors to the size-dependent emission in halide perovskite nanocrystals. Without intending to be bound by theory, it is believed that a redistribution of emission intensity due to the interaction between emitted photons and the crystal, i.e., photon reabsorption and possible photon recycling, are most likely responsible for this size-dependent behavior. The overall PL energy shift of ~26 meV in the nanocrystals (FIG. 13C, crystal size from ~460 to ~110 nm, estimated thickness from ~150 to ~40 nm) was consistent with the depth-dependent cathodoluminescence (CL) energy shift due to reabsorption, as reported in the literature.

From this data, and without intending to be bound by theory, it can be concluded that two factors primarily cause the size-dependent energy shift of the PL peaks for halide perovskite nanocrystals: (1) defects at the non-continuous electronic band edges resulted in excitonic emissions with varying energies; and (2) the reabsorption of higher-energy photons changed the intensity distribution of these emission modes (FIG. 20H). For larger crystals, photons emitted by higher-energy modes were more efficiently reabsorbed, creating electron-hole pairs that typically relax to lower-energy states non-emissively and causing a decrease in the intensity of higher-energy modes (IHE). In addition, the relative intensity of the lower-energy modes (ILE) in larger crystals might be exaggerated further due to re-emission. The wavelength of the emitted photons (typically 520-550 nm) is larger than the nanocrystal dimensions analyzed herein (typically 100-550 nm). Therefore, the photon energy transfer in nanocrystals is highly localized unlike what occurs in the bulk and microcrystals, which is typically described by a semi-classical light propagation model. This dominant pathway is independent of the surface or strain effects, which cause minimal energy shift (on the order of 100 meV) as a function of crystal size.

Example 6: Nanocrystal Libraries

A library of halide perovskite nanocrystal arrays can be synthesized using the methods of the disclosure. Nanocrystals of solution-processable halide perovskites $MAPbI_3$, $MAPbBr_3$, $MAPbCl_3$, $CsPbI_3$, and $CsPbBr_3$ were synthesized on a fluoropolymer-modified ITO-coated glass using the protocol described in example 1. $MAPbI_3$ nanocrystals were formed using an ink containing MAI and $PbI_2$ precursor powders dissolved in a mixed solvent system of DMSO and sulfolane. The concentration of the ink was 0.1 M $MAPbBr_3$ nanocrystals were prepared as described in Example 1. $MAPbCl_3$ nanocrystals were formed using an ink containing MACl and $PbCl_2$ dissolved in a mixed solvent system of DMSO and sulfolane. The concentration of the ink was 0.2 M. $CsPbI_3$ nanocrystals were printed from an ink containing CsI and $PbI_2$ precursor powders dissolved in a mixed solvent system of DMSO and sulfolane. The concentration of the ink was 0.1 M. $CsPbBr_3$ nanocrystals were formed using an ink containing CsBr and $PbBr_2$ precursor powders dissolved in a mixed solvent system of DMSO and sulfolane. The concentration of the ink was 0.1 M. FIGS. 23A to 23E are optical dark field microscopy images, SEM images, and EDS elemental mapping of the as-formed nanocrystals.

A layered Ruddlesden-Popper halide perovskite was also prepared using the protocol of example 1 with butylammonium bromide (BABr) and $PbBr_2$ as the precursors in the ink. The BABr and $PbBr_2$ powders were mixed in a 2:1 molar ratio. The ink had a concentration of 0.1 M. FIG. 23F illustrates the optical dark field microscopy imaging, SEM imaging, and EDS elemental mapping of the layered nanocrystals. FIG. 24 shows AFM height images of these nanocrystals. Referring to FIG. 23G, it was observed in the SEM imaging that these nanocrystals had thin steps on the surface of the rectangular nanocrystal, indicative of the targeted two-dimensional layered structure. Referring to FIG. 23H, through AFM, it was determined that the nanocrystals had single- and double-layer step heights of about 1.3 and 2.6 nm, respectively, which is consistent with the reported layer thickness in bulk crystals (1.4 nm) and single-layer sheets (1.6 nm).

Figure 23I:
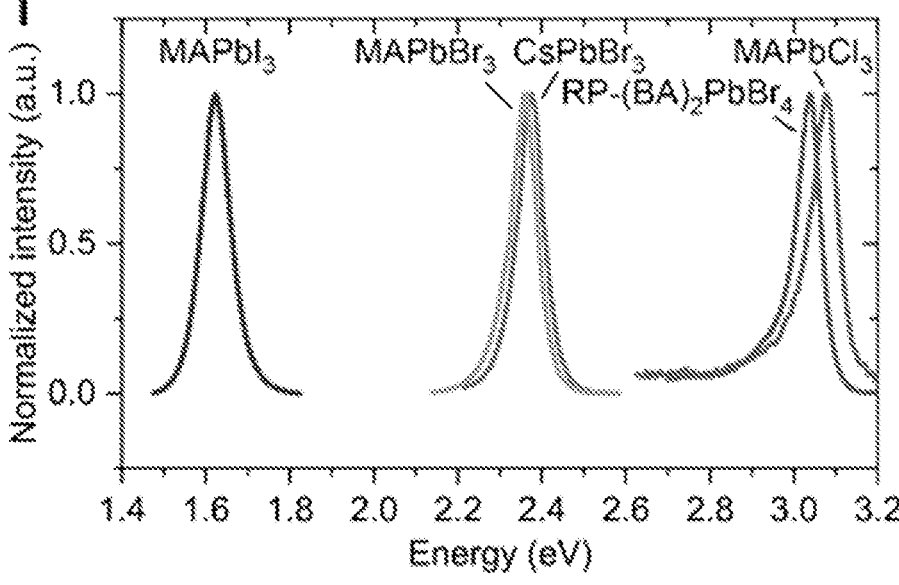
FIG. 23I is a graph showing representative PL spectra of individual nanocrystals of different compositions. The spectrum for $MAPbCl_3$ was bandpass-filtered to reduce the noise.
Figure 23J:
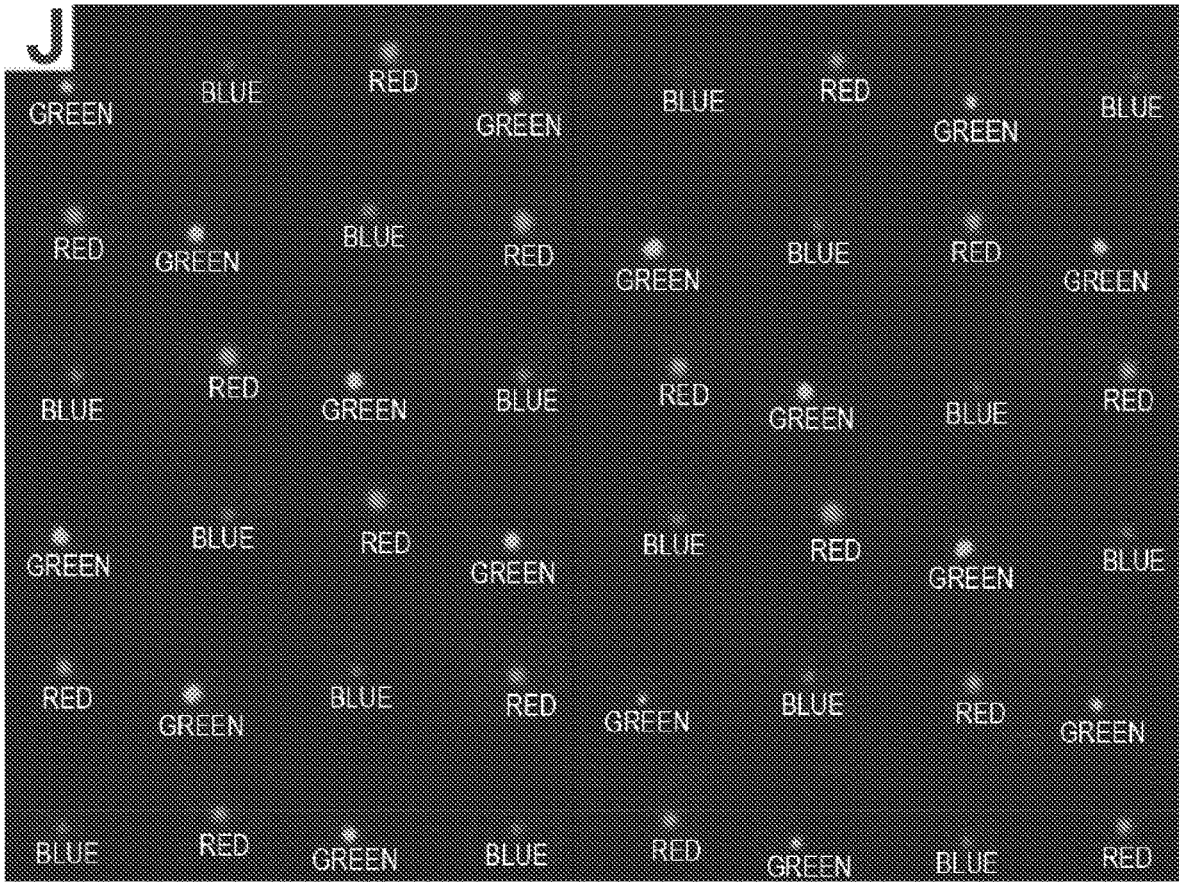
FIG. 23J is a merged-channel confocal fluorescence image of a tri-color nanocrystal pixel array comprised of $MAPbI_3$ (red), $MaPbBr_3$ (green), and $MAPb(Br_{0.4}Cl_{0.6})_3$ (blue). The image is labeled to show the pixel colors.
Figure 27A:
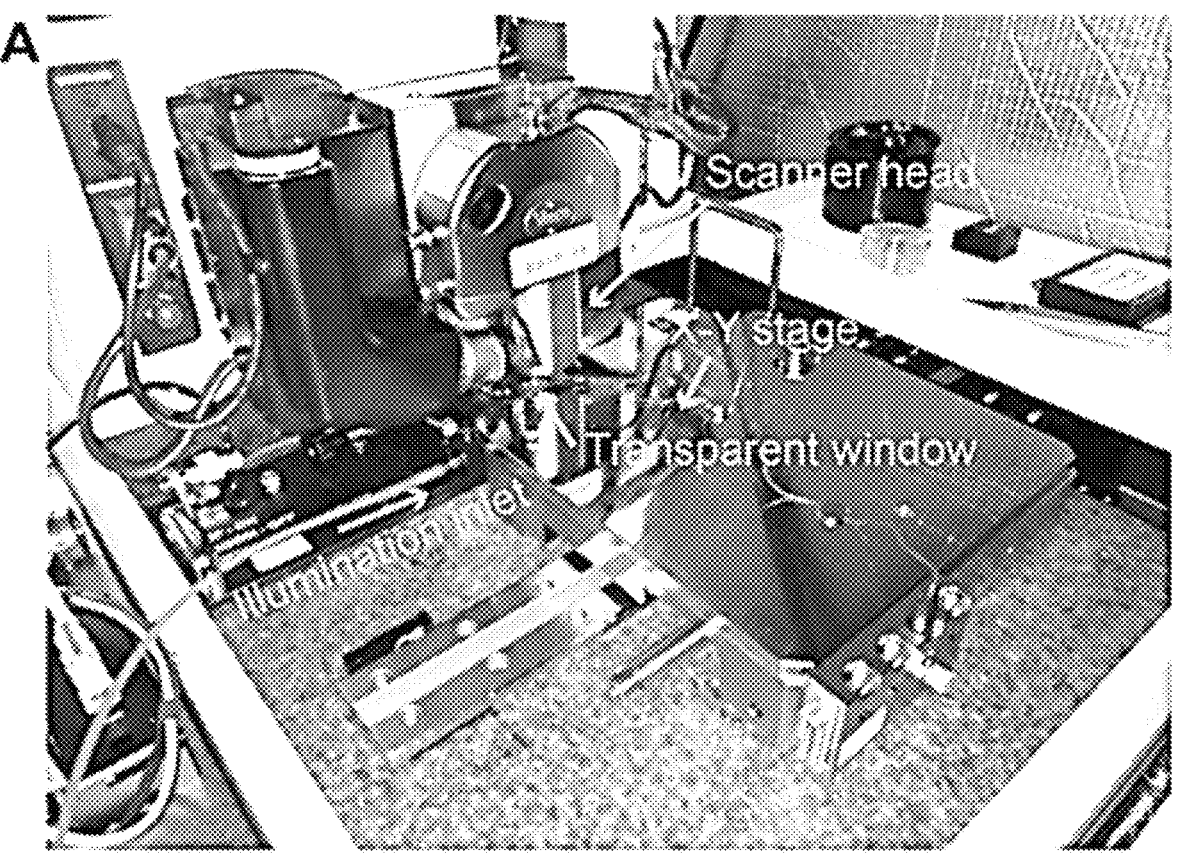
FIGS. 27A and 27B are photographs of a light-illuminated contact-mode AFM for testing photovoltaics. The AFM stage was modified to include light-emitting diodes (LEDs) and a glass window.
Figure 27B:
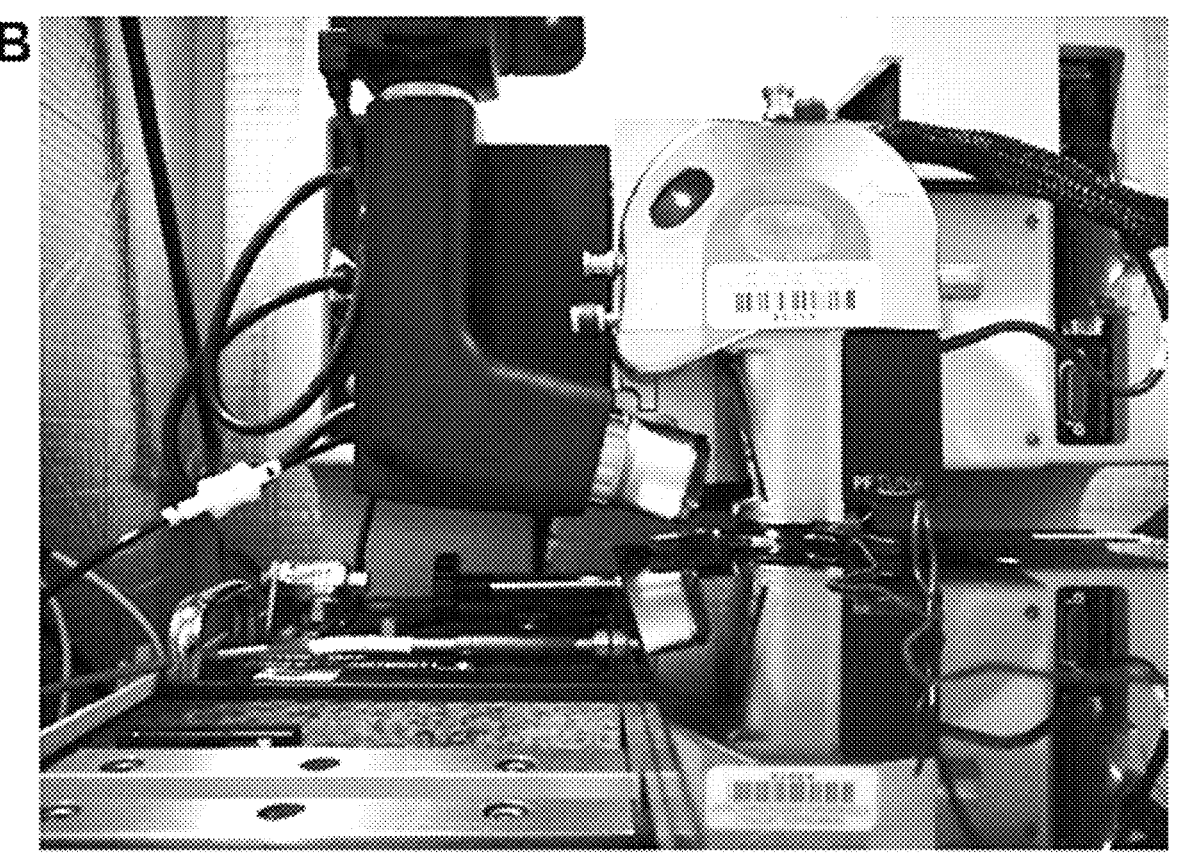
Figure 27C:
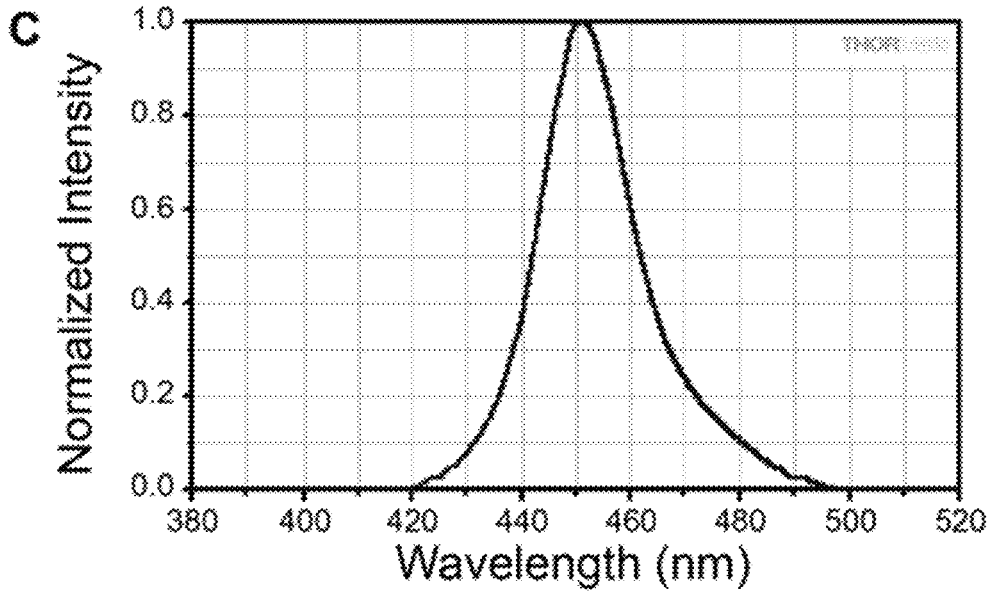
FIG. 27C is a graph showing the intensity profile of the nominally 455 nm LEDs.
Figure 27D:
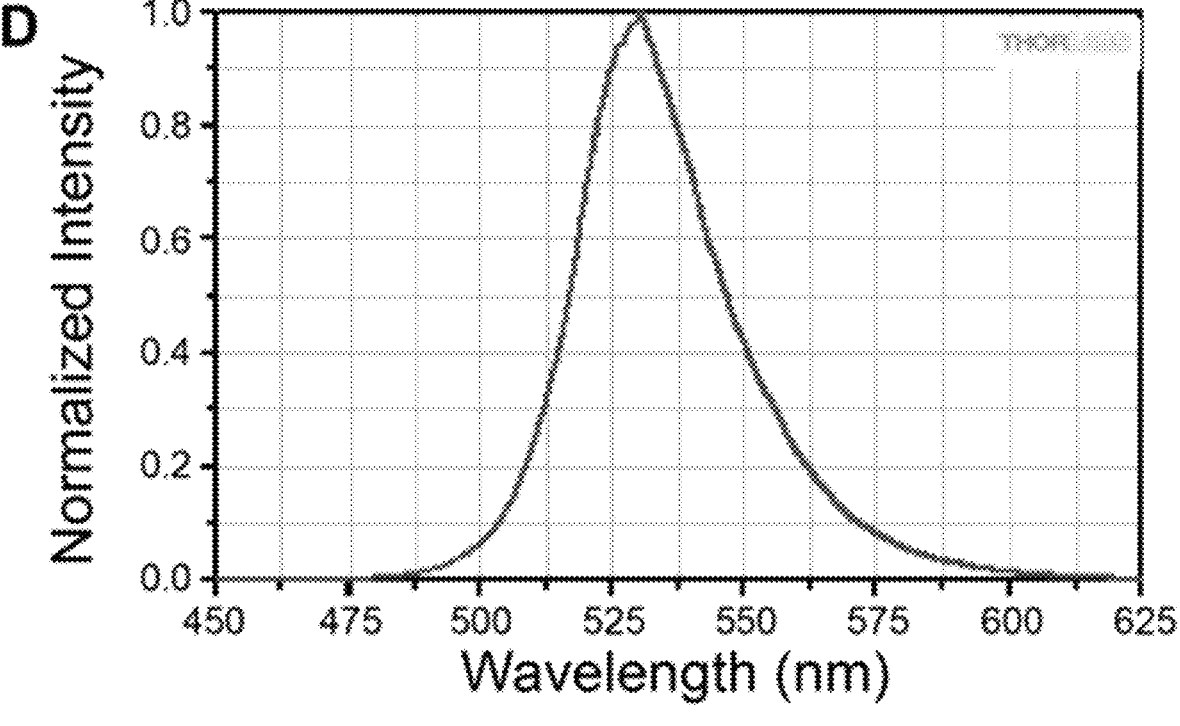
FIG. 27D is a graph showing the intensity profile of the nominally 530 nm LEDs.

Referring to FIG. 23I, with the exception of dark-phase δ-$CsPbI_3$ which is formed due to thermodynamic limitations at room temperature, all halide perovskite nanocrystals exhibit well-defined PL emission.

Referring to FIG. 23J, by sequentially patterning $MAPbI_3$ (red), $MAPbBr_3$ (green), and $MAPb(Br_{0.4}Cl_{0.6})_3$ (blue) nanocrystals on the same substrate, light-emissive RGB pixel arrays with all three colors were synthesized. The MABr, MACl, $PbBr_2$, and $PbCl_2$ powders were mixed in a 2:3:2:3 ratio and the ink had a concentration of 0.15 M for preparing the $MAPb(Br_{0.4}Cl_{0.6})_3$ nanocrystals. FIG. 25A is a merged-channel confocal fluorescence micrograph of a red-green halide perovskite nanocrystal array using $MAPbI_3$ (red) and $MAPbBr_3$ (green) nanocrystals. FIG. 25B is a merged-channel confocal fluorescence micrograph of a green-blue halide perovskite nanocrystal array using $MAPbBr_3$ (green), and $MAPb(Br_{0.4}Cl_{0.6})_3$ (blue) nanocrystals. This demonstrates the capability of the methods of the disclosure for synthesizing position-defined halide perovskite nanocrystal arrays with controlled emission wavelengths. This can be advantageously used in creating multi-color micropixels, for example, which could be suitable for high-density display technologies.

Example 7: Photovoltaic Devices

Combinatorial halide perovskite nanocrystal arrays formed in accordance with methods of the disclosure can be used to prepare photovoltaic devices, such as miniaturized solar cells. A hole transporter-free solar cell was constructed by patterning a single $MAPbBr_3$ nanocrystal on an ITO-coated glass substrate. The top surface of the nanocrystal was then connected using a Pt/Ir coated conductive AFM probe as illustrated in FIG. 26A. Referring to FIGS. 27A-27D, an in situ AFM stage was used to illuminate the nanocrystals (455 to 530-nm LED light source).

Referring to FIG. 26B, in the dark, no appreciable photocurrent was observed, while illumination under 455- nm LED (about 3.6 $mW/cm_2$) immediately triggered measurable photocurrents across the nanocrystal. Significant hysteresis was observed in the forward and backward scans, which is believed to be due to ion migration or condition of the probe-crystal contact.

Figure 28:
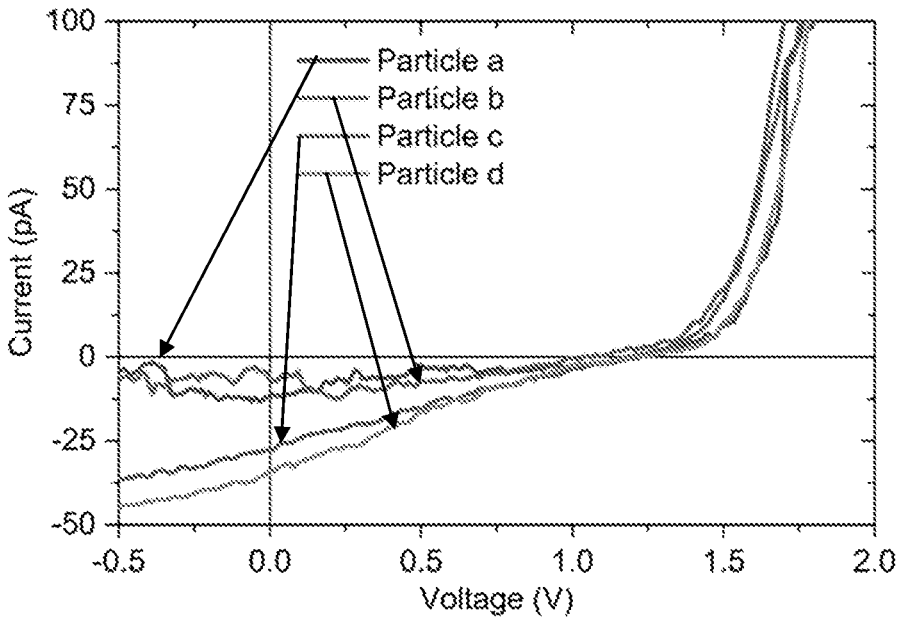
FIG. 28 is a graph showing current-voltage curves (backward scans) for four individual MAPbBr$_3$ nanocrystals. All curves were obtained under illumination by a 455 nm LED light of ~3.6 mW/cm$^2$.

Referring to FIG. 28, the photovoltaic response was observed in all four site-isolated nanocrystals studied with an open-circuit voltage ($V_{oc}$) between 1.06 and 1.21 V. The table below provides the open-circuit voltage ($V_{oc}$), short-circuit current ($I_{sc}$), and fill factor (FF) for the four individual $MAPbBr_3$ nanocrystals in FIG. 28. All data was obtained under illumination by a 455 nm LED light of about 3.6 $mW/cm^2$.

| PARTICLE | Voc (V) | $I_{SC}$ (PA) | FF |
|---|---|---|---|
| PARTICLE A | 1.21 | 11.95 | 0.23 |
| PARTICLE B | 1.06 | 6.72 | 0.56 |
| PARTICLE C | 1.17 | 27.80 | 0.23 |
| PARTICLE D | 1.20 | 34.14 | 0.20 |

Figure 29:
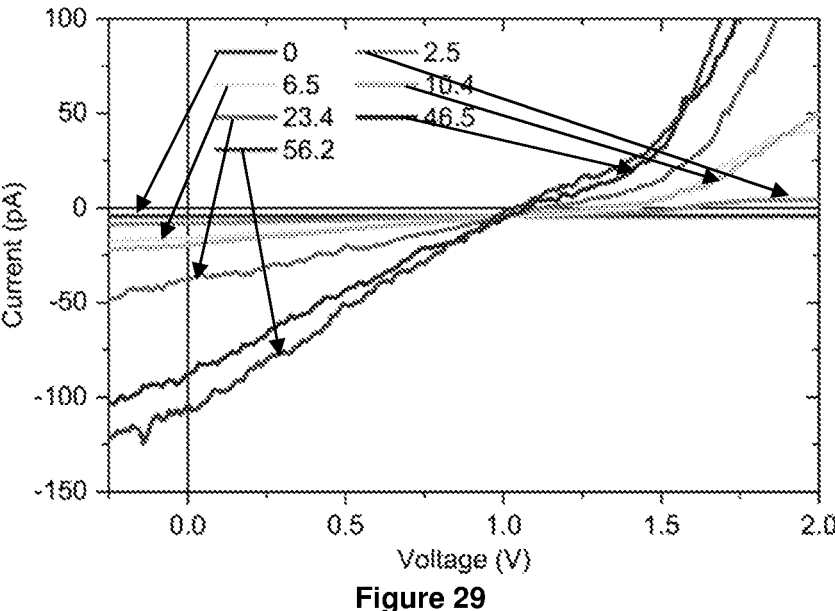
FIG. 29 is a graph showing the light intensity-dependent photovoltaic response from a MAPbBr$_3$ nanocrystal. Light intensity unit: mW/cm$^2$. Current variation between measurements is mainly attributed to the unstable point contact between the AFM probe and nanocrystal. LED wavelength: 530 nm.

Referring to FIG. 26C, under prolonged illumination, the nanocrystals showed varying responses due to the unstable contact between the AFM probe and the nanocrystal, and significant material degradation was observed as the light intensity was increased. Open-circuit voltage was observed to drop to <0.8 V when the light intensity exceeded 120 $mW/cm_2$, indicating an increase in defect density. Similar behavior but with less activity was observed with a 530 nm LED source (FIG. 29).

The use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict embodiments for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

REFERENCES

1. W. Li, Z. Wang, F. Deschler, S. Gao, R. H. Friend, A. K. Cheetham, Chemically diverse and multifunctional hybrid organic-inorganic perovskites. *Nat. Rev. Mater.* 2, 16099 (2017).
2. H. F. Zarick, N. Soetan, W. R. Erwin, R. Bardhan, Mixed halide hybrid perovskites: a paradigm shift in photovoltaics. *J. Mater. Chem. A* 6, 5507-5537 (2018).
3. J. Deng, J. Li, Z. Yang, M. Wang, All-inorganic lead halide perovskites: a promising choice for photovoltaics and detectors. *J. Mater. Chem. C* 7, 12415-12440 (2019).
4. D. Thrithamarassery Gangadharan, D. Ma, Searching for stability at lower dimensions: current trends and future prospects of layered perovskite solar cells. *Energy Environ. Sci.* 12, 2860-2889 (2019).

5. W. Nie, H. Tsai, R. Asadpour, J.-C. Blancon, A. J. Neukirch, G. Gupta, J. J. Crochet, M. Chhowalla, S. Tretiak, M. A. Alam, H.-L. Wang, A. D. Mohite, High-efficiency solution-processed perovskite solar cells with millimeter-scale grains. *Science* 347, 522-525 (2015).

6. N. Wang, L. Cheng, R. Ge, S. Zhang, Y. Miao, W. Zou, C. Yi, Y. Sun, Y. Cao, R. Yang, Y. Wei, Q. Guo, Y. Ke, M. Yu, Y. Jin, Y. Liu, Q. Ding, D. Di, L. Yang, G. Xing, H. Tian, C. Jin, F. Gao, R. H. Friend, J. Wang, W. Huang, Perovskite light-emitting diodes based on solution-processed self-organized multiple quantum wells. *Nat. Photonics* 10, 699-704 (2016).

7. H. Zhu, Y. Fu, F. Meng, X. Wu, Z. Gong, Q. Ding, M. V. Gustafsson, M. T. Trinh, S. Jin, X. Y. Zhu, Lead halide perovskite nanowire lasers with low lasing thresholds and high quality factors. *Nat. Mater.* 14, 636-642 (2015).

8. Y. Fang, Q. Dong, Y. Shao, Y. Yuan, J. Huang, Highly narrowband perovskite single-crystal photodetectors enabled by surface-charge recombination. *Nat. Photonics* 9, 679-686 (2015).

9. M. V. Kovalenko, L. Protesescu, M. I. Bodnarchuk, Properties and potential optoelectronic applications of lead halide perovskite nanocrystals. *Science* 358, 745-750 (2017).

10. Y. Fu, H. Zhu, J. Chen, M. P. Hautzinger, X. Y. Zhu, S. Jin, Metal halide perovskite nanostructures for optoelectronic applications and the study of physical properties. *Nat. Rev. Mater.* 4, 169-188 (2019).

11. C.-H. Lin, B. Cheng, T.-Y. Li, J. R. D. Retamal, T.-C. Wei, H.-C. Fu, X. Fang, J.-H. He, Orthogonal lithography for halide perovskite optoelectronic nanodevices. *ACS Nano* 13, 1168-1176 (2019).

12. G. Wang, D. Li, H.-C. Cheng, Y. Li, C.-Y. Chen, A. Yin, Z. Zhao, Z. Lin, H. Wu, Q. He, M. Ding, Y. Liu, Y. Huang, X. Duan, Wafer-scale growth of large arrays of perovskite microplate crystals for functional electronics and optoelectronics. *Sci. Adv.* 1, e1500613 (2015).

13. C.-K. Lin, Q. Zhao, Y. Zhang, S. Cestellos-Blanco, Q. Kong, M. Lai, J. Kang, P. Yang, Two-step patterning of scalable all-inorganic halide perovskite arrays. *ACS Nano* 14, 3500-3508 (2020).

14. Z. Gu, K. Wang, H. Li, M. Gao, L. Li, M. Kuang, Y. S. Zhao, M. Li, Y. Song, Direct-writing multifunctional perovskite single crystal arrays by inkjet printing. *Small* 13, 1603217 (2016).

15. J. Feng, X. Yan, Y. Zhang, X. Wang, Y. Wu, B. Su, H. Fu, L. Jiang, "Liquid knife" to fabricate patterning single-crystalline perovskite microplates toward high-performance laser arrays. *Adv. Mater.* 28, 3732-3741 (2016).

16. X. Liu, L. Niu, C. Wu, C. Cong, H. Wang, Q. Zeng, H. He, Q. Fu, W. Fu, T. Yu, C. Jin, Z. Liu, T. C. Sum, Periodic organic-inorganic halide perovskite microplatelet arrays on silicon substrates for room-temperature lasing. *Adv. Sci.* 3, 1600137 (2016).

17. G. Kim, S. An, S.-K. Hyeong, S.-K. Lee, M. Kim, N. Shin, Perovskite pattern formation by chemical vapor deposition using photolithographically defined templates. *Chem. Mater.* 31, 8212-8221 (2019).

18. F. Huo, Z. Zheng, G. Zheng, L. R. Giam, H. Zhang, C. A. Mirkin, Polymer pen lithography. *Science* 321, 1658-1660 (2008).

19. F. Brivio, A. B. Walker, A. Walsh, Structural and electronic properties of hybrid perovskites for high-efficiency thin-film photovoltaics from first-principles. *APL Mater.* 1, 042111 (2013).

20. L. B. Lucy, An iterative technique for the rectification of observed distributions. *Astron. J.* 79, 745 (1974).

21. W. H. Richardson, Bayesian-based iterative method of image restoration. *J. Opt. Soc. Am.* 62, 55-59 (1972).

22. J. Kang, L.-W. Wang, High defect tolerance in lead halide perovskite $CsPbBr_3$. *J. Phys. Chem. Lett.* 8, 489-493 (2017).

23. M. Sebastian, J. A. Peters, C. C. Stoumpos, J. Im, S. S. Kostina, Z. Liu, M. G. Kanatzidis, A. J. Freeman, B. W. Wessels, Excitonic emissions and above-band-gap luminescence in the single-crystal perovskite semiconductors $CsPbBr_3$ and $CsPbCl_3$. *Phys. Rev. B* 92, 235210 (2015).

24. H. Zhu, K. Miyata, Y. Fu, J. Wang, P. P. Joshi, D. Niesner, K. W. Williams, S. Jin, X.-Y. Zhu, Screening in crystalline liquids protects energetic carriers in hybrid perovskites. *Science* 353, 1409-1413 (2016).

25. K. Miyata, D. Meggiolaro, M. T. Trinh, P. P. Joshi, E. Mosconi, S. C. Jones, F. De Angelis, X.-Y. Zhu, Large polarons in lead halide perovskites. *Sci. Adv.* 3, e1701217 (2017).

26. K. Tanaka, T. Takahashi, T. Ban, T. Kondo, K. Uchida, N. Miura, Comparative study on the excitons in lead-halide-based perovskite-type crystals $CH_3NH_3PbBr_3$ $CH_3NH_3PbI_3$. *Solid State Commun.* 127, 619-623 (2003).

27. D. Li, G. Wang, H.-C. Cheng, C.-Y. Chen, H. Wu, Y. Liu, Y. Huang, X. Duan, Size-dependent phase transition in methylammonium lead iodide perovskite microplate crystals. *Nat. Commun.* 7, 11330 (2016).

28. Z.-Y. Zhang, H.-Y. Wang, Y.-X. Zhang, K.-J. Li, X.-P. Zhan, B.-R. Gao, Q.-D. Chen, H.-B. Sun, Size-dependent one-photon- and two-photon-pumped amplified spontaneous emission from organometal halide $CH_3NH_3PbBr_3$ perovskite cubic microcrystals. *Phys. Chem. Chem. Phys.* 19, 2217-2224 (2017).

29. V. D'Innocenzo, A. R. Srimath Kandada, M. De Bastiani, M. Gandini, A. Petrozza, Tuning the light emission properties by band gap engineering in hybrid lead halide perovskite. *J. Am. Chem. Soc.* 136, 17730-17733 (2014).

30. E. Oksenberg, E. Sanders, R. Popovitz-Biro, L. Houben, E. Joselevich, Surface-guided $CsPbBr_3$ perovskite nanowires on flat and faceted sapphire with size-dependent photoluminescence and fast photoconductive response. *Nano Lett.* 18, 424-433 (2018).

31. A. R. Srimath Kandada, A. Petrozza, Photophysics of hybrid lead halide perovskites: The role of microstructure. *Acc. Chem. Res.* 49, 536-544 (2016).

32. E. Oksenberg, A. Merdasa, L. Houben, I. Kaplan-Ashiri, A. Rothman, I. G. Scheblykin, E. L. Unger, E. Joselevich, Large lattice distortions and size-dependent bandgap modulation in epitaxial halide perovskite nanowires. *Nat. Commun.* 11, 489 (2020).

33. G. Grancini, A. R. Srimath Kandada, J. M. Frost, A. J. Barker, M. De Bastiani, M. Gandini, S. Marras, G. Lanzani, A. Walsh, A. Petrozza, Role of microstructure in the electron-hole interaction of hybrid lead halide perovskites. *Nat. Photonics* 9, 695-701 (2015).

34. Y. Yamada, T. Yamada, L. Q. Phuong, N. Maruyama, H. Nishimura, A. Wakamiya, Y. Murata, Y. Kanemitsu, Dynamic optical properties of $CH_3NH_3PbI_3$ single crystals as revealed by one- and two-photon excited photoluminescence measurements. *J. Am. Chem. Soc.* 137, 10456-10459 (2015).

35. Y. Kanemitsu, Luminescence spectroscopy of lead-halide perovskites: materials properties and application as photovoltaic devices. *J. Mater. Chem. C* 5, 3427-3437 (2017).

36. Y. Wang, X. Lü, W. Yang, T. Wen, L. Yang, X. Ren, L. Wang, Z. Lin, Y. Zhao, Pressure-induced phase transformation, reversible amorphization, and anomalous visible light response in organolead bromide perovskite. *J. Am. Chem. Soc.* 137, 11144-11149 (2015).

37. H.-H. Fang, S. Adjokatse, H. Wei, J. Yang, G. R. Blake, J. Huang, J. Even, M. A. Loi, Ultrahigh sensitivity of methylammonium lead tribromide perovskite single crystals to environmental gases. *Sci. Adv.* 2, e1600534 (2016).

38. O. Selig, A. Sadhanala, C. Müller, R. Lovrincic, Z. Chen, Y. L. A. Rezus, J. M. Frost, T. L. C. Jansen, A. A. Bakulin, Organic cation rotation and immobilization in pure and mixed methylammonium lead-halide perovskites. *J. Am. Chem. Soc.* 139, 4068-4074 (2017).

39. L. Zuo, S. Dong, N. De Marco, Y.-T. Hsieh, S.-H. Bae, P. Sun, Y. Yang, Morphology evolution of high efficiency perovskite solar cells via vapor induced intermediate phases. *J. Am. Chem. Soc.* 138, 15710-15716 (2016).

40. T. Schmidt, K. Lischka, W. Zulehner, Excitation-power dependence of the near-band-edge photoluminescence of semiconductors. *Phys. Rev. B* 45, 8989-8994 (1992).

41. Y. Liu, H. Lu, J. Niu, H. Zhang, S. Lou, C. Gao, Y. Zhan, X. Zhang, Q. Jin, L. Zheng, Temperature-dependent photoluminescence spectra and decay dynamics of MAPbBr$_3$ and MAPbI$_3$ thin films. *AIP Adv.* 8, 095108 (2018).

42. C. Chen, X. Hu, W. Lu, S. Chang, L. Shi, L. Li, H. Zhong, J.-B. Han, Elucidating the phase transitions and temperature-dependent photoluminescence of MAPbBr$_3$ single crystal. *J. Phys. D: Appl. Phys.* 51, 045105 (2018).

43. J. S. Manser, P. V. Kamat, Band filling with free charge carriers in organometal halide perovskites. *Nat. Photonics* 8, 737-743 (2014).

44. L. M. Pazos-Outón, M. Szumilo, R. Lamboll, J. M. Richter, M. Crespo-Quesada, M. Abdi-Jalebi, H. J. Beeson, M. Vrućinić, M. Alsari, H. J. Snaith, B. Ehrler, R. H. Friend, F. Deschler, Photon recycling in lead iodide perovskite solar cells. *Science* 351, 1430-1433 (2016).

45. H. Diab, C. Arnold, F. Lédée, G. Trippé-Allard, G. Delport, C. Vilar, F. Bretenaker, J. Barjon, J.-S. Lauret, E. Deleporte, D. Garrot, Impact of reabsorption on the emission spectra and recombination dynamics of hybrid perovskite single crystals. *J. Phys. Chem. Lett.* 8, 2977-2983 (2017).

46. L. Dou, A. B. Wong, Y. Yu, M. Lai, N. Kornienko, S. W. Eaton, A. Fu, C. G. Bischak, J. Ma, T. Ding, N. S. Ginsberg, L.-W. Wang, A. P. Alivisatos, P. Yang, Atomically thin two-dimensional organic-inorganic hybrid perovskites. *Science* 349, 1518-1521 (2015).

47. W. Peng, L. Wang, B. Murali, K.-T. Ho, A. Bera, N. Cho, C.-F. Kang, V. M. Burlakov, J. Pan, L. Sinatra, C. Ma, W. Xu, D. Shi, E. Alarousu, A. Goriely, J.-H. He, O. F. Mohammed, T. Wu, O. M. Bakr, Solution-grown monocrystalline hybrid perovskite films for hole-transporter-free solar cells. *Adv. Mater.* 28, 3383-3390 (2016).

48. P. Calado, A. M. Telford, D. Bryant, X. Li, J. Nelson, B. C. O'Regan, P. R. F. Barnes, Evidence for ion migration in hybrid perovskite solar cells with minimal hysteresis. *Nat. Commun.* 7, 13831 (2016).

49. D. Rhee, W.-K. Lee, T. W. Odom, Crack-free, soft wrinkles enable switchable anisotropic wetting. *Angew. Chem.* 129, 6623-6627 (2017).

50. D. J. Eichelsdoerfer, X. Liao, M. D. Cabezas, W. Morris, B. Radha, K. A. Brown, L. R. Giam, A. B. Braunschweig, C. A. Mirkin, Large-area molecular patterning with polymer pen lithography. *Nat. Protoc.* 8, 2548-2560 (2013).

51. C. R. Laramy, K. A. Brown, M. N. O'Brien, C. A. Mirkin, High-throughput, algorithmic determination of nanoparticle structure from electron microscopy images. *ACS Nano* 9, 12488-12495 (2015).

What is claimed:

1. A method of forming a halide perovskite nanocrystal array having a plurality of halide perovskite nanocrystals arranged in a pattern, comprising:

coating an array of pens with a first ink comprising at least one first perovskite precursor having the formula AX and at least one second perovskite precursor having the formula BX'$_2$ dissolved in a solvent, wherein A is a cation, B is a metal, and X and X' are each a halogen;

contacting a substrate with the coated pen array to thereby deposit the first ink as a pattern of printed indicia on the substrate, wherein:

the printed indicia form nanoreactors on the substrate and a halide perovskite nanocrystal nucleates and grows within each nanoreactor to form the halide perovskite nanocrystal array.

2. The method of claim 1, wherein the solvent comprises one or more of dimethylformamide (DMF), dimethyl sulfoxide (DMSO), y-butyrolactone (GBL), and sulfolane.

3. The method of claim 2, wherein the solvent comprises dimethyl sulfoxide (DMSO) and sulfolane and the DMSO and sulfolane are present in a volume ratio of 7:3.

4. The method of claim 1, wherein the solvent has a viscosity of about 0.9 to about 10.1 cP.

5. The method of claim 1, wherein the at least one first perovskite precursor and the at least one second perovskite precursor are present in the first ink in substantially equimolar amounts.

6. The method of claim 1, wherein a molar ratio of the at least one first perovskite precursor to the at least one second perovskite precursor in the first ink is about 2:1.

7. The method of claim 1, wherein the substrate is surface treated with hexamethyldisilazane (HMDS), octadecyltrichlorosilane (OTS), or polyvinylcarbazole (PVK).

8. The method of claim 1, wherein the substrate is surface treated with a fluoropolymer.

9. The method of claim 8, wherein the fluoropolymer comprises one or more repeating units selected from CF, CF$_2$, and CF$_3$.

10. The method of claim 1, wherein contacting the substrate with the coated polymer pen array comprises using a gradient of z-piezo length extensions to thereby form the pattern of the printed indicia having a size gradient corresponding to the gradient of the z-piezo length extension, wherein the halide perovskite nanocrystal array has the halide perovskite nanocrystals with a crystal size gradient corresponding to the size gradient of the pattern of the printed indicia.

11. The method of claim 1, wherein A is selected from the group consisting of methylammonium, butylammonium, formamidinium, phenethylamine, 3-(aminomethyl) piperidinium, 4-(aminomethyl) piperidinium, cesium, and rubidium, and B is selected from the group consisting of lead, tin, europium, and germanium.

12. The method of claim 1, wherein X is one or more of I, Br, Cl, F, and At and X' is one or more of I, Br, Cl, F, and At.

13. The method of claim 1, wherein the halide perovskite nanocrystals nucleate and grow as single crystals in all or substantially all of the nanoreactors.

14. The method of claim 1, comprising repeating the steps of coating the pen array with the first ink and contacting the substrate to form an additional pattern of printed indicia that form nanoreactors from which halide perovskite nanocrystals nucleate and grow upon evaporation of the solvent.

15. The method of claim 1, comprising coating the pen array with a second ink after contacting the substrate to deposit the first ink;

contacting the substrate with coated pen array to thereby deposit the second ink and form a pattern of second ink printed indicia on the substrate, wherein:

the second ink comprises at least one first perovskite precursor having the formula AX and at least one second perovskite precursor having the formula $BX'_2$ dissolved in a solvent, wherein A is a cation, B is a metal, and X and X' are each a halogen, the second ink is different from the first ink by one or more of the concentration of the first perovskite precursor, the concentration of the second perovskite precursor, the solvent, the selection of A, the selection of B, the selection of X, and the selection of X', the pattern of second printed indicia form nanoreactors on the substrate and second ink halide perovskite nanocrystals nucleate and grow within each nanoreactor upon evaporation of the solvent thereby resulting in a substrate having at least two different halide perovskite nanocrystal arrays, the at least two different halide perovskite nanocrystal arrays differ in one or more of crystal structure, size, and composition.

16. The method of claim 1, wherein coating the pen array comprises further coating with a second ink the comprising at least one first perovskite precursor having the formula AX and at least one second perovskite precursor having the formula $BX'_2$ dissolved in a solvent, wherein A is a cation, B is a metal, and X and X' are each a halogen, wherein:

the second ink is different from the first ink by one or more of the concentration of the first perovskite precursor, the concentration of the second perovskite precursor, the solvent, the selection of A, the selection of B, the selection of X, and the selection of X', a subset of pens of the polymer pen array are coated with the first ink and a different subset of pens of the polymer pen array are coated with the second ink, contacting the substrate with the coated pen array deposits both the first and second inks solutions to form a pattern of first and second printed indicia, the first and second printed indicia form first and second nanoreactors, respectively, on the substrate and upon evaporation of the solvent from the first and second nanoreactors, first and second halide perovskite nanocrystals nucleate and grow within each of the first and second nanoreactors, respectively.

\* \* \* \* \*